(12) United States Patent
Nanjyo et al.

(10) Patent No.: US 7,457,019 B2
(45) Date of Patent: Nov. 25, 2008

(54) LIGHT DEFLECTING METHOD AND APPARATUS EFFICIENTLY USING A FLOATING MIRROR

(75) Inventors: Takeshi Nanjyo, Miyagi-ken (JP); Seiichi Katoh, Miyagi-ken (JP); Kouichi Ohtaka, Chiba-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/014,570

(22) Filed: Jan. 15, 2008

(65) Prior Publication Data

US 2008/0117488 A1 May 22, 2008

Related U.S. Application Data

(62) Division of application No. 11/411,849, filed on Apr. 27, 2006, now Pat. No. 7,342,702, which is a division of application No. 11/098,722, filed on Apr. 5, 2005, now Pat. No. 7,099,060, which is a division of application No. 10/294,033, filed on Nov. 14, 2002, now Pat. No. 6,900,915.

(30) Foreign Application Priority Data

Nov. 14, 2001 (JP) ............................. 2001-349415
Jun. 19, 2002 (JP) ............................. 2002-178216
Sep. 27, 2002 (JP) ............................. 2002-282858

(51) Int. Cl.
*G02B 26/08* (2006.01)

(52) U.S. Cl. ....................... 359/199; 359/198; 359/213; 359/214; 359/223; 359/225

(58) Field of Classification Search ....................... None
See application file for complete search history.

(56) References Cited

U.S. PATENT DOCUMENTS 5,017,987 A 5/1991 Nanjoh et al.

(Continued)

FOREIGN PATENT DOCUMENTS

JP 6-138403 5/1994

(Continued)

OTHER PUBLICATIONS

L. J. Hornbeck,. SPIE Critical Reviews Series, vol. 1150, pp. 86-102, "Deformable-Mirror Spatial Light Modulators," 1989.

(Continued)

*Primary Examiner*—James Phan
(74) *Attorney, Agent, or Firm*—Oblon, Spivak, McClelland, Maier & Neustadt, P.C.

(57) ABSTRACT

A light deflecting apparatus deflecting input light in directions for at least one deflection-axis includes a plate-like-shaped member configured to reflect input light, a substrate above which the plate-like-shaped member is placed with no fixed portion relative to the substrate, a supporting member serving as a fulcrum for the plate-like-shaped member to tilt, a plurality of space regulating members configured to regulate a space in which the plate-like-shaped member placed on the supporting member above the substrate is freely movable, and a plurality of electrodes arranged around the supporting member on the substrate and facing a bottom surface of the plate-like-shaped member.

14 Claims, 72 Drawing Sheets

U.S. PATENT DOCUMENTS

| | | | |
|---|---|---|---|
| 5,108,843 | A | 4/1992 | Ohtaka et al. |
| 5,304,357 | A | 4/1994 | Sato et al. |
| 5,408,113 | A | 4/1995 | Kanno et al. |
| 5,448,113 | A | 9/1995 | Suzuki et al. |
| 5,633,523 | A | 5/1997 | Kato |
| 5,668,413 | A | 9/1997 | Nanjo |
| 5,811,353 | A | 9/1998 | Nanjo |
| 6,028,689 | A | 2/2000 | Michalicek et al. |
| 6,150,698 | A | 11/2000 | Ohtsuka et al. |
| 6,312,108 | B1 | 11/2001 | Kato |
| 6,324,149 | B1 | 11/2001 | Mifune et al. |
| 6,332,669 | B1 | 12/2001 | Kato et al. |
| 6,367,914 | B1 | 4/2002 | Ohtaka et al. |
| 6,509,995 | B1 | 1/2003 | Suzuki et al. |
| 6,600,591 | B2 * | 7/2003 | Anderson et al. ........... 359/291 |
| 6,657,759 | B2 | 12/2003 | Muller |
| 6,744,550 | B2 * | 6/2004 | Neukermans et al. ....... 359/291 |
| 7,113,321 | B2 * | 9/2006 | Nanjyo et al. ............... 359/290 |
| 7,277,217 | B1 | 10/2007 | Katoh et al. |
| 2005/0179973 | A1 | 8/2005 | Nanjyo et al. |
| 2006/0103912 | A1 | 5/2006 | Katoh et al. |
| 2006/0239009 | A1 | 10/2006 | Nanjyo et al. |
| 2007/0091416 | A1 | 4/2007 | Katoh et al. |

FOREIGN PATENT DOCUMENTS

| | | |
|---|---|---|
| JP | 8-220455 | 8/1996 |
| JP | 10-510374 | 10/1998 |
| JP | 2941952 B | 8/1999 |
| JP | 2000-002842 | 1/2000 |
| JP | 3016871 B | 3/2000 |

OTHER PUBLICATIONS

K. E. Petersen, Applied Physics Letters, vol. 31, No. 8, pp. 521-523, "Micromechanical Light Modulator Array Fabricated on Silicon," Oct. 1977.

O. Solgaard, et al., Optics Letters, vol. 17, No. 9, pp. 688-690, "Deformable Grating Optical Modulator." May 1, 1992.

U.S. Appl. No. 12/050,130, filed Mar. 17, 2008, Katoh et al.

* cited by examiner

LIGHT DEFLECTING METHOD AND APPARATUS EFFICIENTLY USING A FLOATING MIRROR

CROSS-REFERENCE TO RELATED APPLICATIONS

This application is a divisional of U.S. application Ser. No. 11/411,849, filed Apr. 27, 2006, now U.S. Pat. No. 7,342,702 which is a divisional of U.S. application Ser. No. 11/098,722, filed Apr. 5, 2005, now U.S. Pat. No. 7,099,060, which is a divisional of U.S. application Ser. No. 10/294,033, filed Nov. 14, 2002, now U.S. Pat. No. 6,900,915, and is based upon and claims the benefit of priority from the prior Japanese Patent Application Nos. 2001-349415, filed Nov. 14, 2001, 2002-178216, filed Jun. 19, 2002, and 2002-282858, filed Sep. 27, 2002. The entire contents of each of these documents are incorporated herein by reference.

BACKGROUND OF THE INVENTION

1. Field of the Invention

The present invention relates to a method and apparatus for light deflecting, and more particularly to a method and apparatus for light deflecting capable of efficiently moving a floating mirror with an electrostatic attraction force.

2. Discussion of the Background

Conventionally, a light deflecting device and a light deflecting system using the light deflecting device are known, generating an electrostatic attraction force to bend a cantilever-like light reflecting member to change a reflection direction relative to input light rays. This apparatus is described in Japanese Patent No. 2,941,952, Japanese Patent No. 3,016871, Japanese Laid-Open Patent Application Publication No. 10-510374, "Applied Physics Letters," 1977, vol. 31, No. 8, pp 521-pp 523, by K. E. Petersen, and "Optics Letters," vol. 7, No. 9, pp 688-pp 690 by D. M. Bloom.

Further, an image forming apparatus is also known, employing a light deflecting system in which a plurality of digital micro-mirror devices are arranged in one or two dimensions. This apparatus is described in Japanese Laid-Open Patent Application Publication No. 06-138403.

In digital micro-mirror devices having a twisted-type light reflection member or a cantilever-like light reflecting member, a mirror portion is tilted and has at least one fixed end. This device is described in a reference of "Proc. SPIE," 1989, vol. 1150, pp 86-pp 102.

However, in the light deflecting device and the digital micro-mirror device having the twisted-type light reflecting member or the cantilever-like light reflecting member, the light reflecting member is difficult to be stably held and a response speed is late.

Also, in the above-mentioned digital micro-mirror device having the twisted-type light reflecting member, a hinge of the twisted portion may degrade its mechanical strength in a usage over an extended period of time.

Further, a light deflecting device for switching light by driving a diffraction grating with an electrostatic attraction force limits an allowable wavelength of an input light ray.

In addition, Japanese Laid-Open Patent Application Publication No. 2000-002842 describes a light deflecting device for performing a light deflection by causing a light reflecting member with both ends fixed to deform in a circular shape. This device requires a relatively high driving voltage since the light reflecting member is fixed at both ends.

Further, Japanese Laid-Open Patent Application Publication No. 08-220455 describes a mirror movable in two-axis directions and a display apparatus using this mirror. In this mirror and apparatus, a mirror plate made of a magnetic metal in a pan-like shape is fixed with a needle pivot by a magnetic force to a mirror bed including a magnet, and a plurality of electrodes are formed on the mirror bed. When the electrodes are applied with different voltages, a voltage difference is generated between the electrodes and the mirror plate by the action of electrostatic and the mirror plate is moved about the top of the needle pivot to come close to the electrodes. In this case, however, the mirror plate is substantially fixed to the mirror base at the needle pivot with the magnetic force. This structure is relatively complex and the mirror plate is actually not held in a completely free condition.

Due to this structure, in which the mirror plate is made of a magnetic metal, the magnet is arranged under the mirror bed, and magnetic yokes are arranged around the mirror bed, it is very difficult to make the two-axis movable mirror and the apparatus using the mirror through a micromachining process. In addition, the two-axis movable mirror and the apparatus using the mirror may emit magnetic force and the environments for these apparatuses may be limited.

SUMMARY OF THE INVENTION

In view of the foregoing, it is an object of the present invention to provide a novel method of light deflecting which reduces a mechanical stress and performs a superior light deflection.

Another object of the present invention is to provide a novel light deflecting apparatus which reduces a mechanical stress and performs a superior light deflection.

Another object of the present invention is to provide a novel light deflecting array apparatus including a plurality of light deflecting apparatuses, each of which reduces a mechanical stress and performs a superior light deflection.

Another object of the present invention is to provide a novel image forming apparatus including a latent image forming mechanism using a light deflecting array apparatus which reduces a mechanical stress and performs a superior light deflection.

Another object of the present invention is to provide a novel image projection display apparatus projecting an image on an image screen using a light deflecting array apparatus which reduces a mechanical stress and performs a superior light deflection.

Another object of the present invention is to provide a novel optical data transmission apparatus including a light switching mechanism using a light deflecting array apparatus which reduces a mechanical stress and performs a superior light deflection.

To achieve these and other objects, in one example, the present invention provides a novel method of deflecting input light in directions for at least one deflection-axis, which includes the following seven steps. A providing step provides a substrate. A forming step forms a supporting member on a surface of the substrate. A next forming step forms a plurality of electrodes at predetermined positions around the supporting member on the surface of the substrate corresponding to the directions for at least one deflection-axis. A next forming step forms a plate-like-shaped thin film member including light reflecting means disposed on a surface of the plate-like-shaped thin film member for reflecting input light. A placing step places the plate-like-shaped thin film member on the supporting member so that another surface of the plate-like-shaped thin film member opposite to the surface having the light reflecting means faces the plurality of electrodes. A forming step forms a plurality of space regulating members on edges of the surface of the substrate for regulating a space formed above the surface of the substrate in which the plate-like-shaped thin film member placed on the supporting member is freely movable. A applying step applies predetermined voltages to the plurality of electrodes to change a tilt direction of the plate-like-shaped thin film member in accordance with the voltages applied so as to deflect the input light in an arbitrary direction out of the directions for at least one deflection-axis.

The predetermined voltages may include at least one different voltage.

In the forming step of forming the supporting member, the supporting member may be formed on the surface of the substrate such that a center of gravity of the supporting member is on a normal to a center of the surface of the substrate.

In the forming step of forming the supporting member, the supporting member may be formed to have at least one slope connecting between a top portion and a bottom edge of the supporting member.

When the applying step applies the predetermined voltages to the plurality of electrodes, the plate-like-shaped thin film member may tilt in accordance with the voltages applied to come in contact with the at least one slope of the supporting member so as to deflect the input light in the arbitrary direction out of the directions for at least one deflection-axis.

To achieve the above-mentioned object, the present invention also provides a novel light deflecting apparatus deflecting input light in directions for at least one deflection-axis. In one example, a novel light deflecting apparatus includes a substrate, a supporting member, a plurality of electrodes, a plate-like-shaped member, a light reflecting member, and a plurality of space regulating member. The supporting member is formed on a surface of the substrate. The plurality of electrodes are arranged at predetermined positions around the supporting member on the surface of the substrate corresponding to the directions for at least one deflection-axis. The plate-like-shaped thin film member is placed on the supporting member so that a bottom surface of the plate-like-shaped thin film member faces the plurality of electrodes. The light reflecting member is fixed to a surface of the plate-like-shaped thin film member opposite to the bottom surface thereof, for reflecting the input light. The plurality of space regulating members are disposed on edges of the surface of the substrate for regulating a space formed above the surface of the substrate in which the plate-like-shaped thin film member placed on the supporting member is freely movable to deflect the input light in an arbitrary direction out of the directions for at least one deflection-axis.

One of the light reflecting member and the plate-like-shaped thin film member may include a conductive region facing the plurality of electrodes.

The supporting member may have at least one slope connecting between a top portion and a bottom edge thereof and the plate-like-shaped thin film member comes in contact with the at least one slope of the supporting member.

A number of the plurality of space regulating members may correspond to a contour of the plate-like-shaped thin film member and the plurality of space regulating members are arranged with a predetermined pitch.

The plate-like-shaped thin film member may be in an electrically floating status.

The plurality of electrodes may be disposed to the at least one slope of the supporting member to face the plate-like-shaped member.

The plate-like-shaped member may determine a reflection direction relative to the input light when tilting and coming in contact with the substrate by point.

The plate-like-shaped member may determine a reflection direction relative to the input light when tilting and coming in contact with the substrate by line.

The present invention also provides novel light deflecting array apparatuses. The present invention also provides novel image forming apparatuses. The present invention also provides novel image projection display apparatuses. The present invention also provides novel optical data transmission apparatuses.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
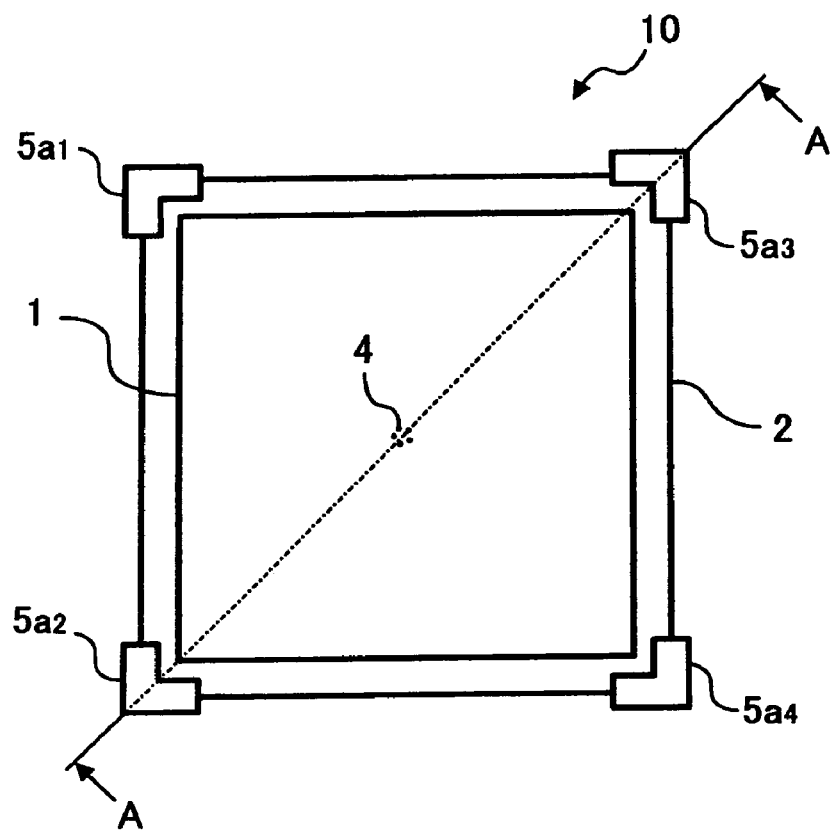
FIGS. 1 and 2 are schematic diagrams for explaining a light deflecting apparatus according to an embodiment of the present invention.
Figure 2:
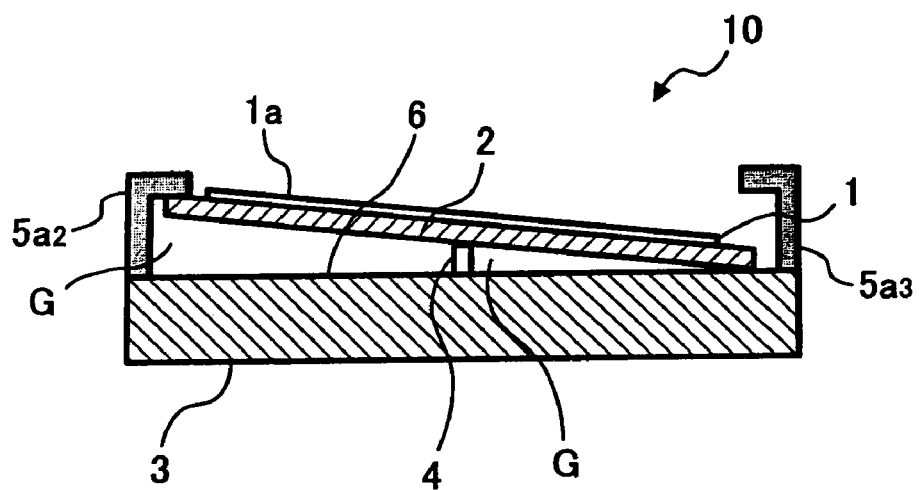

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a description is made for a light deflecting apparatus 10 according to a preferred embodiment of the present invention. FIG. 1 is a plane view of the light deflecting apparatus 10, and FIG. 2 is a cross-section view taken on line A-A of FIG. 1. The light deflecting apparatus 10 deflects input light into a signal axial reflective direction or two axial reflective directions. As shown in FIGS. 1 and 2, the light deflecting apparatus 10 includes a reflecting member 1, a plate-like-shaped member 2, a substrate 3, a supporting member 4, four pieces of angle brackets 5, and an electrode 6.

The reflecting member 1 is in a thin film shape and includes a reflecting surface 1a for efficiently reflecting input light. The reflecting member 1 is attached onto the plate-like-shaped member 2 which is hereinafter referred to simply as a plate 2. The plate 2 is in a thin film shape and has a surface onto which the reflecting member 1 is fixed. The substrate 3 is made of silicon, for example, and has a surface on which the supporting member 4 is formed. The plate 2 is placed on the supporting member 4 without being fixed to any one of the substrate 3, supporting member 4, and the angle brackets 5. The angle brackets 5 regulate a space for the plate 2 to move and are respectively referred to as angle brackets $5a_1$, $5a_2$, $5a_3$, and $5a_4$ in association with their positions, as shown in FIG. 1, for convenience sake. In some cases, the angle brackets 5 may also be referred to as space regulating members 5. The supporting member 4 is formed on the substrate 3 such that a center of gravity of the supporting member is on a normal to a center of an upper surface of the substrate 3. The supporting member 4 serves as a fulcrum for the movement of the plate 2. Thereby, the plate 2 placed thereon is freely movable about the top point of the supporting member 4 within a free space G determined by the angle brackets $5a_1$-$5a_4$ and the upper surface of the substrate 3. The electrode 6 is formed on the upper surface of the substrate 3 to surround the supporting member 4 and to face the back surface of the plate 2.

Since the plate 2 is formed in a thin film shape and therefore has a relatively light weight, an impact to the plate 2 caused by contacting the angle brackets $5a_1$-$5a_4$ during standby or the substrate 3 under operating conditions may negligibly be small. This allows the light deflecting apparatus 10 to have a stable mechanical strength for a usage over an extended period of time with lesser variations or degradation in the mechanism.

The substrate 3 is preferably, in consideration of miniaturization, a material generally for use in a semiconductor process or a liquid crystal process, such as silicon, glass, or the like.

Further, the substrate 3 may be combined with a driving circuit substrate (not shown) having a plane direction (100) to make the light deflecting apparatus 10 in a simple and lower cost structure.

The angle brackets $5a_1$-$5a_4$ have an angled top portion for stopping the plate 2 and, as described above, regulate the free space G formed by the back surface of the plate 2 and the upper surface of the substrate 3 to limit the movement of the plate 2 within the free space G. In the light deflecting apparatus 10, the numbers and the positions of the angle brackets $5a_1$-$5a_4$ correspond to the shape of the plate 2, which is in a substantially square form having four corners, to cover the entire plate 2. In other cases, the numbers and positions of the angle bracket members $5a_1$-$5a_4$ may be different to cover the entire plate 2 when the plate 2 has a different shape with a different number of corners.

The angle brackets $5a_1$-$5a_4$ are made of a silicon oxide film or a chromic oxide film, for example. Because of this thin film structure, when a one-dimensional light deflecting array (not shown) or a two-dimensional light deflecting array (not shown) is formed with a plurality of the light deflecting apparatuses 10, for example, a total reflecting area of the reflecting surfaces 1a of the reflecting members 1 can substantially be maximized. In addition, such an array can be made in a space saving fashion while having a relatively high mechanical strength.

The supporting member 4 serving as the fulcrum for the movement of the plate 2 may be formed in various shapes according to performances required to the light defecting apparatus 10, as described later. The supporting member 4 is made of a silicon oxide film or a silicon nitride film, for example, and therefore has a relatively high mechanical strength. As an alternative, the supporting member 4 may be made of a conductive material such as a metal film of various kinds to apply a potential to the plate 2 therethrough.

Figure 3:
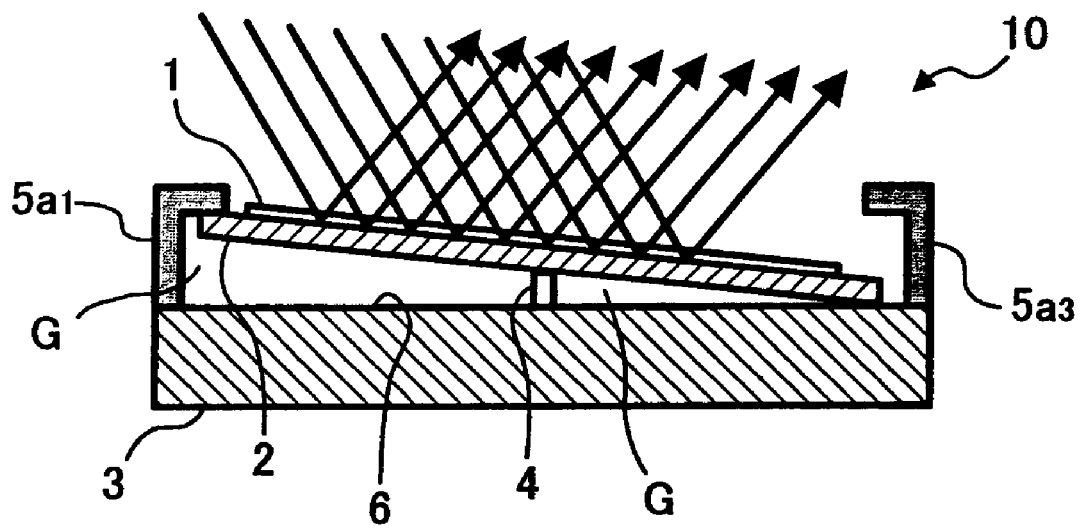
FIGS. 3 and 4 are schematic diagrams for explaining a light reflecting function of a plate included in the light deflecting apparatus of FIG. 1.
Figure 4:
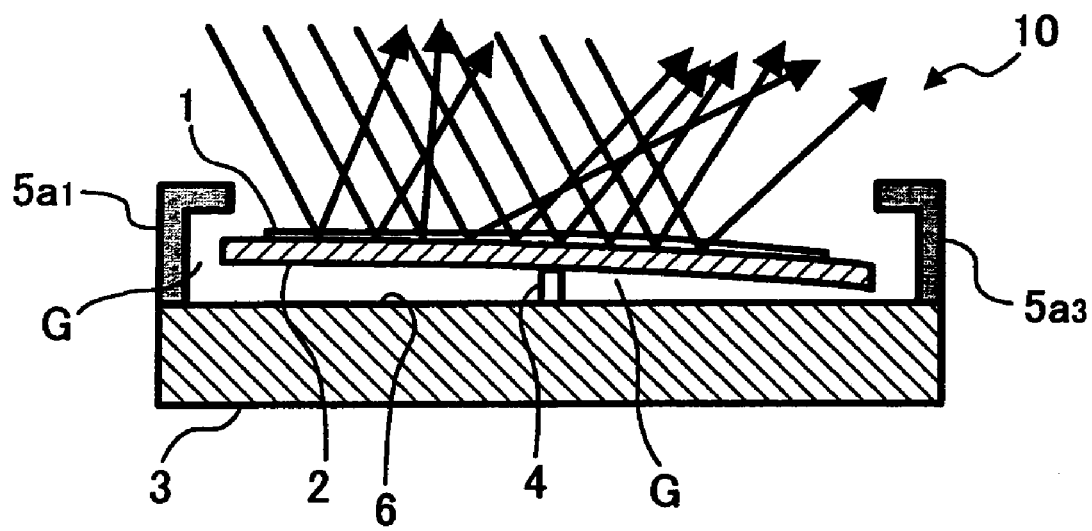

Referring to FIGS. 3 and 4, a light reflection of the light deflecting apparatus 10 is explained. FIGS. 3 and 4 diagrammatize manners of light reflection by the light deflecting apparatus 10 when the reflecting surface 1a of the reflecting member 1 is plane and convex, respectively, for example.

As shown in FIG. 3, when the reflecting surface 1a is plane, light rays entering the light reflection area of the light reflecting surface 1a are reflected in one direction, i.e., in an intended direction, without causing a dispersion of the light rays in reflection. This feature avoids an adverse effect to adjacent optical devices and is therefore important in particular when the light deflecting apparatus 10 is employed in optical equipment such as an optical information processing apparatus, an image forming apparatus (e.g., an image forming apparatus 200 explained later with reference to FIG. 81), an image projection display apparatus (e.g., an image projection display apparatus 300 explained later with reference to FIG. 82), an optical transmission apparatus (e.g., an optical data transmission apparatus 400 explained later with reference to FIG. 83), and so forth.

As for planeness of the reflecting surface 1a of the reflecting member 1, a radius of curvature with respect to the reflecting surface 1a is required to be a few meters or greater.

When the reflecting surface 1a is convex, light rays entering the light reflection area of the reflecting surface 1a are reflected and dispersed in various directions, as shown in FIG. 4, causing an adverse effect to adjacent optical devices. This adverse effect becomes severely problematic particularly in optical equipment such as an image forming apparatus (e.g., the image forming apparatus 200 explained later with reference to FIG. 81), an image projection display apparatus (e.g., the image projection display apparatus 300 explained later with reference to FIG. 82), and so forth in which the reflected light rays are processed to perform an optical recording or displaying by an optical scaling system.

Figure 5:
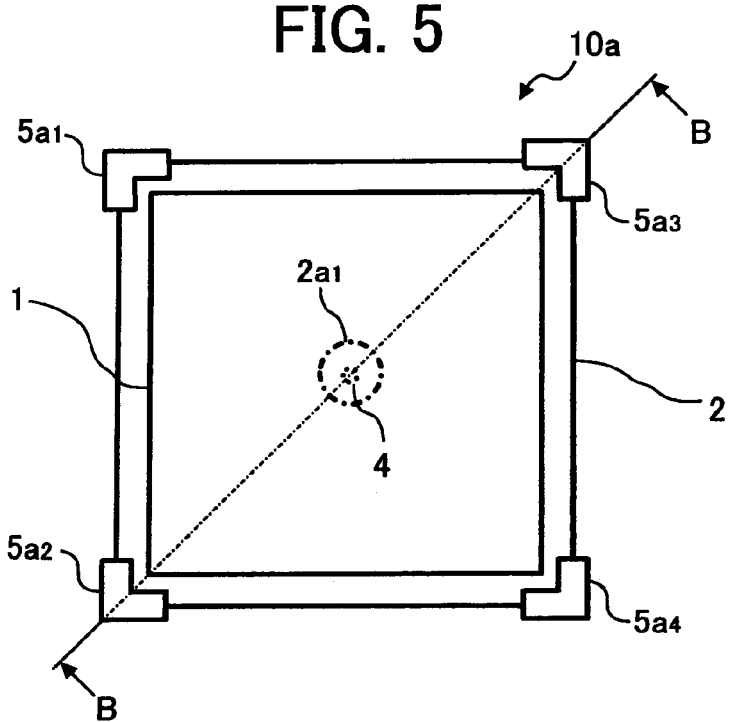
FIGS. 5-7 are schematic diagrams of a light deflecting apparatus according to another embodiment of the present invention.
Figure 6:
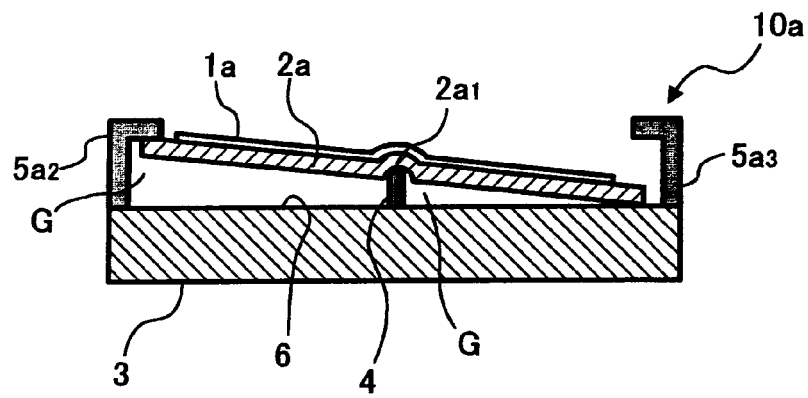
Figure 7:
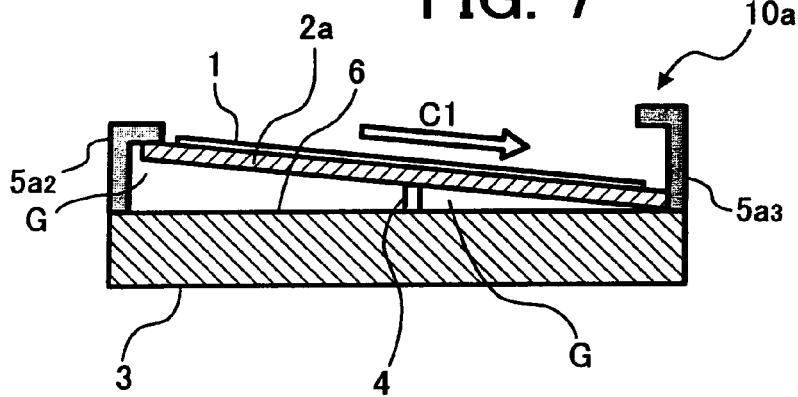

Referring to FIGS. 5-7, a light deflecting apparatus 10a according to another preferred embodiment of the present invention is explained. FIG. 5 is a plane view of the light deflecting apparatus 10a, and FIG. 6 is a cross-section view of the light deflecting apparatus 10a taken on line B-B of FIG. 5. The light deflecting apparatus 10a of FIG. 5 is an apparatus modified on the basis of the light deflecting apparatus 10 of FIG. 1, that is, the plate 2 is modified to a plate 2a having a relatively small convex portion $2a_1$ at substantially a central position thereof in contact with the supporting member 4.

With the above-mentioned convex portion $2a_1$ arranged at the position in contact with the supporting member 4, the plate 2a is movable about this convex portion $2a_1$ without causing displacement in a surface direction when moving due to an electrostatic attraction, for example. That is, the convex portion $2a_1$ is determined by itself as the center of the movement with respect to the plate 2a.

With this feature, the plate 2a is prevented from contacting vertical surfaces of the angle brackets $5a_1$-$5a_4$ when moving in the free space G, as shown in FIG. 6.

When the plate 2a does not have the convex portion $2a_1$, as shown in FIG. 7, the plate 2a may displace in a direction indicated by an arrow C1 and therefore the reflection performance of the light deflecting apparatus 10a is degraded. Moreover, this displacement may accelerate a mechanical wearing of the plate 2a and the supporting member 4, resulting in weakening the mechanical strength.

Figure 8:
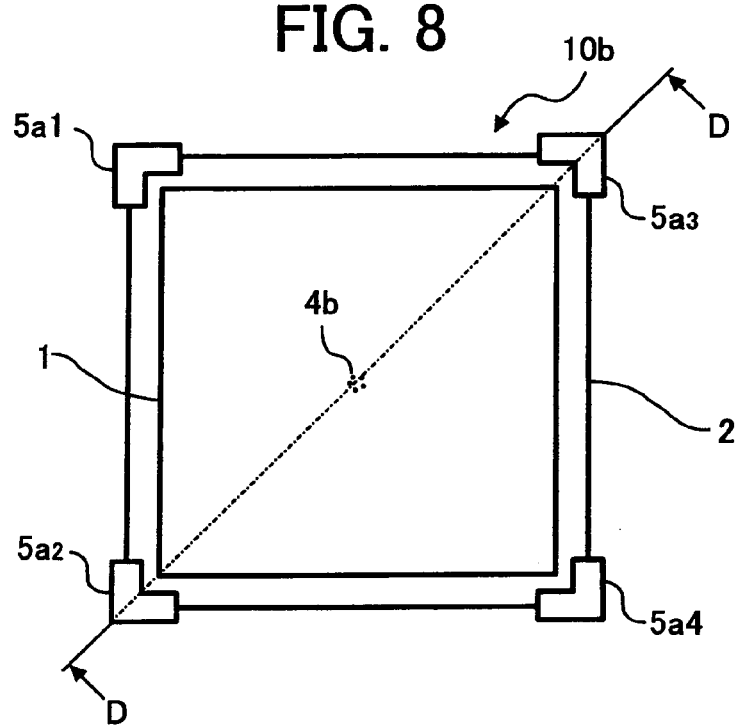
FIGS. 8-11 are schematic diagrams of a light deflecting apparatus according to another embodiment of the present invention.
Figure 9:
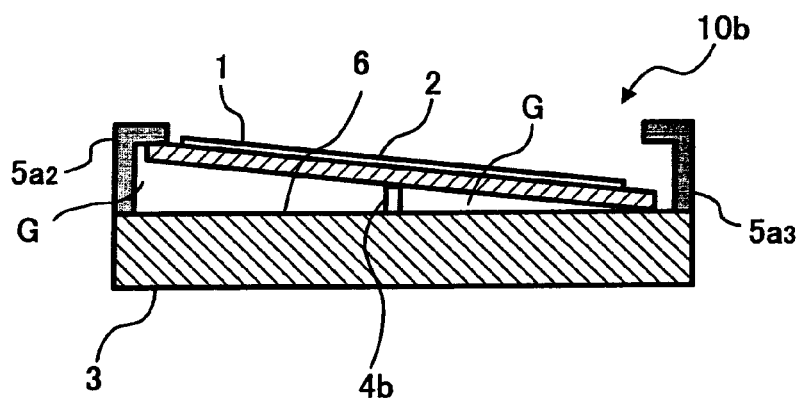

Referring to FIGS. 8-11, a light deflecting apparatus 10b according to another preferred embodiment of the present invention is explained. FIG. 8 is a plane view of the light deflecting apparatus 10b, and FIG. 9 is a cross-section view of the light deflecting apparatus 10b taken on line D-D of FIG. 8.

Figure 10:
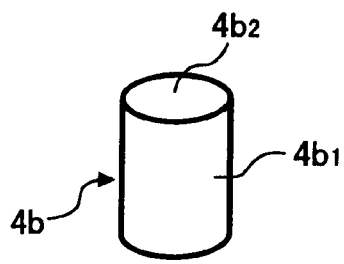

The light deflecting apparatus 10b of FIG. 8 is an apparatus modified on the basis of the light deflecting apparatus 10 of FIG. 1, that is, the supporting member 4 is modified to a supporting member 4b having a cylindrical cross section $4b_1$ and a circular top surface $4b_2$, as shown in FIG. 10. Accordingly, the plate 2 is supported directly by the circular top surface $4b_2$ of the supporting member 4b. The supporting member 4b is made of a silicon oxide film or a silicon nitride film, for example, and therefore it may have a relatively high mechanical strength. As an alternative, the supporting member 4b may be made of a conductive material such as a metal film of various kinds to apply a potential to the plate 2 therethrough.

Figure 11:
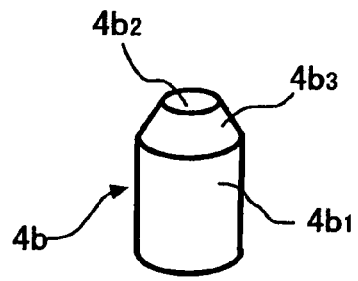

As shown in FIG. 11, the supporting member 4b may have a tapered portion $4b_3$ immediately adjacent to the circular top surface $4b_2$ so as to reduce the area of the circular top surface $4b_2$.

With the supporting member 4b having the circular top surface $4b_2$, the plate 2 carrying the reflecting member 1 thereon can easily be tilted in an arbitrary direction corresponding to a direction in which an electrostatic attraction acts. Further, the reduction of the area of the circular top surface 4b2 facilitates the light deflection in the two axial directions.

Figure 12:
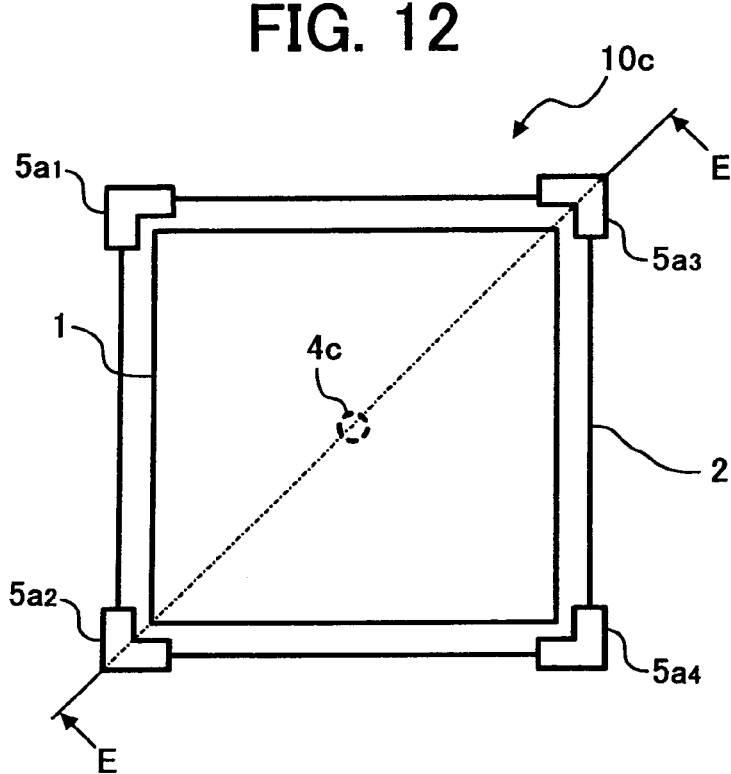
FIGS. 12-15 are schematic diagrams of a light deflecting apparatus according to another embodiment of the present invention.
Figure 13:
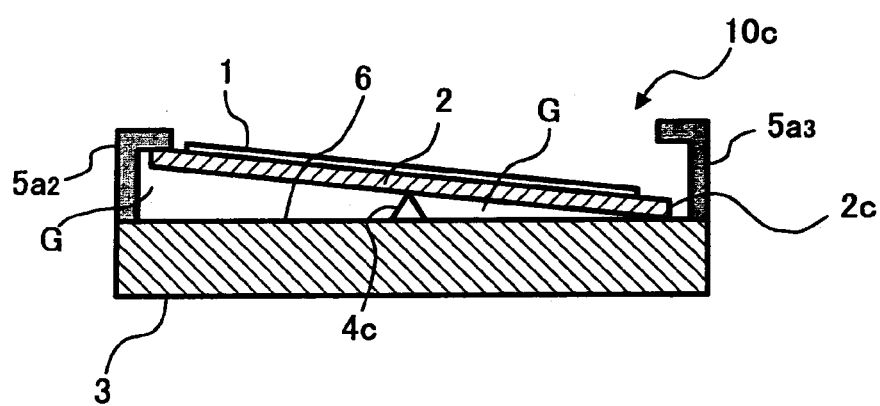
Figure 14:
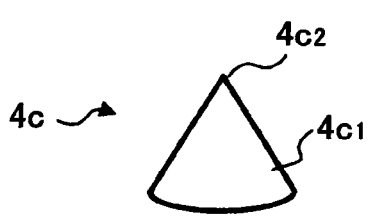

Referring to FIGS. 12-15, a light deflecting apparatus 10c according to another preferred embodiment of the present invention is explained. FIG. 12 is a plane view of the light deflecting apparatus 10c, and FIG. 13 is a cross-section view of the light deflecting apparatus 10c taken on line E-E of FIG. 12. The light deflecting apparatus 10c of FIG. 12 is an apparatus modified on the basis of the light deflecting apparatus 10 of FIG. 1, that is, the supporting member 4 is modified to a supporting member 4c having a conical shape $4c_1$ and a pointed top $4c_2$, as shown in FIG. 14. Accordingly, the plate 2 is supported directly by the pointed top $4c_2$ of the supporting member 4c. The supporting member 4c is made of a silicon oxide film or a silicon nitride film, for example, and therefore has a relatively high mechanical strength. As an alternative, the supporting member 4c may be made of a conductive material such as a metal film of various kinds to apply a potential to the plate 2 therethrough.

Figure 15:
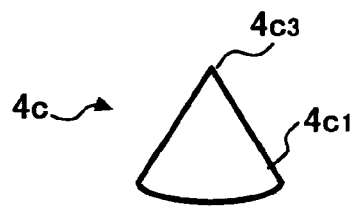

As shown in FIG. 15, the supporting member 4c may have a rounded top $4c_3$ instead of the pointed top $4c_2$.

With the supporting member 4c having the conical shape $4c_1$, a bottom side of the supporting member 4c contacting the substrate 3 has a relatively high mechanical strength. In addition, by reducing a contact area between the plate 2 and the supporting member 4c, the plate 2 may be prevented from attaching to the surface of the substrate 3 or receiving a charge from the substrate 3. This is because the plate 2 has one end, e.g., an end 2c, contacting an upper surface of the substrate 3 by which the movement of the plate 2 is regulated. Further, because of this structure that the supporting member 4c has the pointed top $4c_2$ and supports the plate 2 with it, the plate 2 can easily be tilted in an arbitrary direction corresponding to a direction in which an electrostatic attraction acts.

Figure 16:
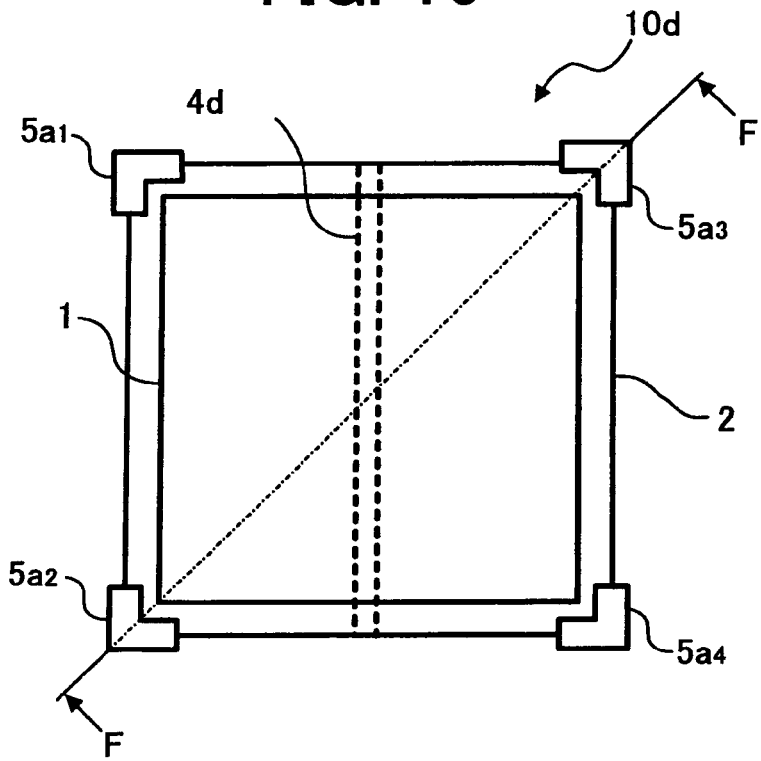
FIGS. 16-18 are schematic diagrams of a light deflecting apparatus according to another embodiment of the present invention.
Figure 17:
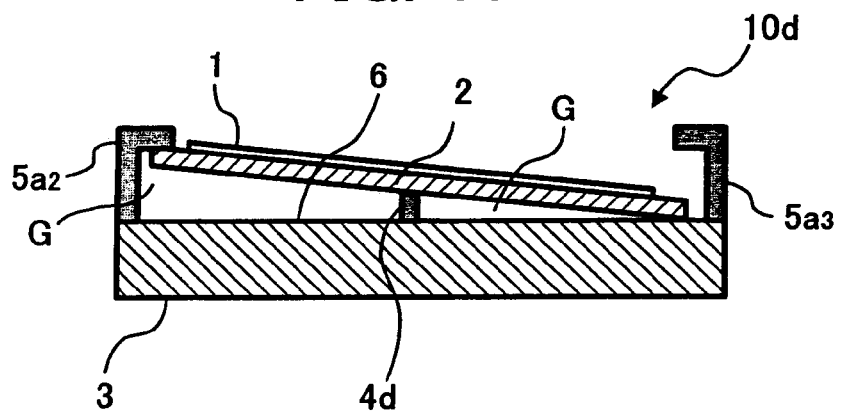
Figure 18:
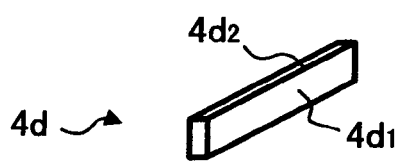

Referring to FIGS. 16 and 17, a light deflecting apparatus 10d according to another preferred embodiment of the present invention is explained. FIG. 16 is a plane view of the light deflecting apparatus 10d, and FIG. 17 is a cross-section view of the light deflecting apparatus 10d taken on line F-F of FIG. 16. The light deflecting apparatus 10d of FIG. 16 is an apparatus modified on the basis of the light deflecting apparatus 10 of FIG. 1, that is, the supporting member 4 is modified to a supporting member 4d having a rectangular solid shape $4d_1$ and a rectangular surface $4d_2$, as shown in FIG. 18. Accordingly, the plate 2 is supported directly by the rectangular surface $4d_2$ of the supporting member 4d. The supporting member 4d is made of a silicon oxide film or a silicon nitride film, for example, and therefore has a relatively high mechanical strength. As an alternative, the supporting member 4d may be made of a conductive material such as a metal film of various kinds to apply a potential to the plate 2 therethrough.

Because of this structure in that the supporting member 4d having the rectangular surface $4d_2$, the plate 2 can easily be tilted in a direction parallel to the rectangular surface $4d_2$. That is, the plate 2 can easily be tilted in a one-axial direction according to an electrostatic attraction in a stable manner.

Figure 19:
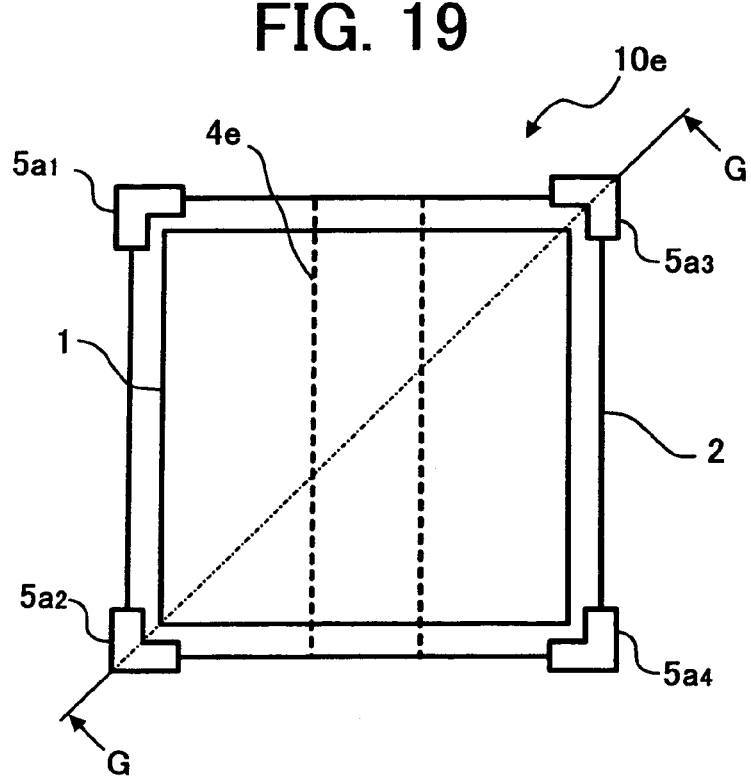
FIGS. 19-22 are schematic diagrams of a light deflecting apparatus according to another embodiment of the present invention.
Figure 20:
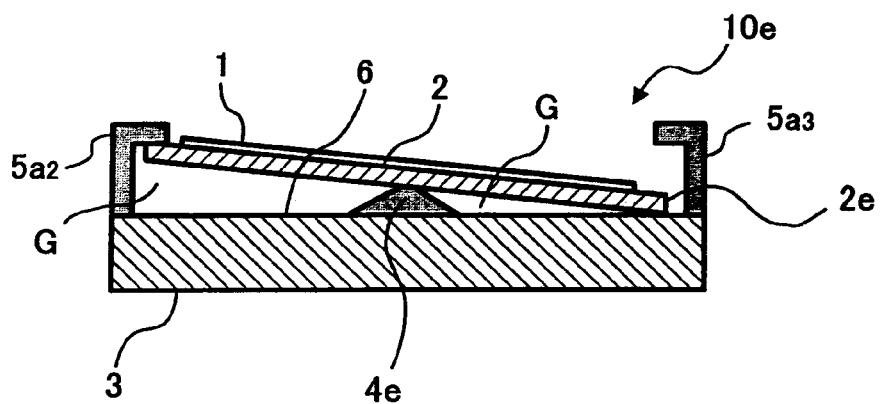
Figure 21:
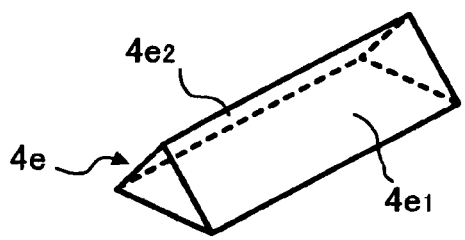

Referring to FIGS. 19-22, a light deflecting apparatus 10e according to another preferred embodiment of the present invention is explained. FIG. 19 is a plane view of the light deflecting apparatus 10e, and FIG. 20 is a cross-section view of the light deflecting apparatus 10e taken on line G-G of FIG. 19. The light deflecting apparatus 10e of FIG. 19 is an apparatus modified on the basis of the light deflecting apparatus 10 of FIG. 1, that is, the supporting member 4 is modified to a supporting member 4e having a prism shape $4e_1$ and an edged ridgeline $4e_2$, as shown in FIG. 21. Accordingly, the plate 2 is supported directly by the edged ridgeline $4e_2$ of the supporting member 4e. The supporting member 4e is made of a silicon oxide film or a silicon nitride film, for example, and therefore has a relatively high mechanical strength. As an alternative, the supporting member 4e may be made of a conductive material such as a metal film of various kinds to apply a potential to the plate 2 therethrough.

Figure 22:
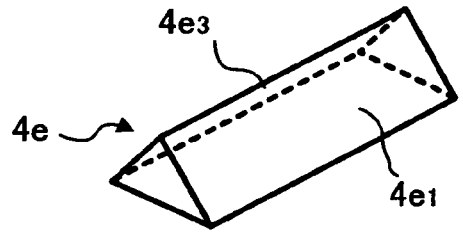

As shown in FIG. 22, the supporting member 4e may have a rounded ridgeline 4e3 instead of the edged ridgeline $4e_2$.

With the supporting member 4e having the prism shape $4e_1$, a bottom side of the supporting member 4e contacting the substrate 3 has a relatively high mechanical strength. In addition, by reducing a contact area between the plate 2 and the supporting member 4e, the plate 2 may effectively be prevented from attaching to the surface of the substrate 3 or receiving a charge from the substrate 3. This is because the plate 2 has one end, e.g., an end 2e, contacting an upper surface of the substrate 3 by which the movement of the plate 2 is regulated. Further, because of this structure that the supporting member 4e has the edged ridgeline $4e_1$ and supports the plate 2 with it, a contacting portion between the plate 2 and the supporting member 4e is relatively small and therefore the plate 2 can easily be tilted according to an electrostatic attraction in a one-axial direction in a stable manner.

Figure 23:
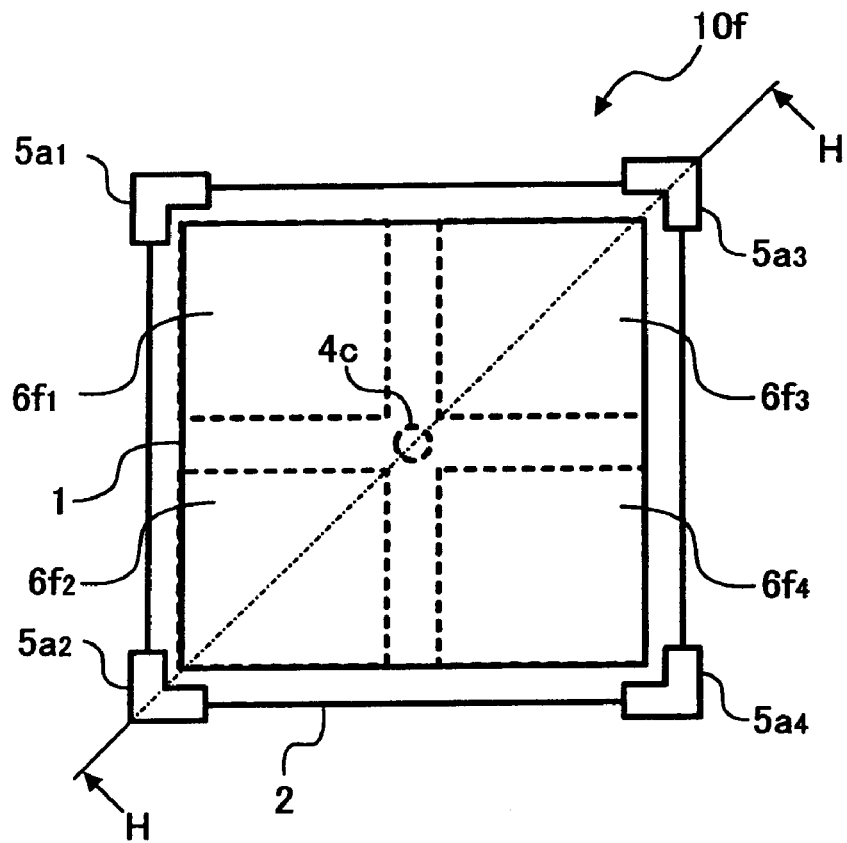
FIGS. 23 and 24 are schematic diagrams of a light deflecting apparatus according to another embodiment of the present invention.
Figure 24:
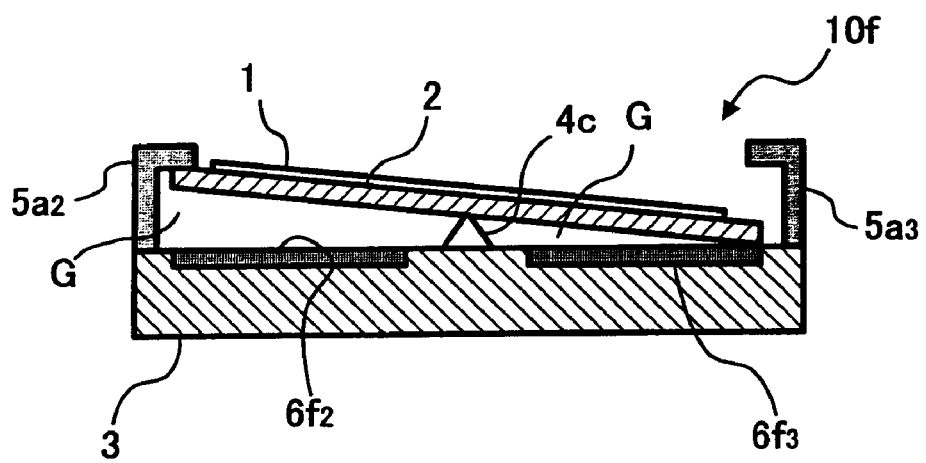

Referring to FIGS. 23 and 24, a light deflecting apparatus 10f according to another preferred embodiment of the present invention is explained. FIG. 23 is a plane view of the light deflecting apparatus 10f, and FIG. 24 is a cross-section view of the light deflecting apparatus 10f taken on line H-H of FIG. 23. The light deflecting apparatus 10f of FIG. 23 is an apparatus modified on the basis of the light deflecting apparatus 10c of FIG. 12, that is, the electrode 6 is divided into four electrodes $6f_1$-$6f_4$, as shown in FIG. 23. In the light deflecting apparatus 10f of FIG. 23, the electrodes $6f_1$-$6f_4$ are formed on the substrate 3 in a symmetrical arrangement relative to the supporting member 4c which supports the electrically floating plate 2. The electrodes $6f_1$-$6f_4$ are preferably made of metal such as aluminum metal, titan nitride, or titan, for example, to have a superior conductivity.

With this structure, when the electrodes $6f_1$-$6f_4$ are provided with different potentials, such differences in potentials among the electrodes $6f_1$-$6f_4$ will cause an electrostatic attraction force which acts between the plate 2 and the electrodes $6f_1$-$6f_4$, resulting in a movement of the plate 2 in an arbitrary direction.

In addition, the plate 2 settled in one direction can quickly be moved and settled in another arbitrary direction by changing the respective potentials of the electrodes $6f_1$-$6f_4$.

Although the electrode 6 is divided into the electrodes $6f_1$-$6f_4$, as described above, the division of the electrode 6 is not limited to that and the electrode 6 may preferably be divided into at least two pieces.

Further, with this structure, potential differences can arbitrarily be generated among the electrodes $6f_1$-$6f_4$ so as to control the tilt of the plate 2 in two axial directions in a precise manner. Thereby, the light deflecting apparatus 10f can stably perform the light deflecting in a quick and responsive manner with relatively simple structure and control.

Figure 25:
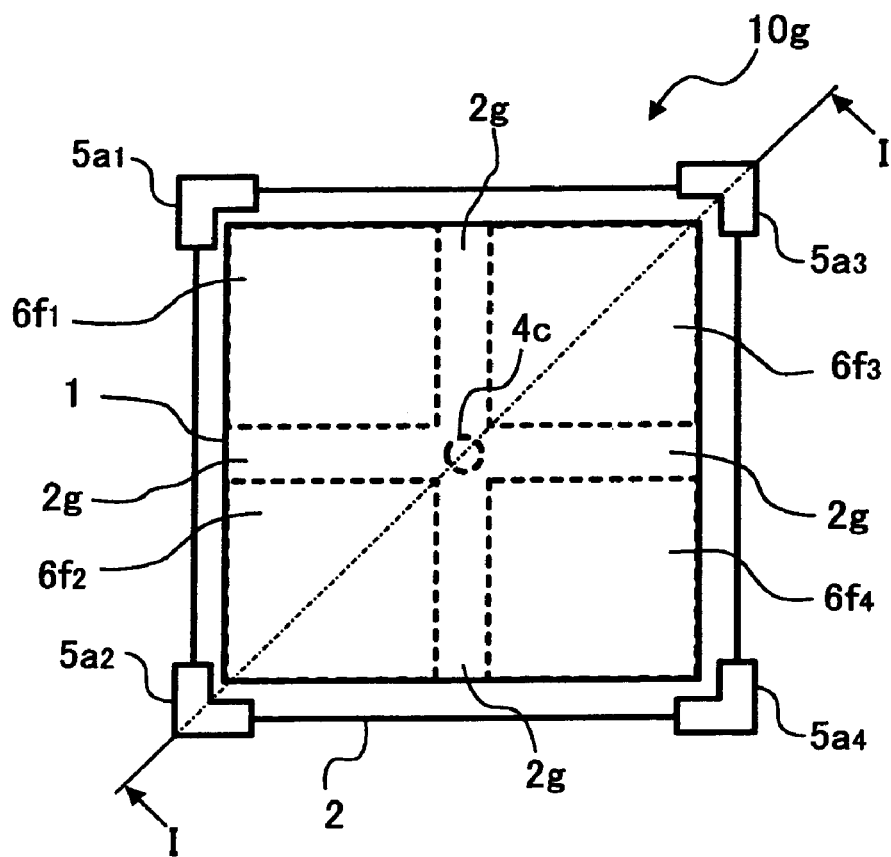
FIGS. 25 and 26 are schematic diagrams of a light deflecting apparatus according to another embodiment of the present invention.
Figure 26:
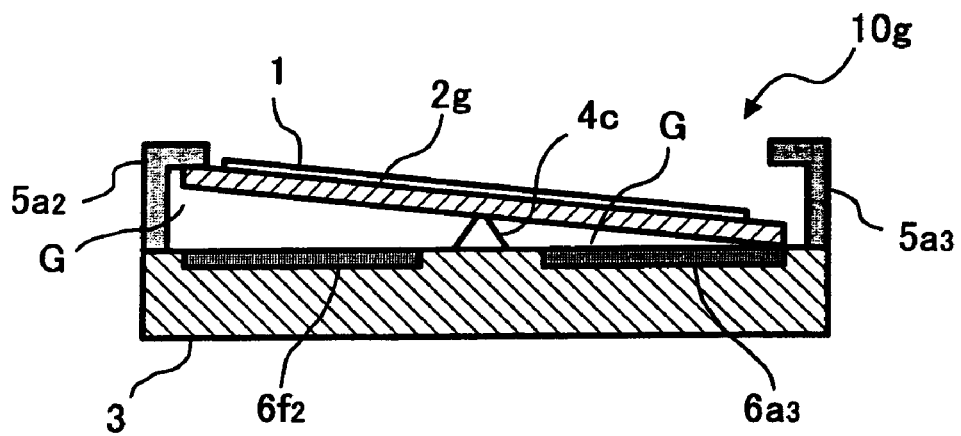

Referring to FIGS. 25 and 26, a light deflecting apparatus 10g according to another preferred embodiment of the present invention is explained. FIG. 25 is a plane view of the light deflecting apparatus 10g, and FIG. 26 is a cross-section view of the light deflecting apparatus 10g taken on line I-I of FIG. 25. The light deflecting apparatus 10g of FIG. 25 is an apparatus modified on the basis of the light deflecting apparatus 10f of FIG. 23, that is, the reflecting surface 1a of the reflecting member 1 or at least a part of the plate 2 includes a conductive area 2g in the light reflecting area thereof such that at least a part of the conductive area 2g faces the electrodes $6f_1$-$6f_4$. The conductive area 2g preferably is made of metal such as aluminum metal, titan nitride, or titan, for example, to have a superior conductivity. When the plate 2 combines the light reflecting area of the reflecting surface 1a of the reflecting member 1 to reduce the cost, the plate 2 preferably has an upper surface made of aluminum metal, in particular, for a superior light reflecting nature.

With this structure, an electrostatic attraction force acting between the plate 2 and the electrodes $6f_1$-$6f_4$ can be generated by an application of relatively low driving voltages to the electrodes $6f_1$-$6f_4$, thereby moving the plate 2 in an arbitrary direction.

In addition, the plate 2 settled in one direction can quickly be moved and settled in another arbitrary direction by changing the respective potentials of the electrodes $6f1$-$6f4$.

Further, with this structure, potential differences can arbitrarily be generated among the electrodes $6f_1$-$6f_4$ so as to control the tilt of the plate 2 in two axial directions in a precise manner.

Figure 27:
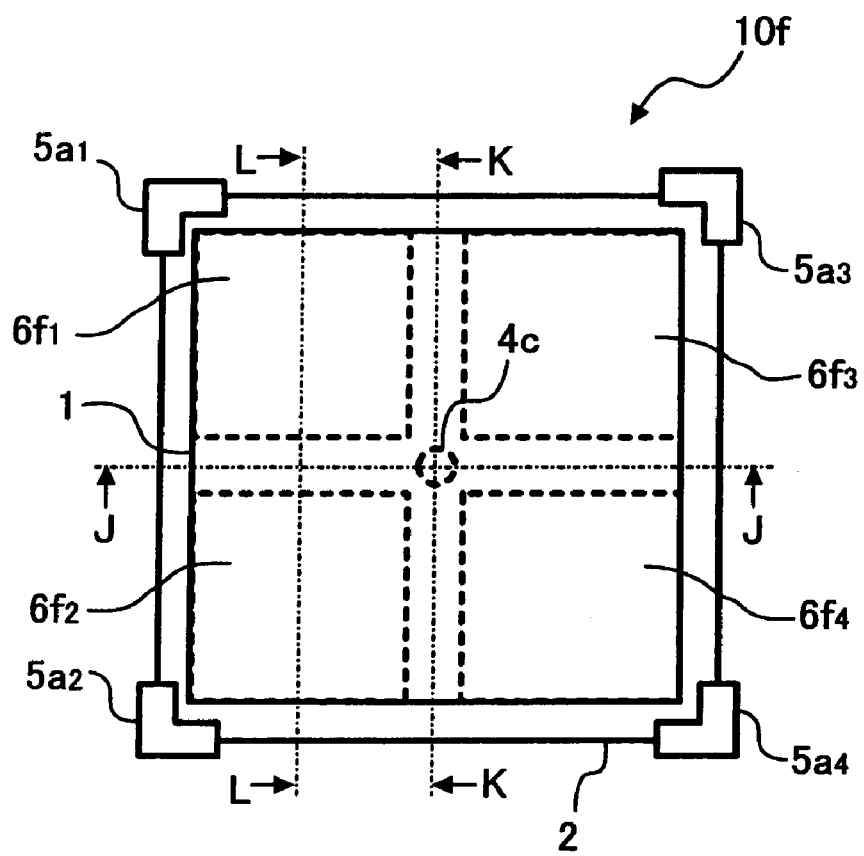
FIGS. 27-35 are schematic diagrams for explaining a principle of a light deflecting operation performed by the light deflecting apparatus of FIG. 23.
Figure 28:
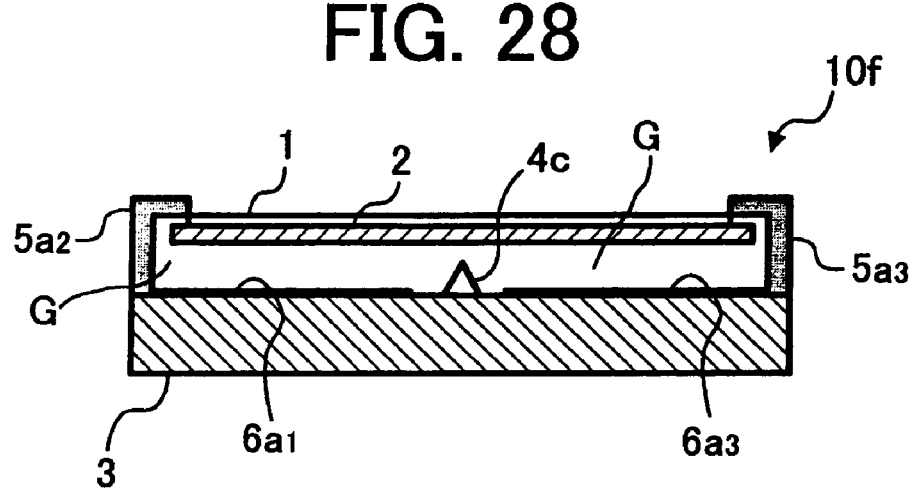

Next, operations of the light deflecting apparatus 10f shown in FIG. 23 are explained with reference to FIGS. 27-34. In FIG. 27, the view of the light deflecting apparatus 10f is provided with cross section lines J-J, K-K, and L-L which are used in the detailed discussion below. As indicated in a cross section view of FIG. 28, taken on line J-J of FIG. 27, the light deflecting apparatus 10f is in a floating status, having no portion thereof contacting neither the substrate 3 or the supporting member 44. The view of FIG. 28 is virtually made, for the sake of clarity, to demonstrate a condition when the light deflecting apparatus 10f is in an initial status, in consideration of the nature that the plate 2 is freely movable in the free space G.

Figure 29:
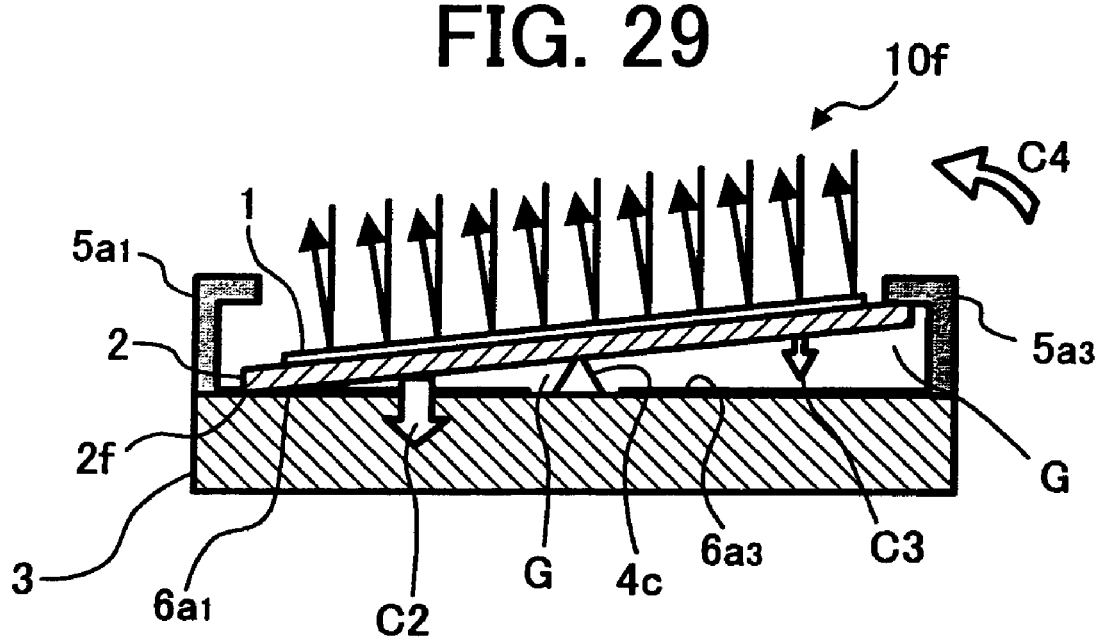
Figure 30:
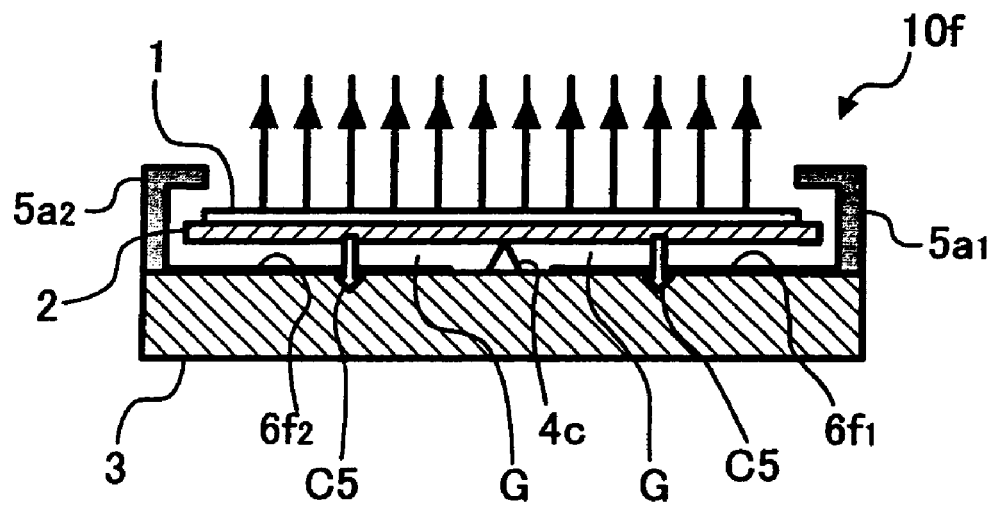

FIGS. 29 and 30 are cross section views taken on lines J-J and K-K, respectively, demonstrating a reset operation of the light deflecting apparatus 10f. When the light deflecting apparatus 10f settled in the initial status performs the reset operation, the plate 2 is moved from the position in the initial status of FIG. 28 to a reset position, as shown in FIGS. 29 and 30. In the reset position, the plate 2 is supported by the supporting member 4c at a central position of the plate 2 and has at least one edge portion, e.g., an edge portion 2f shown in FIG. 29, contacting the substrate 3.

In the reset operation, the electrodes $6f_1$-$6f_4$ are applied with the following exemplary voltages:

$6f_1$; X volts,
$6f_2$; 0 volts,
$6f_3$; X/2 volts, and
$6f_4$; X/2 volts.

With the application of these voltages, an electrostatic attraction force is generated between the plate 2 and the electrodes $6f_1$-$6f_4$ in a direction indicated by arrows C2 and C3, as shown in FIG. 29. The arrows C2 and C3 indicate not only directions but also magnitudes of the electrostatic attraction force by size of arrows, as the electrostatic attraction force varies depending upon a position of the plate 2. Accordingly, the arrows C2 and C3 in FIG. 29 indicate that magnitudes of the electrostatic attraction force acting between the plate 2 and the substrate 3 are uneven and therefore the plate 2 is tilted in a direction of arrow C4 due to this unevenness of the force. FIG. 30 shows this tilting movement from a 90-degree different angle which is the view taken on line K-K. In FIG. 30, as arrows C5 indicates, the electrostatic attraction force evenly acts between the plate 2 and the substrate 3, and therefore the movement of the plate 2 is not seen in the view of FIG. 30.

From the views of FIGS. 29 and 30, it is understand that the plate 2 is tilted about a first axis on line K-K. Thus, the angle of the plate 2 is changed and the light reflecting area in the light reflecting portion 1b of the light reflecting member 1 changes its light reflecting angle in a desired direction. This desired direction is referred to as a reset direction and, when the plate 2 is tilted in the reset direction, the light deflecting apparatus 10f is said to be in a reset status.

The voltage X is determined according to various factors including distances between the plate 2 and each of the electrodes $6f_1$-$6f_4$ and capacitances of the plate 2 and the electrodes $6f_1$-$6f_4$, for example. This voltage X required in the reset operation is slightly greater than a voltage Y required in a regular tilting operation in which the plate 2 supported by the supporting member 4c is tilted.

In the subsequent drawings including FIGS. 31-35, arrows for indicating directions and magnitudes of the electrostatic attraction force are not given reference labels such as the arrows C2 and C3 or the arrow C5, for example, since the purpose of these arrows is clear.

Figure 31:
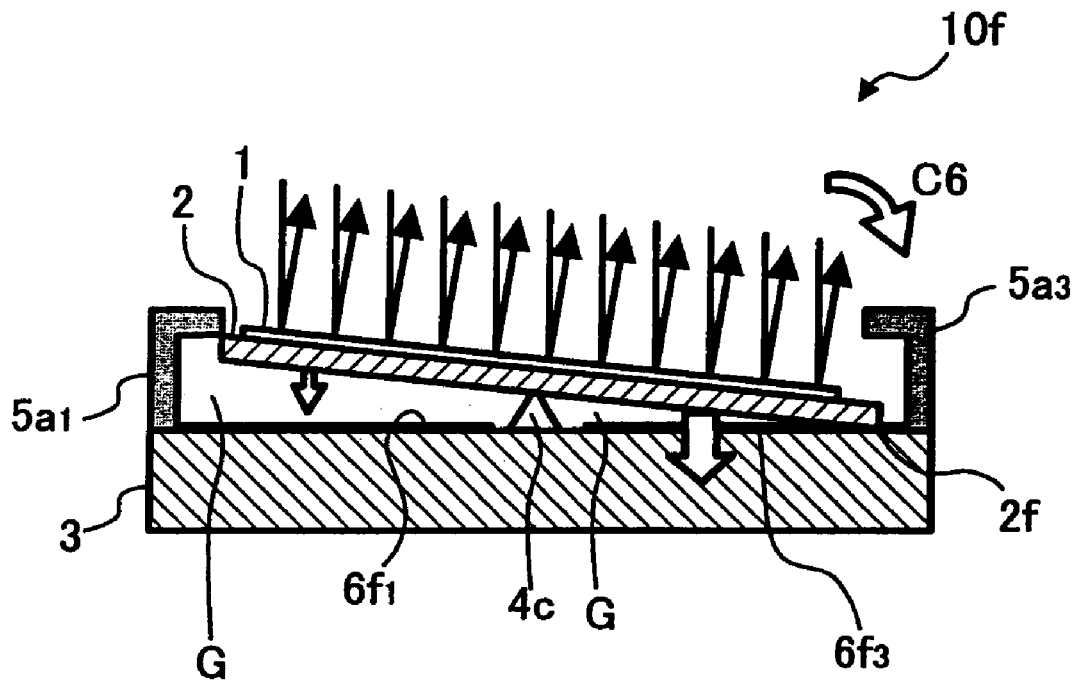
Figure 32:
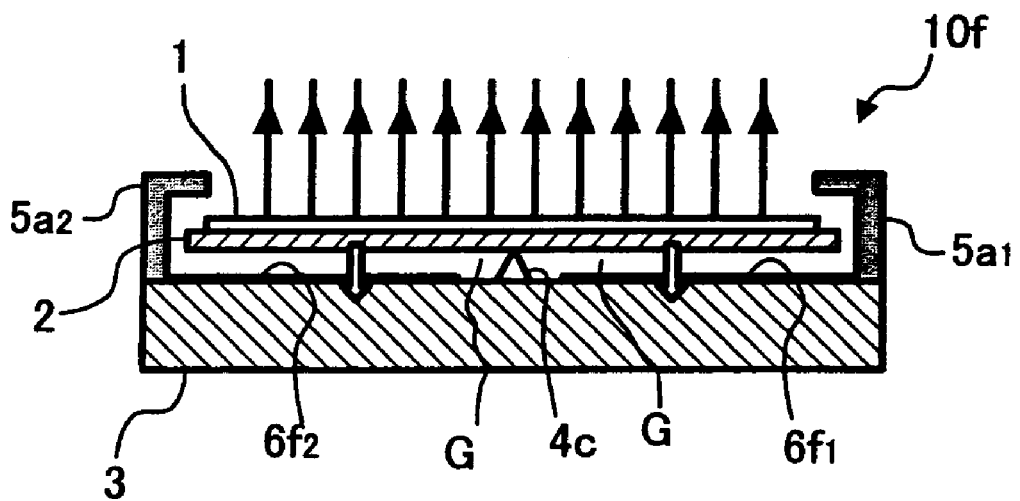

FIGS. 31 and 32 are cross section views of the light deflecting apparatus 10f, taken on lines J-J and K-K, respectively, demonstrating a first operation of the light deflecting apparatus 10f. When the light deflecting apparatus 10f settled in the reset status shown in FIGS. 29 and 30 performs the first operation, the plate 2 is tilted in a direction of an arrow C6, as shown in FIG. 31, and changes its position from the position in the reset status of FIGS. 29 and 30 to a first position shown in FIGS. 31 and 32. The direction of the arrow C6 of FIG. 31 is a reverse direction relative to the direction of the arrow C4 of FIG. 29, and this tilting movement of the plate 2 shown in FIGS. 31 and 32 is made about the same first axis on line K-K, as in the case shown in FIGS. 29 and 30. The position to which the plate 2 moves through the first operation is referred to as a first position. In the first position, the plate 2 is supported by the supporting member 4c at the central position of the plate 2 and has at least one edge portion (e.g., the portion 2f) contacting the substrate 3.

Thus, the light deflecting apparatus 10f can change the direction of the light deflection with the first axis.

In the first operation, the electrodes $6f_1$-$6f_4$ are applied with the following exemplary voltages:

$6f_1$; Y/2 volts,
$6f_2$; Y/2 volts, $6f_3$; Y volt, and
$6f_4$; 0 volts.

Figure 33:
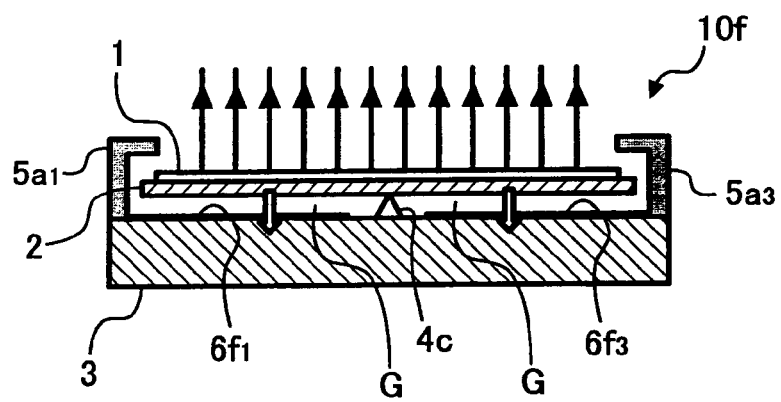
Figure 34:
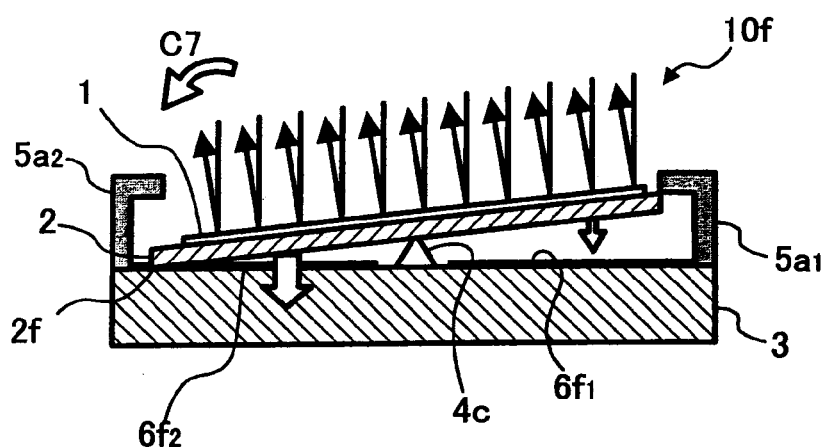

FIGS. 33 and 34 are cross section views of the light deflecting apparatus 10f, taken on lines J-J and K-K, respectively, demonstrating a second operation of the light deflecting apparatus 10f. When the light deflecting apparatus 10f settled in the reset status shown in FIGS. 29 and 30 performs the second operation, the plate 2 is tilted in a direction of an arrow C7, as shown in FIG. 34, and changes its position from the position in the reset status of FIGS. 29 and 30 to a second position shown in FIGS. 33 and 34. In this case, the tilting movement of the plate 2 shown in FIGS. 33 and 34 is made about a second axis on line J-J. The position to which the plate 2 moves through the second operation is referred to as a second position. In the second position, the plate 2 is supported by the supporting member 4c at the central position of the plate 2 and has at least one edge portion (e.g., the portion 2f) contacting the substrate 3.

Thus, the light deflecting apparatus 10f can change the direction of the light deflection with the second axis.

In the second operation, the electrodes $6f_1$-$6f_4$ are applied with the following exemplary voltages:
$6f_1$; Y/2 volts,
$6f_2$; 0 volts,
$6f_3$; Y/2 volts, and
$6f_4$; Y volt.

As described above, the light deflecting apparatus 10f can change the direction of the light deflection with the first and second axes by the first and second operations applying the above-described predetermined voltages to the electrodes $6f_1$-$6f_4$.

Figure 35:
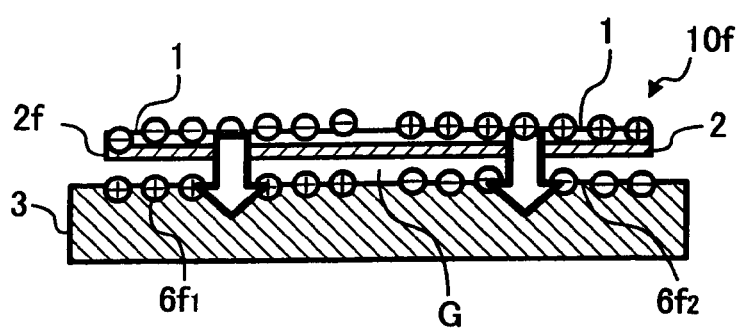

With reference to FIG. 35, the principle of the electrostatic attraction is explained. FIG. 35 is a cross section view of the light deflecting apparatus 10f, for example, taken on line L-L of FIG. 27. In FIG. 35, the light deflecting apparatus 10f is in the reset operation, applying a positive voltage of X volts to the electrode $6f_1$ and a voltage of 0 volts to $6f_2$.

Initially, the plate 2 is electrically floated. When the positive voltage is applied to the electrode $6f_1$, the electrode $6f_1$ will have positive charges and consequently negative charges appear in a portion of the plate 2 facing the electrode $6f_1$ in a dielectric manner via the free space G. At this time, if the plate 2 has a conductive area, the negative charges are effectively dispersed in the plate 2 through the conductive area. Thereby, an electrostatic attraction force is generated between the electrode $6f_1$ and the corresponding portion of the plate 2.

On the other hand, the generation of the negative charges in the plate 2 cause a generation of positive charges in a portion of the plate 2 facing the electrode $6f_2$ and the generated positive charges will spread in the plate 2 through the conductive area. Then, in response to the positive charges, negative charges appear on the electrode $6f_2$. Therefore, an electrostatic attraction force is also generated between the electrode $6f_2$ and the corresponding portion of the plate 2.

In this way, the electrostatic attraction is generated between the plate 2 and the electrodes $6f_1$ and $6f_2$, for example.

The above-described steps in the generation of the electrostatic attraction actually proceed substantially in a simultaneous fashion in response to the voltage difference between the electrodes $6f_1$ and $6f_2$.

In addition, the electrically floating plate 2 including the conductive area has a certain voltage determined between the voltages of the electrodes $6f_1$ and $6f_2$. Accordingly, the voltage difference between the certain voltage and the voltage of the electrode $6f_1$ generates the electrostatic attraction and also the voltage difference between the certain voltage and the voltage of the electrode $6f_2$ generates the electrostatic attraction. This certain voltage may vary mainly according to structural factors including areas of the free space G and the electrodes $6f_1$ and $6f_2$, for example.

Figure 36:
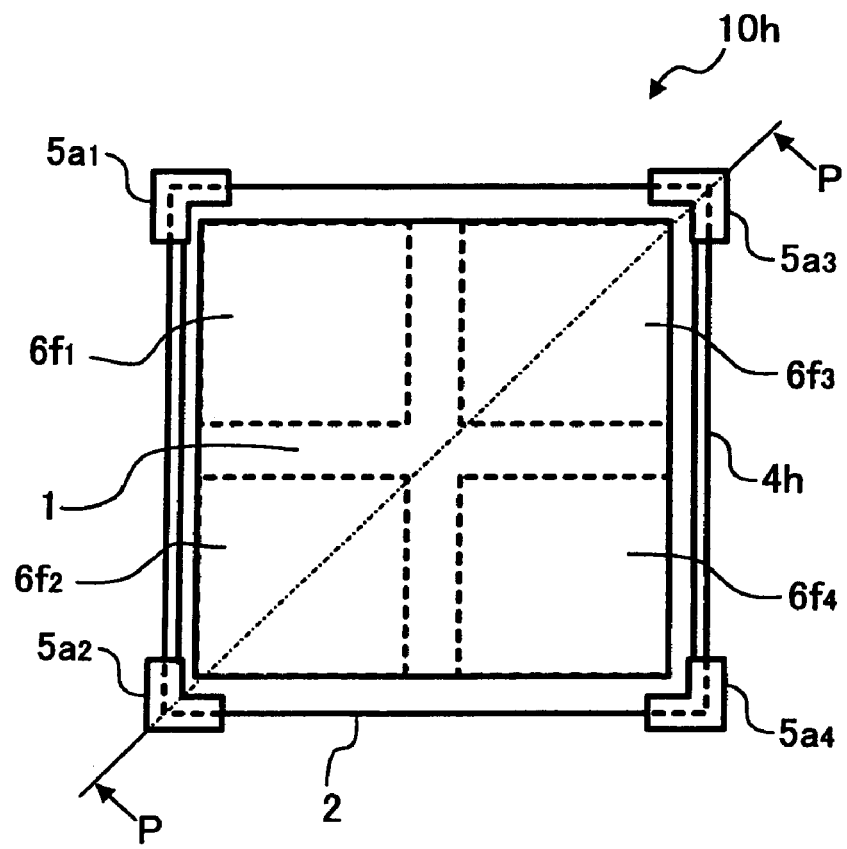
FIGS. 36 and 37 are schematic diagrams of a light deflecting apparatus according to another embodiment of the present invention.
Figure 37:
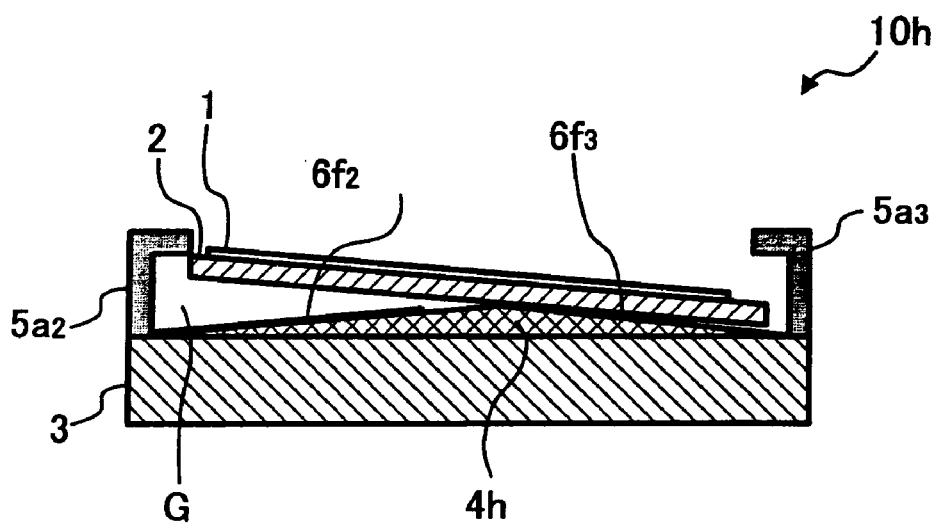

Referring to FIGS. 36 and 37, a light deflecting apparatus 10h according to another preferred embodiment of the present invention is explained. FIG. 36 is a plane view of the light deflecting apparatus 10h, and FIG. 37 is a cross-section view of the light deflecting apparatus 10h taken on line P-P of FIG. 36. The light deflecting apparatus 10h of FIG. 36 is an apparatus modified on the basis of the light deflecting apparatus 10f of FIG. 23, that is, the supporting member 4c is modified to a supporting member 4h. The supporting member 4h has a relative large prism-like shape with a bottom surface having an area nearly covering an entire area of the upper surface of the substance 3, and the electrodes $6f_1$-$6f_4$ are disposed on roof-like slopes of the supporting member 4h, as shown in FIGS. 36 and 37.

Although the light deflecting apparatus 10h has the four divided electrodes (i.e., the electrodes $6f_1$-$6f_4$), the division number with respect to the electrode may not be limited to it and the electrode may be divided into other number of pieces such as two, for example.

The supporting member 4h is made of a silicon oxide film or a silicon nitride film, for example, and therefore has a relatively high mechanical strength.

As demonstrated in FIG. 37, with this structure, the electrode comes closer to the plate 2 as the position of the electrode is nearer to the supporting point of the supporting member 4h. This enables the light deflecting apparatus 10h to generate a larger electrostatic attraction force than that generated by the light deflecting apparatus 10f of FIG. 23, for example. In other words, the light deflecting apparatus 10h can move the plate 2 with a lower voltage than that needed by the light deflecting apparatus 10f of FIG. 23.

Further, when the plate 2 is settled in one operational position, it is caused to touch the entire surfaces of the corresponding electrodes. This may diffuse the impact in contact and therefore the mechanical strength may not be degraded through a usage for an extended period of time. Also, moving the plate 2 with touching the entire surface of the corresponding electrodes facilitates a directional control relative to the plate 2. As a consequence, the operation is performed in a more stable manner and its response time becomes faster.

Figure 38:
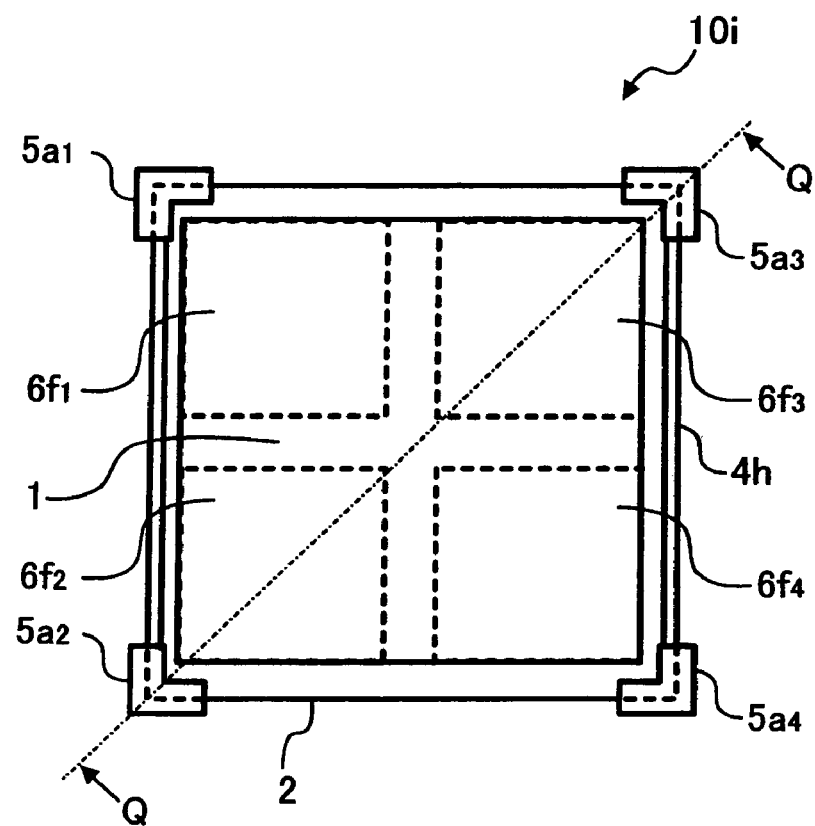
FIGS. 38 and 39 are schematic diagrams of a light deflecting apparatus according to another embodiment of the present invention.
Figure 39:
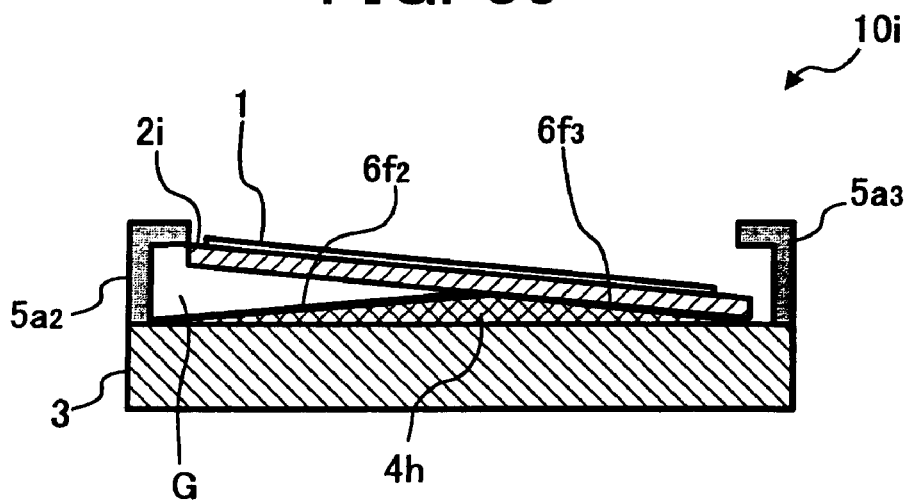

Referring to FIGS. 38 and 39, a light deflecting apparatus 10i according to another preferred embodiment of the present invention is explained. FIG. 38 is a plane view of the light deflecting apparatus 10i, and FIG. 39 is a cross-section view of the light deflecting apparatus 10i taken on line Q-Q of FIG. 38. The light deflecting apparatus 10i of FIG. 38 is an apparatus modified on the basis of the light deflecting apparatus 10h of FIG. 36, that is, the reflecting surface 1a of the reflecting member 1 or at least a part of the plate 2 includes a conductive area 2i in the light reflecting area thereof such that at least a part of the conductive area 2i faces the electrodes $6f_1$-$6f_4$. The conductive area 2i preferably is made of metal such as aluminum metal, titan nitride, or titan, for example, in consideration of conductivity.

With this structure, an electrostatic attraction force acting between the plate 2 and the electrodes $6f_1$-$6f_4$ can be generated by an application of relatively low driving voltages to the electrodes $6f_1$-$6f_4$, thereby moving the plate 2 in an arbitrary direction.

In addition, the plate 2 settled in one direction can quickly be moved and settled in another arbitrary direction by changing the respective potentials of the electrodes $6f_1$-$6f_4$.

Further, with this structure, potential differences can arbitrarily be generated among the electrodes $6f_1$-$6f_4$ so as to control the tilting movement of the plate 2.

Figure 40:
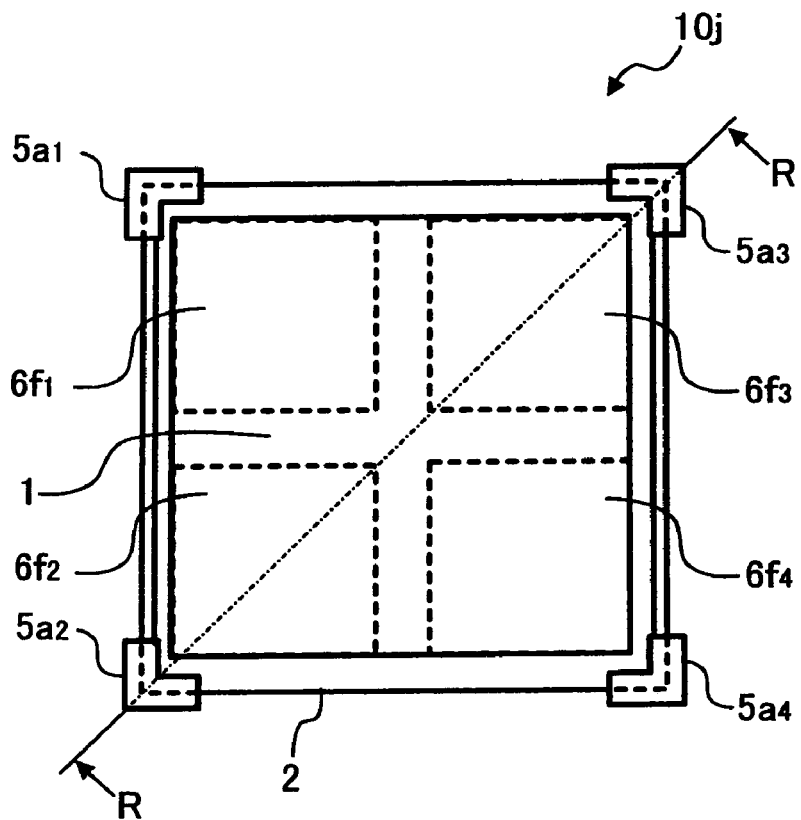
FIGS. 40 and 41 are schematic diagrams of a light deflecting apparatus according to another embodiment of the present invention.
Figure 41:
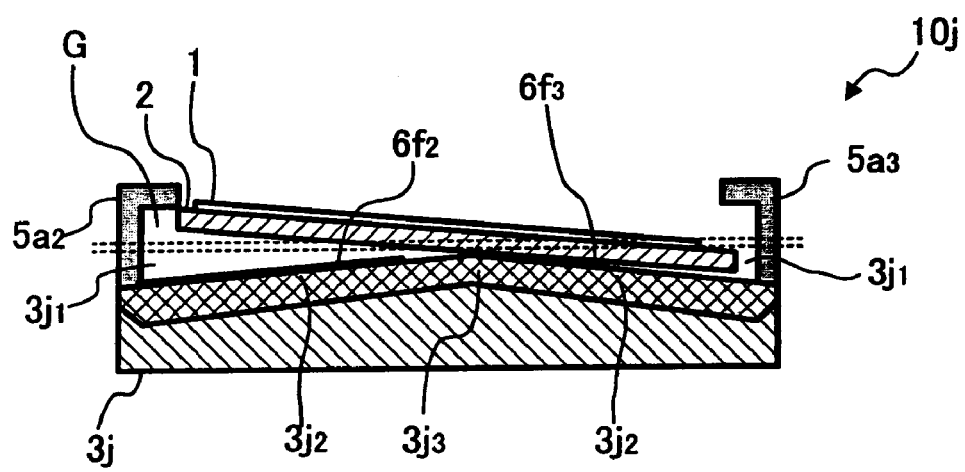

Referring to FIGS. 40 and 41, a light deflecting apparatus 10*j* according to another preferred embodiment of the present invention is explained. FIG. 40 is a plane view of the light deflecting apparatus 10*j*, and FIG. 41 is a cross-section view of the light deflecting apparatus 10*j* taken on line R-R of FIG. 41. The light deflecting apparatus 10*j* of FIG. 40 is an apparatus modified on the basis of the light deflecting apparatus 10*h* of FIG. 36, that is, the substrate 3 is modified to a substrate 3*j* to combine the supporting member 4*h* therewith. The substrate 3*j* has hollows $3j_1$ on the upper surface thereof to form roof-like slopes $3j_2$ for serving as the supporting member 4*h* of FIG. 36. The electrodes $6f_1$-$6f_4$ are disposed on the roof-like slopes $3j_2$. The angle bracket members $5a_1$-$5a_4$ are disposed on the plane edge surface of the substrate 3*j*. The electrically floating plate 2 is held by the supporting point of the substrate 3*j* for free movement within the free space G limited by the top portions of the angle bracket members $5a_1$-$5a_4$ and the electrodes $6f_1$-$6f_4$. The supporting point of the substrate 3*j* is arranged below the plane edge surface of the substrate 3*j*.

To form the hollows $3j_1$, the upper surface of the substrate 3*j* is etched, or, a relatively thick insulating layer $3j_3$ is first formed on the substrate 3*j*, as shown in FIG. 41, and is then trimmed. During this work, the level of the supporting point is adjusted.

Since the hollows $3j_1$ makes the free space G greater, it provides a margin for reducing the height of the angle bracket members $5a_1$-$5a_4$. The angle bracket members $5a_1$-$5a_4$ preferably have a high mechanical strength and therefore the reduction of the height of the angle bracket members $5a_1$-$5a_4$ makes their mechanical strength higher.

With this structure, the height of the free space G can arbitrarily adjusted so that the driving voltage for driving the circuit and the reset voltage can suitably adjusted.

Figure 42:
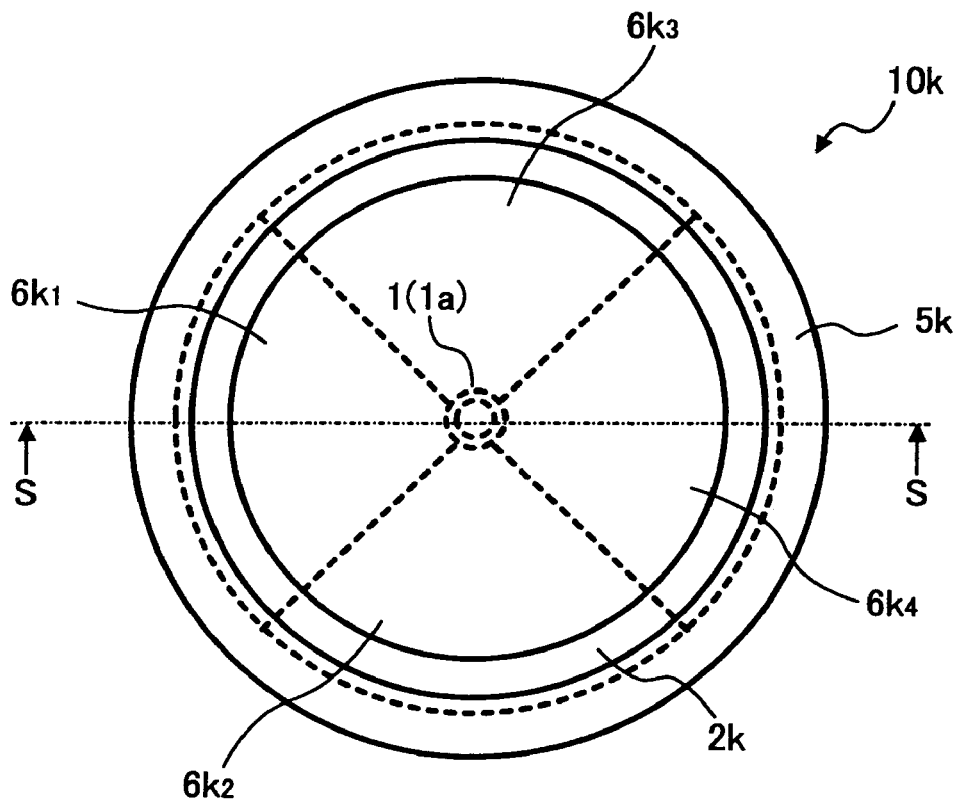
FIGS. 42-44 are schematic diagrams of a light deflecting apparatus according to another embodiment of the present invention.
Figure 43:
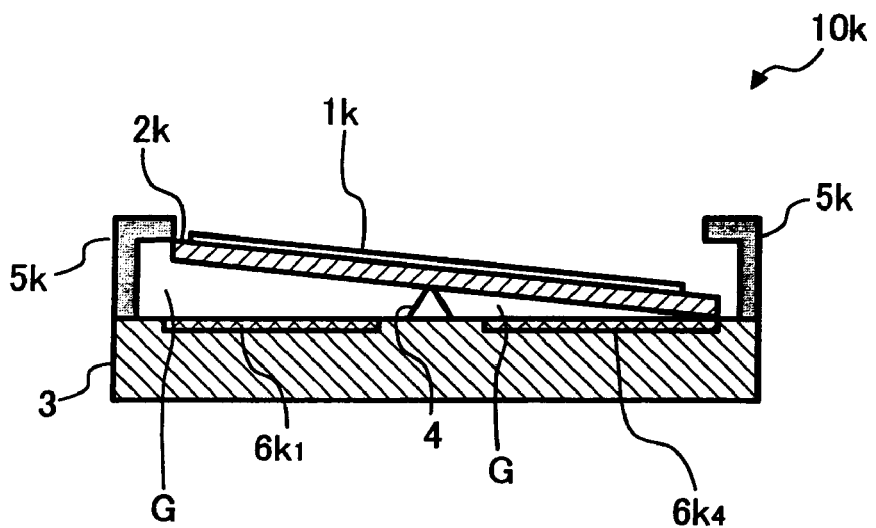
Figure 44:
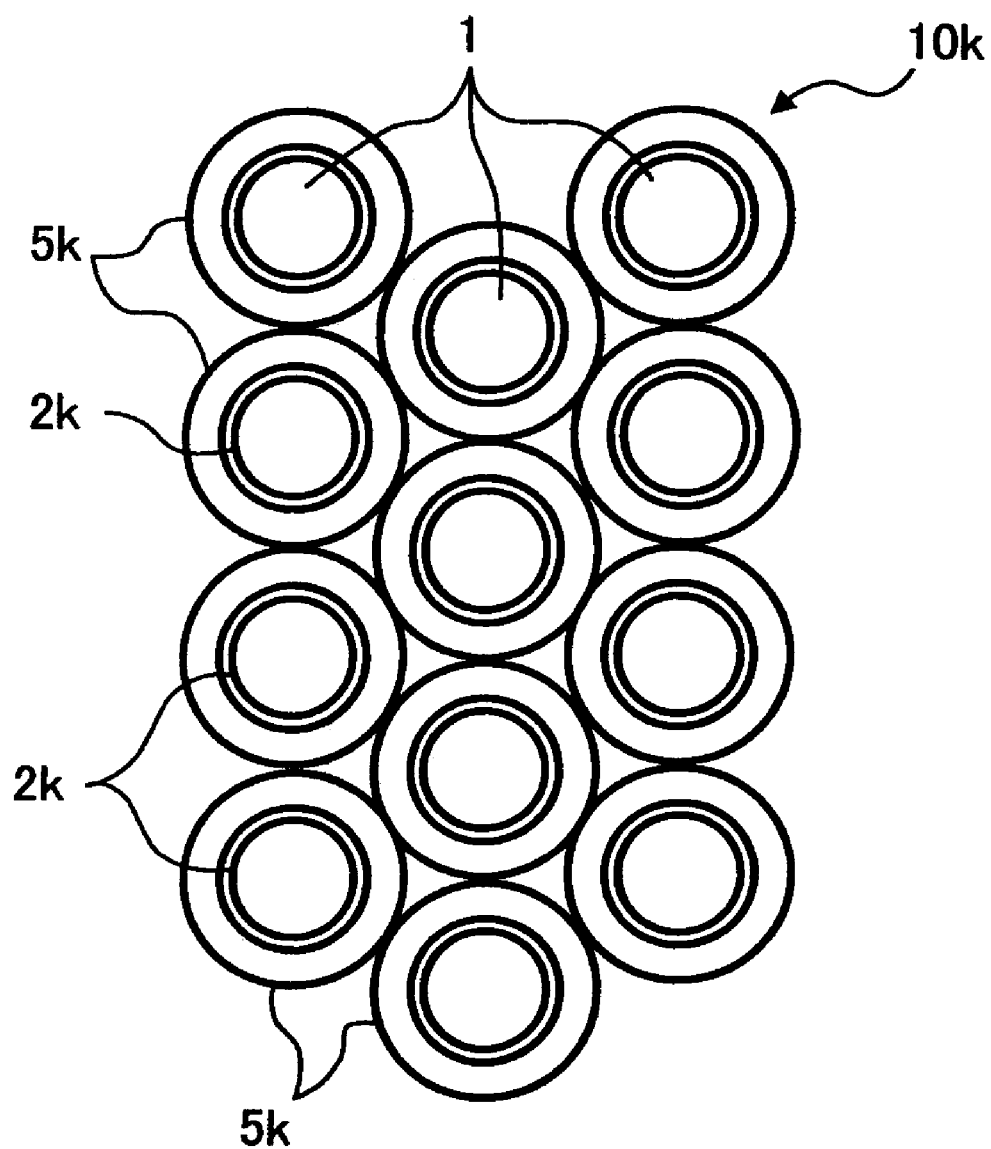

Referring to FIGS. 42-44, a light deflecting apparatus 10*k* according to another preferred embodiment of the present invention is explained. FIG. 42 is a plane view of the light deflecting apparatus 10*k*, and FIG. 43 is a cross-section view of the light deflecting apparatus 10*k* taken on line S-S of FIG. 42. The light deflecting apparatus 10*k* of FIG. 42 is an apparatus modified on the basis of the light deflecting apparatus 10*f* of FIG. 23. In this modification, and the plate 2 and the reflecting member 1 are modified to a plate 2*k* and a reflecting member 1*k* in a circular shape. In addition, the angle brackets $5a_1$-$5a_4$ are modified to an angle bracket 5*k* which is a circular single piece, and the electrodes $6f_1$-$6f_4$ are modified to electrodes $6k_1$-$6k_4$ which have the shapes shown in FIG. 42.

In the light deflecting apparatus 10*k* having this structure, the reflected light reflected by the reflecting member 1*k* become a light ray having a circular cross section. Accordingly, in an image forming apparatus (e.g., the image forming apparatus 200 explained later with reference to FIG. 81) or an image projection display apparatus (e.g., the image projection display apparatus 300 explained later with reference to FIG. 83) employing the light deflecting apparatus 10*k*, a single pixel can be formed in a circular shape as shown in FIG. 44. With the plate 2 having an approximately square shape, a pixel is formed in a rectangular shape and a space between adjacent two pixels becomes a line shaped noise. However, the circular-shaped pixel produced with the light deflecting apparatus 10*k* can reduce this noise and it can consequently form a relatively high precision image.

Figure 45:
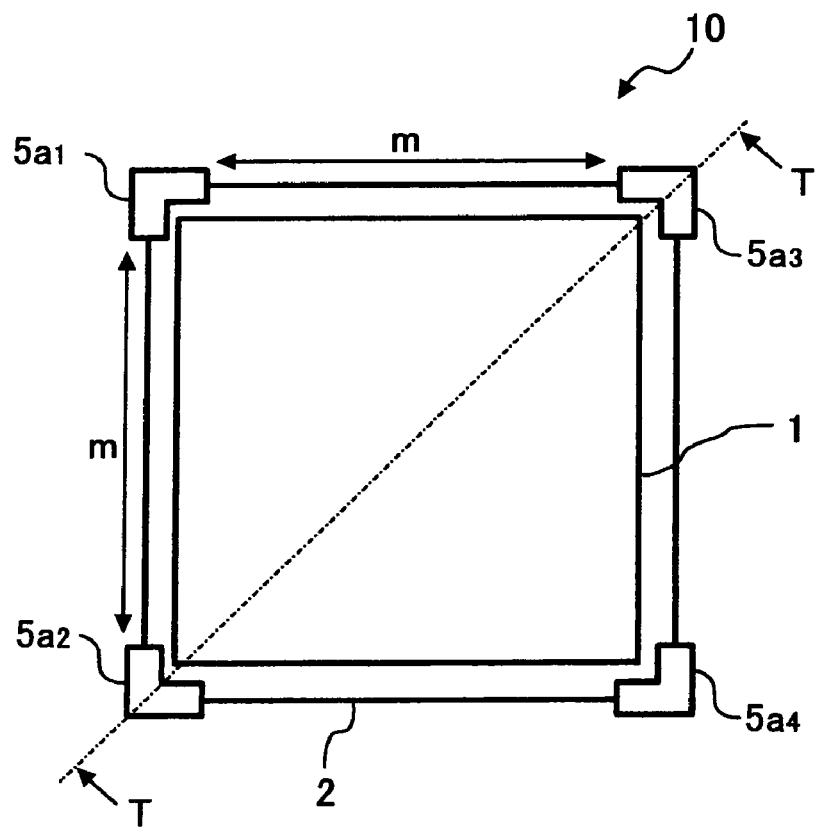
FIGS. 45 and 46 are schematic diagrams of a light deflecting apparatus according to another embodiment of the present invention.
Figure 46:
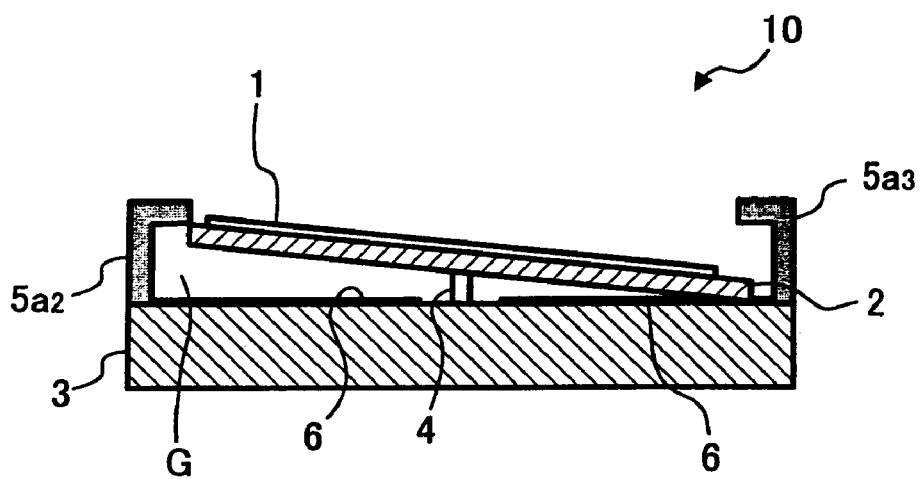

Referring to FIGS. 45-46, a light deflecting apparatus 10*m* according to another preferred embodiment of the present invention is explained. FIG. 45 is a plane view of the light deflecting apparatus 10*m*, and FIG. 46 is a cross-section view of the light deflecting apparatus 10*m* taken on line T-T of FIG. 45. The light deflecting apparatus 10*m* of FIG. 45 is an apparatus modified on the basis of the light deflecting apparatus 10 of FIG. 1. In this modification, the angle brackets $5a_1$-$5a_4$ are arranged at corners of a square of the substrate 3 having a side length m, as shown in FIG. 45.

With this structure, an etching work with respect to the substrate 3, explained later, is facilitated. In the etching process, the plate 2 and the substrate 3 are immersed in an etching liquid and therefore a manufacturing yield is improved by shortening the etching time.

Figure 47:
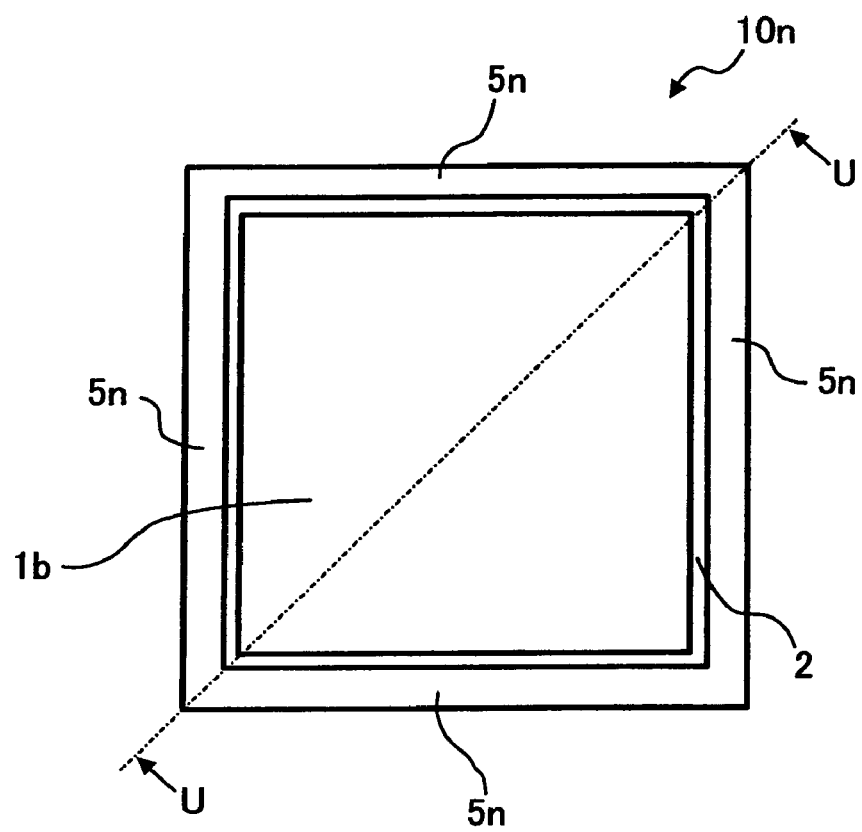
FIGS. 47 and 48 are schematic diagrams of a light deflecting apparatus according to another embodiment of the present invention.
Figure 48:
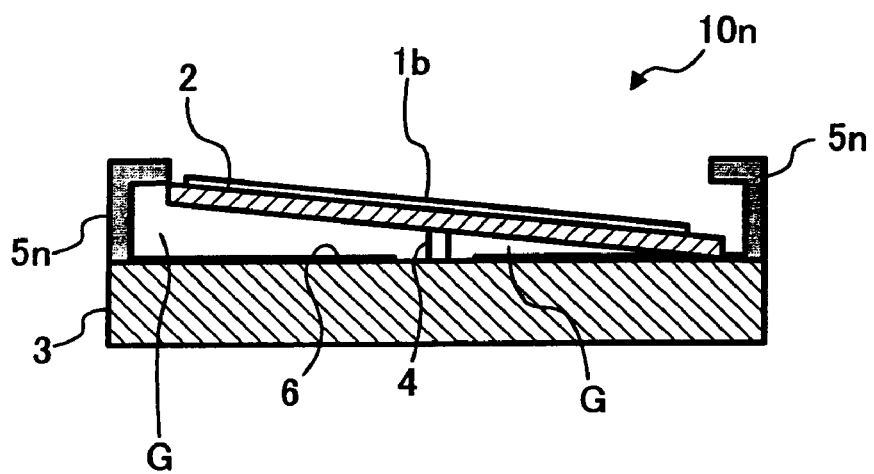

Referring to FIGS. 47-48, a light deflecting apparatus 10*n* according to another preferred embodiment of the present invention is explained. FIG. 47 is a plane view of the light deflecting apparatus 10*n*, and FIG. 48 is a cross-section view of the light deflecting apparatus 10*n* taken on line U-U of FIG. 47. The light deflecting apparatus 10*n* of FIG. 47 is an apparatus modified on the basis of the light deflecting apparatus 10 of FIG. 1. In this modification, the angle brackets $5a_1$-$5a_4$ are changed to an angle bracket 5*n* having a single-piece continuous-wall-like shape, as shown in FIG. 47.

With this structure, the plate 2 is more strictly prevented from going out of the free space G. As a result, the mechanical strength is less degraded through a usage for an extended period of time and therefore the light deflecting apparatus 10*n* can stably operate the light deflection over an extended period of time.

Since the upper movement of the plate 2 is restricted by the top angled portion of the bracket 5*n*, the angle bracket 5*n* is preferably made of an insulating film to avoid a transfer of charges from the plate 2 to the angle bracket 5*n* when contacting. Thus, the plate 2 can maintain its electrically floating status.

The angle bracket 5*n* is also preferably made of a translucent film (e.g., a silicon oxide film). When the angle bracket 5*n* is made of a non-translucent material, the light entering the top angled portion of the angle bracket 5*n* does not reach the reflecting surface 1*a* of the reflecting member 1. With the angle bracket 5*n* made of a translucent film, however, the light entering the top angled portion of the angle bracket 5*n* passes through it and is reflected by the reflecting surface 1*a* of the reflecting member 1. Thus, the effective light amount which is often referred to as an "ON" light amount is increased. This allows the light deflecting apparatus 10*n* to stably perform a fast responsive light deflection operation.

The silicon oxide film has a superior insulation nature as well as the translucent nature and therefore making the angle bracket 5*n* of a silicon oxide film facilitates a micromachining and a high integration machining of the light deflecting apparatus 10*n*, which methods are explained later. Thereby, it becomes possible to manufacture in a relatively low cost the light deflecting apparatus 10*n* with the angle bracket 5*n* made of the silicon oxide film which can stably perform a fast responsive light deflection operation.

As an alternative, the angle bracket 5*n* may be made of a light-resistant film (e.g., a chromic oxide film) to cut down a light reflection in an undesired direction and, accordingly, a stray light from the deflected light is prevented from entering into the light in a desired direction. Since the stray light is a light element generated when a light deflection in a desired direction is not operated, the angle bracket 5*n* made of a chromic oxide film, for example, restricts an "OFF" light amount which represents a light amount when the light deflection in a desired direction is not operated. Therefore, the light deflecting apparatus 10n having the angle bracket 5n made of a chromic oxide film can stably perform the light deflection operation.

The chromic oxide film has a superior insulation nature as well as the light-resistant nature and therefore it facilitates a micromachining and a high integration machining of the light deflecting apparatus 10n, which methods are explained later. Thereby, it becomes possible to manufacture in a relatively low cost the light deflecting apparatus 10n with the angle bracket 5n made of the chromic oxide film which can stably perform a fast responsive light deflection operation.

Further, the plate 2 is preferably made of a silicon nitride film and the light reflecting surface 1a of the light reflecting member 1 is made of an aluminum metal film which has high conductivity and reflectivity.

The plate 2 made of a silicon nitride film has a high dielectric breakdown voltage and a high resistance against a fatigue failure or a degradation caused through a usage over an extended period of time. Accordingly, the plate 2 having a high insulation nature and a high mechanical strength is formed in a light-weighted thin shape by using a silicon nitride film. With the plate 2 formed in a light-weighted thin shape, a high speed operation for a relatively high frequency such as a frequency of at least a few tens of kilohertz, for example, can be achieved.

In addition, by making the reflecting surface 1a of an aluminum metal film having natures of a high light reflectivity and a high conductivity, it becomes possible to combine a conductive area of the plate 2 with the reflecting surface 1a. This allows the light deflecting apparatus 10n to drive the plate 2 with a lower driving voltage and to output a higher reflection light amount.

Figure 49:
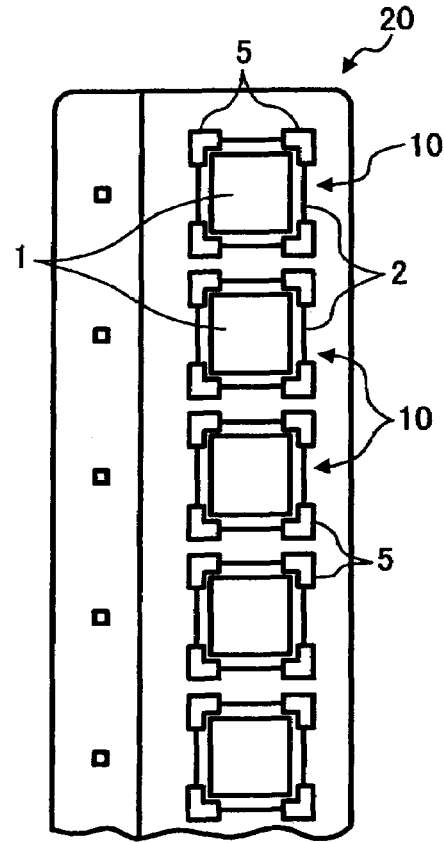
FIG. 49 is a schematic diagrams of a one-dimension light deflection array including a plurality of the light deflecting apparatuses of FIG. 1.

FIG. 49 shows a light deflecting apparatus 20 which is a one-dimension light deflection array including a plurality of the above-described light deflecting apparatus 10, for example, arranged in a one-dimension formation. In this structure, the light deflecting apparatus 10 may be replaced with any one of the above-described light deflecting apparatuses 10a-10n. The light deflecting apparatus 20 can be employed in a latent image forming mechanism of an image forming apparatus (e.g., the image forming apparatus 200 explained later with reference to FIG. 81), for example.

Figure 50:
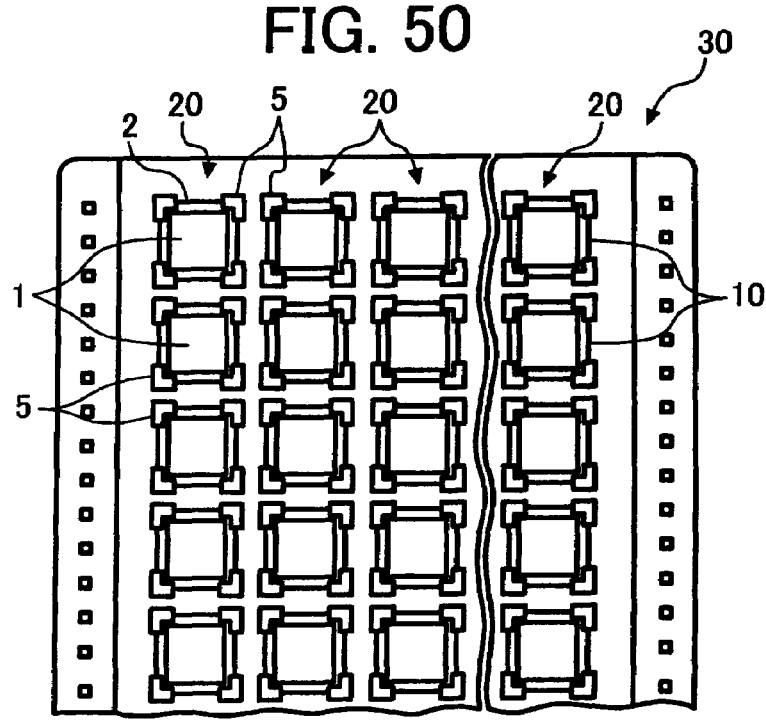
FIG. 50 is a schematic diagrams of a two-dimension light deflection array including a plurality of the light deflecting apparatuses of FIG. 1.

FIG. 50 shows a light deflecting apparatus 30 which is a two-dimension light deflection array including a plurality of the one-dimension light deflecting arrays 10, for example, arranged in a two-dimension formation. The light deflecting apparatus 30 can be employed in a light switching mechanism of an image projection display apparatus, for example.

Figure 51:
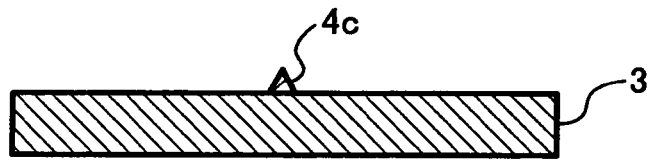
FIGS. 51-61 are schematic diagrams for explaining a method of making the light deflecting apparatus of FIG. 23 according to an embodiment of the present invention.

Referring to FIGS. 51-59, an exemplary method of making a light deflecting apparatus is explained. In this discussion, a light deflecting apparatus to be made is an apparatus similar to the light deflecting apparatus 10f of FIG. 23, as an example. A first process provides a silicon oxide film on the silicon substrate 3 with a plasma CVD (chemical-vapor deposition) method. Then, a photography using a photomask having a pattern with an area coverage modulation or a photography which thermally deforms a resist pattern is used to form a resist pattern having an approximate shape and a thickness of the supporting member 4c. After that, the formed resist pattern is deformed to an exact shape of the supporting member 4c with a dry etching method, as shown in FIG. 51.

In the above process, the silicon oxide film having a thickness of approximately 2 μm may be formed, and the works for forming the supporting member 4c may be performed in an upper layer of approximately 1 μm.

The height of the top of the supporting member 4c is approximately 1 μm.

Figure 52:
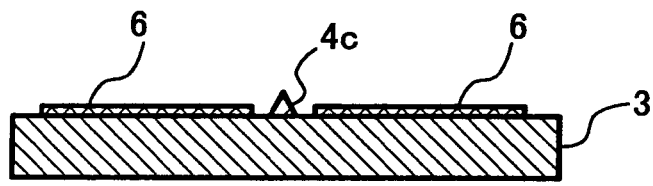
Figure 53:
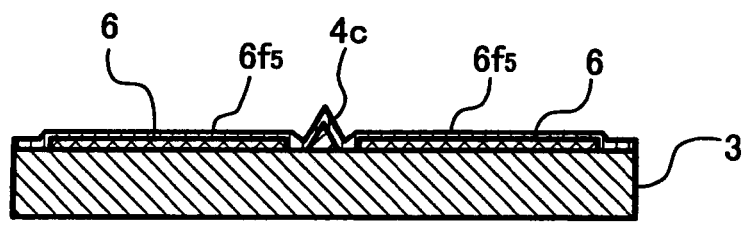
Figure 54:
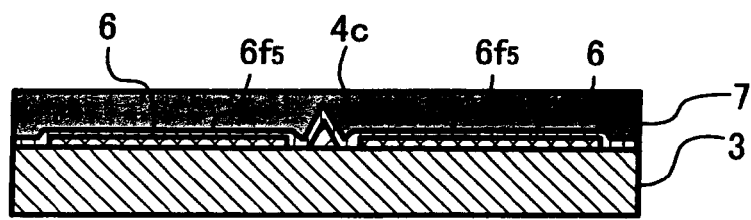
Figure 55:
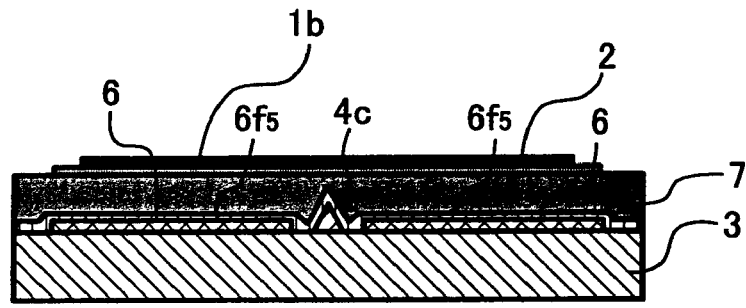
Figure 56:
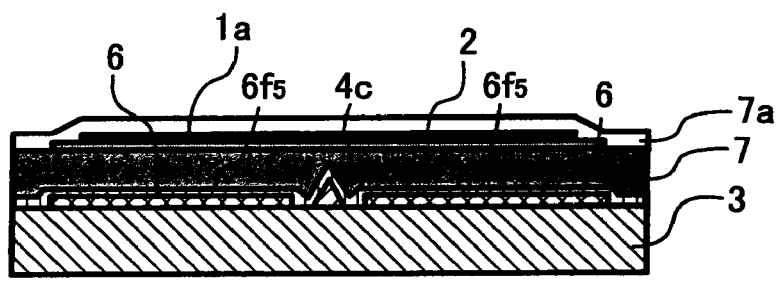
Figure 57:
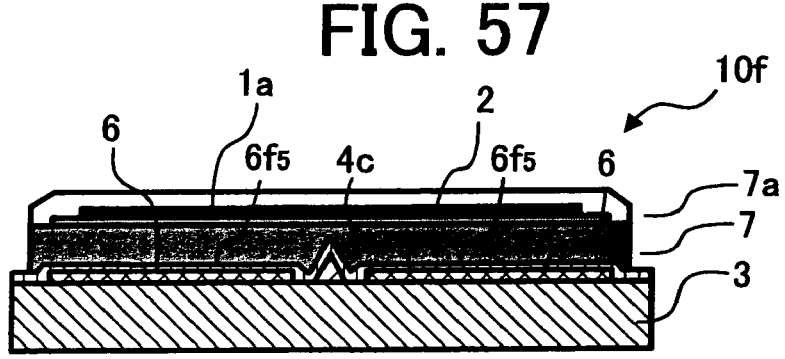

A subsequent process provides the electrodes $6f_1$-$6f_4$ made of a titanium nitride film. In this process, a titanium nitride film is formed to have a thickness of 0.01 μm with a DC magnetron sputtering process and is patterned into the electrodes $6f_1$-$6f_4$ with a photography and a dry etching method. In FIG. 52 (and also in the subsequent drawings), the electrodes $6f_1$-$6f_4$ are represented by reference numeral 6 for the convenience sake.

Then, a next process provides a protection layer $6f_5$ made of a silicon nitride film having a thickness of 0.2 μm with the plasma CVD method. This protection layer $6f_5$ is formed to protect the surfaces of the electrodes $6f_1$-$6f_4$ (see FIG. 53).

A next process forms a noncrystalline silicon film having a thickness of 2 μm on the protection layer $6f_5$ with a sputtering method, and the noncrystalline silicon film is smoothed through a process time control using a CMP (chemical mechanical polishing) technology. In this example, the process time control is conducted with reference to a time period in that the thickness of the noncrystalline silicon film remaining on the top of the supporting member 4c is reduced to 0.1 μm. The noncrystalline silicon film remaining on the protection layer $6f_5$ is referred to as a first sacrifice layer 7 (see FIG. 54).

As an alternative to the noncrystalline silicon film, the first sacrifice layer 7 may be made of a polyimide film or a photosensitive organic film, or a resist film or a polycrystalline silicon film which are generally used in a semiconductor process. The smoothing method may be a reflow method with a thermal processing or an etch back method with the dry etching.

Then, a next process forms a silicon nitride layer of a 0.2-μm thick on the first sacrifice layer 7 with the plasma CVD method and subsequently forms an aluminum metal film of a 0.05-μm thick on the silicon nitride layer with the sputtering method. After that, the aluminum metal film is patterned into a conductive area of the plate 2 combining the reflecting surface 1a and the silicon nitride layer is patterned into the plate 2, with the photography and the dry etching method (see FIG. 55).

A next process provides a noncrystalline silicon film of a 1-μm thick on the conductive area of the plate 2 with the sputtering method. This noncrystalline silicon film is referred to as a second sacrifice layer 7a (see FIG. 56). The second sacrifice layer 7a may made of a resist film or polycrystalline silicon film which are generally used in a semiconductor process.

A subsequent process divides each light deflecting apparatus with patterns of the first and second sacrifice layers 7 and 7a together using the photography and the dry etching method. At this time, the pattern areas of the first and second sacrifice layers 7 and 7a are slightly larger than the area of the plate 2 including the conductive area combined with the reflecting surface 1a of the reflecting member 1 (see FIG. 57). This process prepares for a next process for providing the angle brackets 5 around the plate 2.

Figure 58:
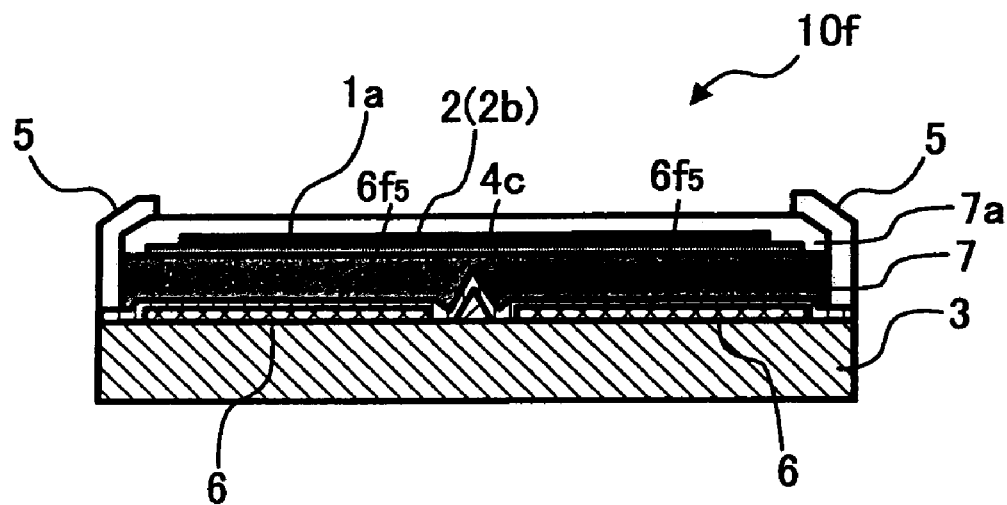
Figure 59:
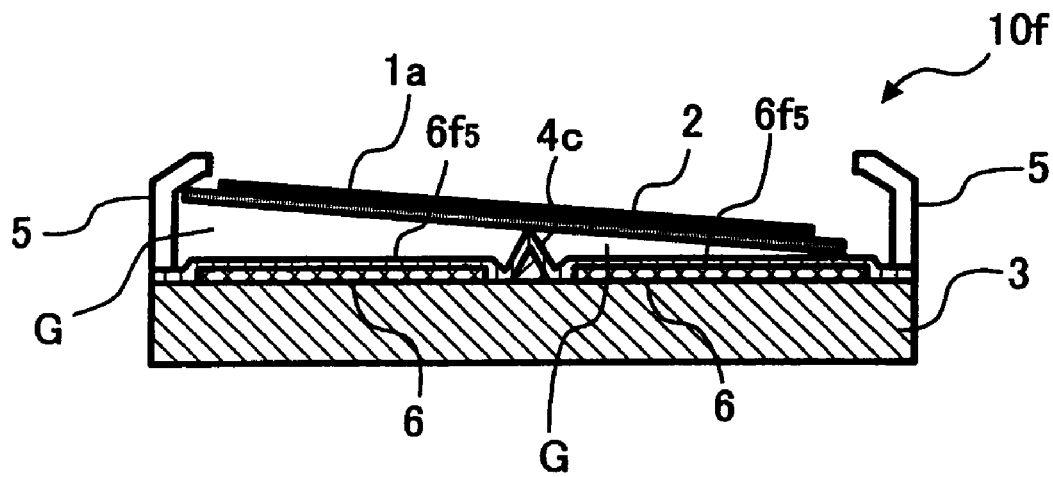

FIG. 58 shows a process for forming the angle brackets 5 (i.e., the angel brackets $5a_1$-$5a_4$). In this process, a silicon oxide film of a 0.8-μm thick is formed with the plasma CVD method and is patterned to make the angle brackets 5 with the photography and the dry etching method.

Then, a final process removes the remaining first and second sacrifice layers 7 and 7a through an opening with a wet etching method so that the plate 2 is supported by the supporting member 4c for a free movement within the free space G. Thus, the procedure for making the light deflecting apparatus 10f shown in FIG. 23 is completed (see FIG. 59).

In this process, the angle brackets 5 are positioned at the four corners of the first and second sacrifice layers 7 and 7a in the substantially square shape with leaving the four sides open and therefore the etching removal can be completed in a relatively short period of time.

Figure 60:
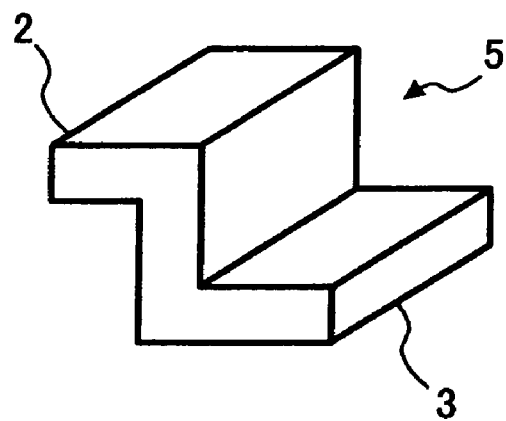
Figure 61:
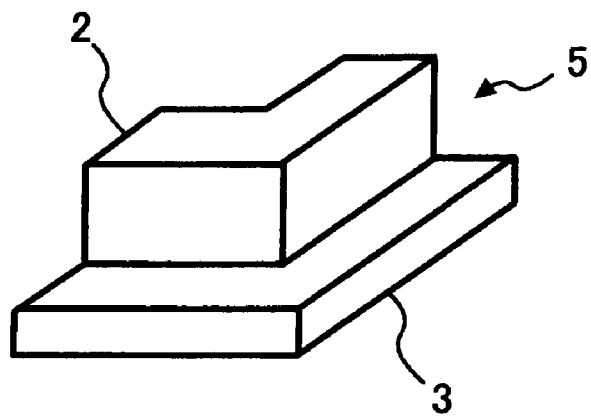

In the process for forming the angle brackets 5 shown in FIG. 58, the angel brackets 5 may have other shapes as shown in FIGS. 60 and 61, for example.

The thus-made light deflecting apparatus 10f with the method explained with reference to FIGS. 51-59 is capable of stably performing a fast-responsive light deflection in directions for one deflection-axis or two deflection-axes by a simple control with a simple structure without restricting an input light wavelength. Further, the light deflecting apparatus 10f is operative with a relatively low driving voltage and has a stable mechanical strength for usage over an extended period of time with lesser variations or degradation in the mechanism.

In addition, the method explained with reference to FIGS. 51-59 is capable of achieving the micromachining and the integration machining in a relatively low cost, while requiring no specific use environment to the resultant light deflecting apparatus 10f.

Referring to FIGS. 62-71, another exemplary method of making a light deflecting apparatus is explained. In this discussion, a light deflecting apparatus to be made is referred to as a light deflecting apparatus 1op. The light deflecting apparatus 1op is similar to the light deflecting apparatus 10f of FIG. 23, except for the relatively small convex portion $2a_1$ at substantially the central position of the plate 2a in contact with the supporting member 4, which is the feature of the light deflecting apparatus 10a of FIG. 6.

Figure 62:
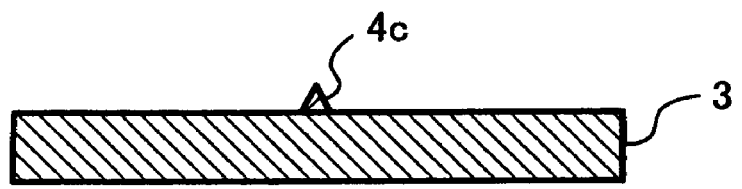
FIGS. 62-71 are schematic diagrams for explaining a method of making a light deflecting apparatus combining the light deflecting apparatuses of FIGS. 6 and 23 according to an embodiment of the present invention.
Figure 63:
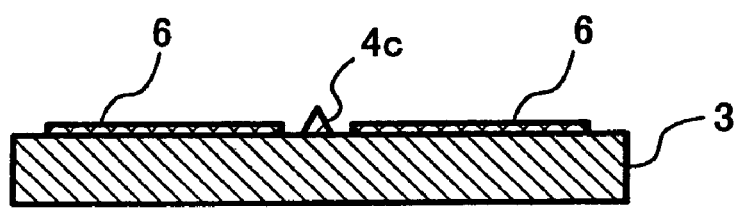
Figure 64:
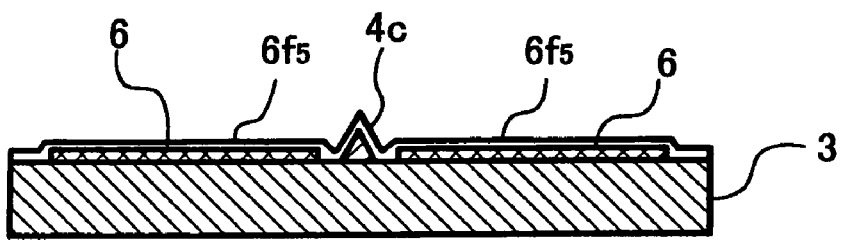
Figure 65:
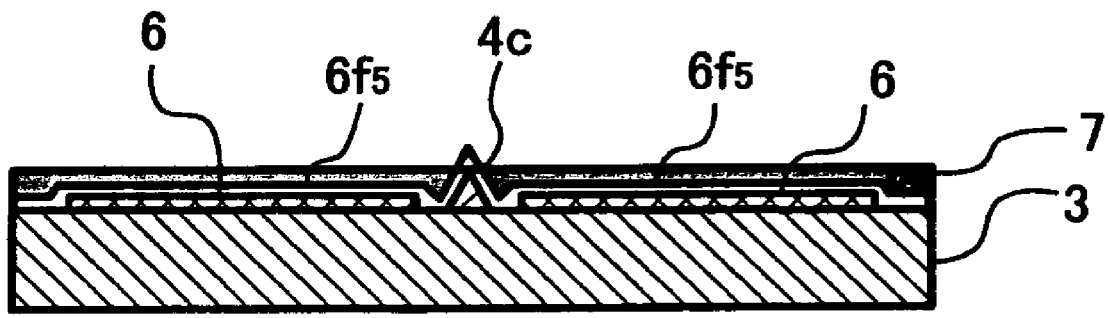

In this method, a first process provides a silicon oxide film on the silicon substrate 3 with the plasma CVD (chemical-vapor deposition) method. Then, the photography using a photomask having a pattern with an area coverage modulation or the photography which thermally deforms a resist pattern is used to form a resist pattern having an approximate shape and a thickness of the supporting member 4c. After that, the formed resist pattern is deformed to an exact shape of the supporting member 4c with the dry etching method, as shown in FIG. 62.

In the above process, the silicon oxide film having a thickness of approximately 2 μm may be formed, and the works for forming the supporting member 4c may be performed in an upper layer of approximately 1 μm.

The height of the top of the supporting member 4c is approximately 1 μm.

A subsequent process provides the electrodes 6 (e.g., the electrodes $6f_1$-$6f_4$) made of a titanium nitride film. In this process, a titanium nitride film is formed to have a thickness of 0.01 μm with the DC magnetron sputtering process and is patterned into the electrodes 6 with the photography and the dry etching method.

Then, a next process provides a protection layer $6f_5$ made of a silicon nitride film having a thickness of 0.2 μm with the plasma CVD method. This protection layer $6f_5$ is formed to protect the surfaces of the electrodes $6f_1$-$6f_4$ (see FIG. 64).

A next process forms a noncrystalline silicon film having a thickness of 2 μm on the protection layer $6f_5$ with the sputtering method, and the noncrystalline silicon film is smoothed through a process time control using the CMP (chemical mechanical polishing). In this example, the process time control is conducted with reference to a time period in that the thickness of the noncrystalline silicon film on the top of the supporting member 4c is completely removed and the supporting member 4c is exposed outside. In addition, the CMP is set to conditions in that the supporting member 4c and the protection layer $6f_5$ are more polished so that, around the top portion of the supporting member 4c, a supporting point of the supporting member 4c remains and the noncrystalline silicon film remains at a level lower than the supporting point of the supporting member 4c. The supporting point of the supporting member 4c is projected by approximately 0.2 μm. The noncrystalline silicon film remaining on the protection layer $6f_5$ is referred to as a first sacrifice layer 7 (see FIG. 65).

As an alternative to the noncrystalline silicon film, the first sacrifice layer 7 may be made of a polyimide film or a photosensitive organic film, or a resist film or a polycrystalline silicon film which are generally used in a semiconductor process. The smoothing method may be the etch back method with the dry etching.

Figure 66:
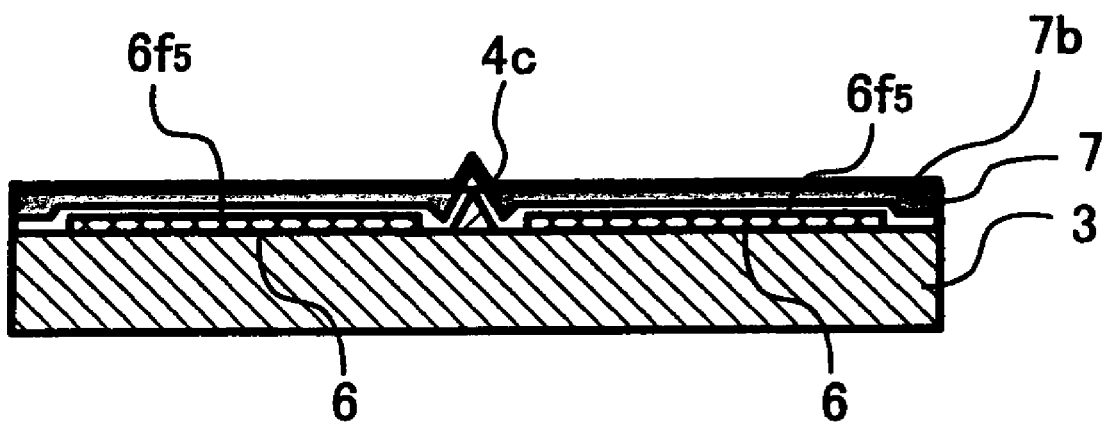
Figure 67:
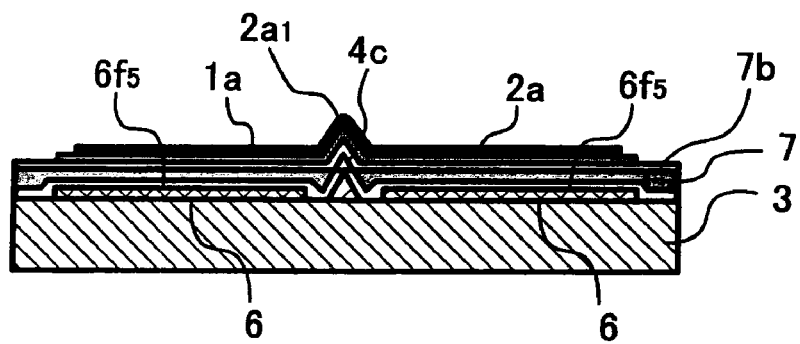
Figure 68:
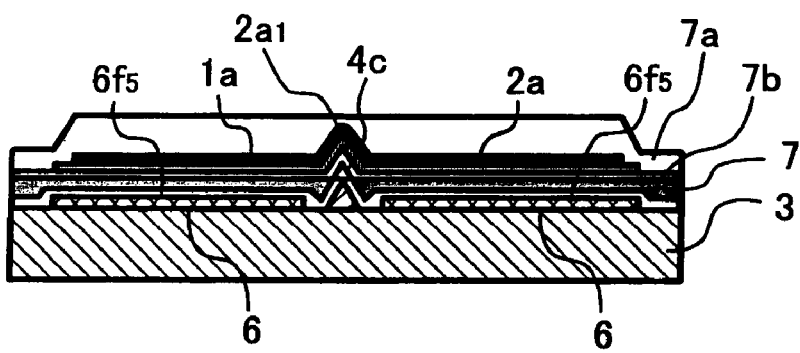
Figure 69:
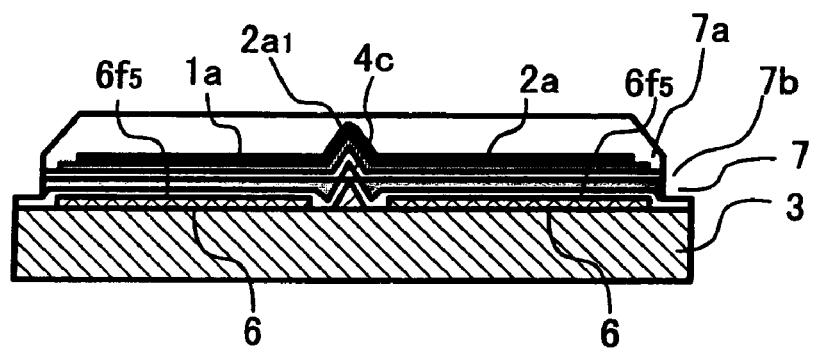

In a next process, a noncrystalline silicon film of a 0.1-μm thick is formed on the first sacrifice layer 7 with the sputtering method (see FIG. 66). This noncrystalline silicon film formed on the first sacrifice layer 7 is referred to as a third sacrifice layer 7b.

Then, a next process forms a silicon nitride layer of a 0.2-μm thick on the first sacrifice layer 7 with the plasma CVD method and subsequently forms an aluminum metal film of a 0.05-μm thick on the silicon nitride layer with the sputtering method. After that, the aluminum metal film is patterned into a conductive area of the plate 2 combining the reflecting surface 1a and the silicon nitride layer is then patterned into the plate 2 with the convex portion $2a_1$, by the photography and the dry etching method (see FIG. 67).

A next process provides a noncrystalline silicon film of a 1-μm thick on the conductive area of the plate 2 with the sputtering method. This noncrystalline silicon film is referred to as a second sacrifice layer 7a (see FIG. 68). The second sacrifice layer 7a may made of a polyimide film or a photosensitive organic film, or a resist film or polycrystalline silicon film which are generally used in a semiconductor process.

A subsequent process divides each light deflecting apparatus with patterns of the first, second, and third sacrifice layers 7, 7a, and 7b together using the photography and the dry etching method. At this time, the pattern areas of the first, second, and third sacrifice layers 7, 7a, and 7b are slightly larger than the area of the plate 2 including the conductive area combined with the reflecting surface 1a of the reflecting member 1 (see FIG. 69). This process prepares for a next process for providing the angle brackets 5 around the plate 2.

Figure 70:
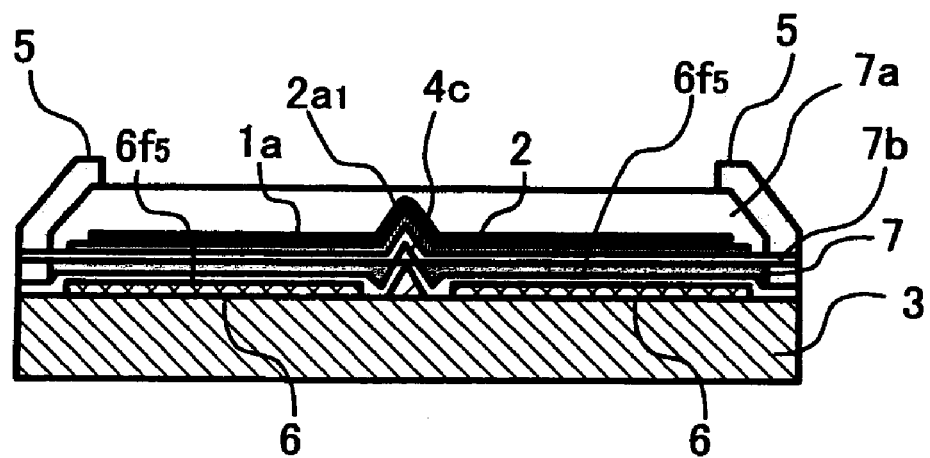
Figure 71:
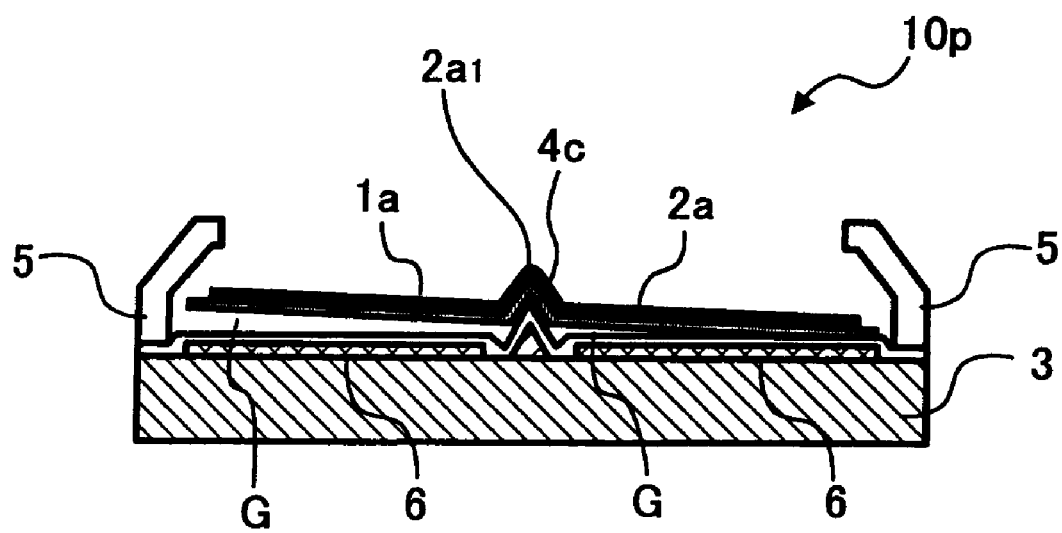

FIG. 70 shows a process for forming the angle brackets 5 (i.e., the angel brackets $5a_1$-$5a_4$). In this process, a silicon oxide film of a 0.8-μm thick is formed with the plasma CVD method and is patterned to make the angle brackets 5 with the photography and the dry etching method.

Then, a final process removes the remaining first, second, and third sacrifice layers 7, 7a, and 7b through an opening with the wet etching method so that the plate 2 is supported by the supporting member 4c for a free movement within the free space G. Thus, the procedure for making the light deflecting apparatus 10p is completed (see FIG. 71).

In this process, the angle brackets 5 are positioned at the four corners of the first, second, and third sacrifice layers 7, 7a, and 7b in the substantially square shape with leaving the four sides open and therefore the etching removal can be completed in a relatively short period of time.

In the process for forming the angle brackets 5 shown in FIG. 70, the angel brackets 5 may have other shapes as shown in FIGS. 60 and 61, for example.

In the thus-made light deflecting apparatus 10p with the method explained with reference to FIGS. 62-71, the plate 2a has the relatively small convex portion $2a_1$ at substantially the central position thereof in contact with the supporting member 4 and is therefore capable of moving about the convex portion $2a_1$ without disengaging from the supporting member 4c. Therefore, the light deflecting apparatus 10p can stably perform a fast-responsive light deflection in directions with one deflection-axis or two deflection-axes by a simple control with a simple structure without restricting an input light wavelength. Further, the light deflecting apparatus 10p is operative with a relatively low driving voltage and has a stable mechanical strength for usage over an extended period of time with lesser variations or degradation in the mechanism.

In addition, the method explained with reference to FIGS. 62-71 is capable of achieving the micromachining and the integration machining in a relatively low cost, while requiring no specific use environment to the resultant light deflecting apparatus 10p.

Figure 72:
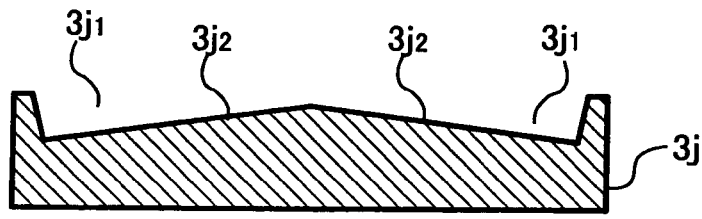
FIGS. 72-80 are schematic diagrams for explaining a method of making the light deflecting apparatus of FIG. 41 according to an embodiment of the present invention.

Referring to FIGS. 72-80, another exemplary method of making a light deflecting apparatus is explained. In this discussion, a light deflecting apparatus to be made is an apparatus similar to the light deflecting apparatus 10j of FIG. 41, as an example. A first process provides a resist pattern on the silicon substrate 3j with the photography using a photomask having a pattern with an area coverage modulation or a density modulation. This resist pattern has an approximate shape and a thickness of the hollows $3j_1$ or the roof-like slopes $3j_2$ serving as the supporting member. After that, the formed resist pattern is deformed to the roof-like slopes $3j_2$ serving as the supporting member with the dry etching method, as shown in FIG. 72. Then, in order to have an insulation to the substrate 3j, a silicon oxide film is formed to a thickness of approximately 1 μm on the roof-like slopes $3j_2$ by the plasma CVD. Thereby, the hollows $3j_1$ are formed, and the roof-like slopes $3j_2$ covered with the silicon oxide film of a 1-μm thick, serving as the supporting member, are provided on the substrate 3j.

In the above process, the silicon oxide film having a thickness of approximately 2 μm may be formed, and the works for forming the supporting member may be performed in an upper layer of approximately 1 μm.

The height of the top of the supporting member is approximately 0.3 μm.

Figure 73:
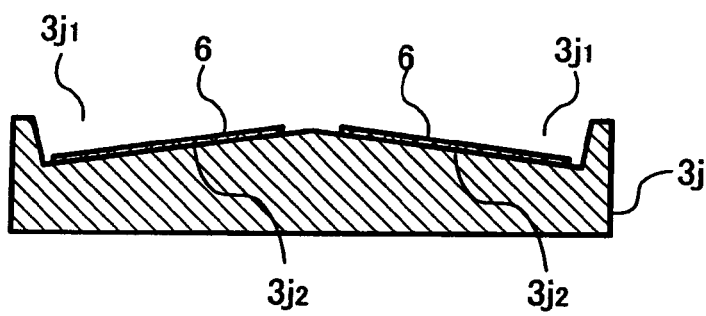
Figure 74:
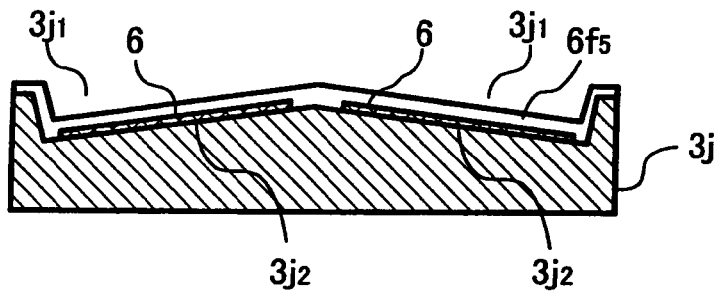
Figure 75:
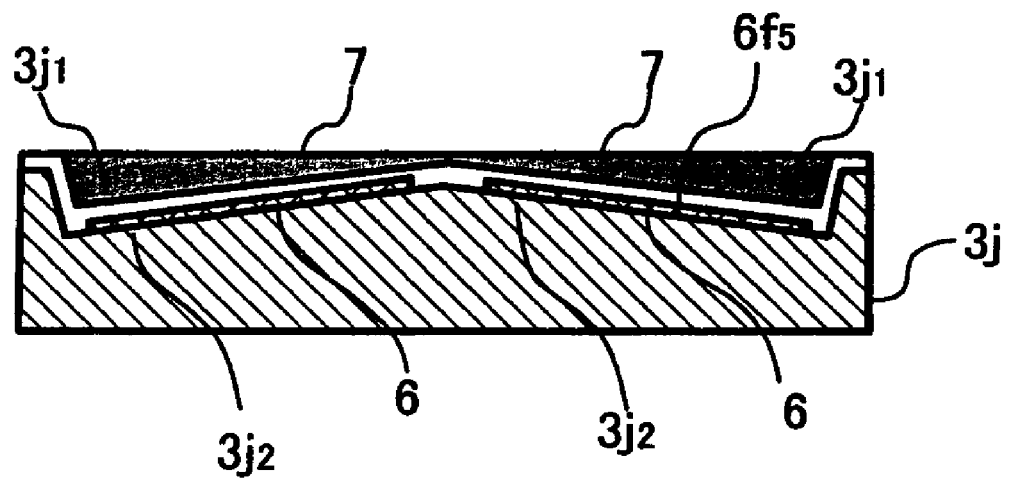
Figure 76:
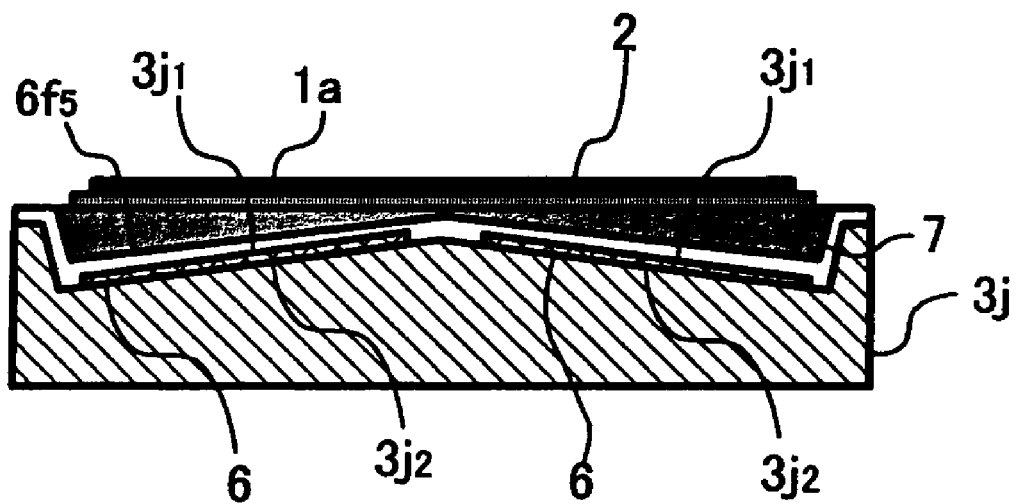
Figure 77:
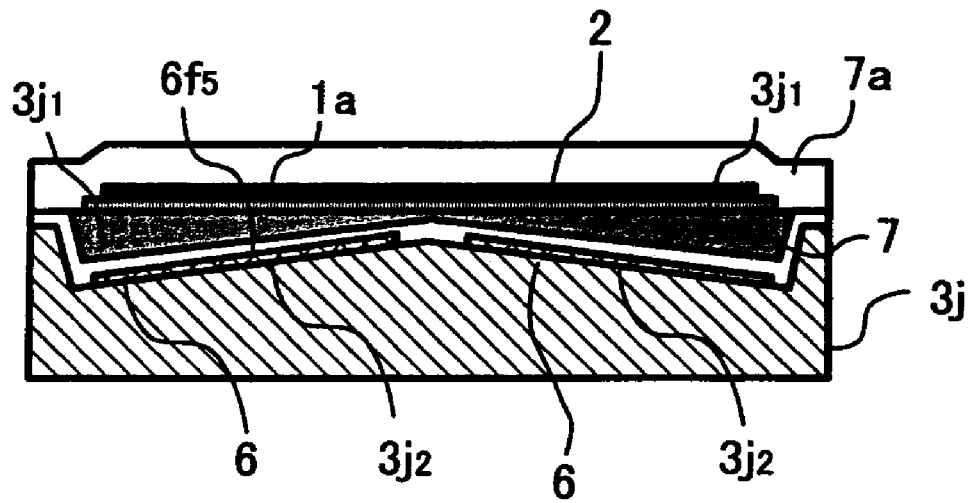
Figure 78:
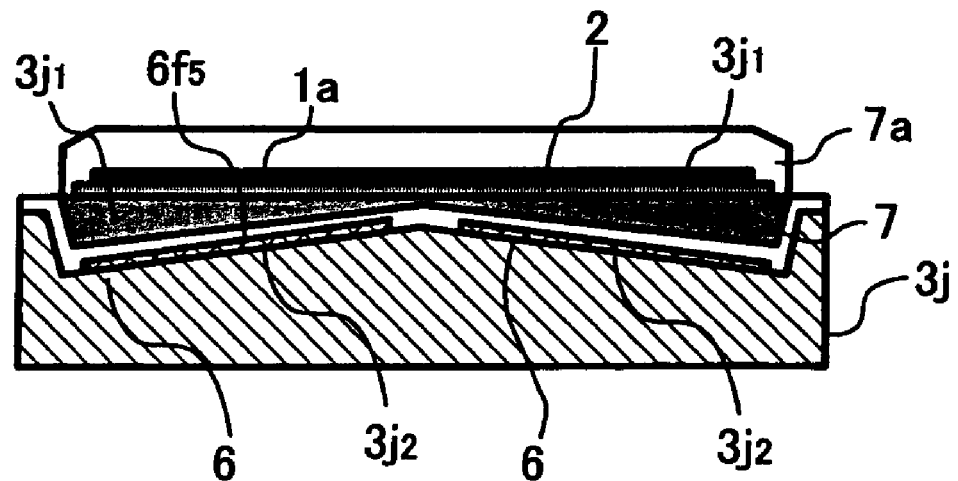

A subsequent process provides the electrodes 6 (i.e., the electrodes $6f_1$-$6f_4$) made of a titanium nitride film (see FIG. 73). In this process, a titanium nitride film is formed to have a thickness of 0.01 μm with the DC magnetron sputtering process and is patterned into the electrodes $6f_1$-$6f_4$ with the photography and the dry etching method.

Then, a next process provides a protection layer $6f_5$ made of a silicon nitride film having a thickness of 0.2 μm with the plasma CVD method. This protection layer $6f_5$ is formed to protect the surfaces of the electrodes $6f_1$-$6f_4$ (see FIG. 74).

A next process forms a noncrystalline silicon film having a thickness of 2 μm on the protection layer $6f_5$ with the plasma CVD. Then, the noncrystalline silicon film is polished to be smoothed, with the CMP. In this polishing, the substrate 3j and the protection layer $6f_5$ are used as etching stop layers.

In this process, the noncrystalline silicon film in the hollows 3j1 is not over-polished due to the effect of the etching stop layers, so that the smoothing of the noncrystalline silicon film is achieved under a high precision control.

In this example, the thickness of the noncrystalline silicon film remaining on the top of the supporting member is reduced to 0.2 μm. The noncrystalline silicon film remaining on the protection layer $6f_5$ is referred to as a first sacrifice layer 7 (see FIG. 75).

As an alternative to the noncrystalline silicon film, the first sacrifice layer 7 may be made of a polyimide film or a photosensitive organic film, or a resist film or a polycrystalline silicon film which are generally used in a semiconductor process. The smoothing method may be a reflow method with a thermal processing or an etch back method with the dry etching.

Then, a next process forms a silicon nitride layer of a 0.2-μm thick on the first sacrifice layer 7 with the plasma CVD method and subsequently forms an aluminum metal film of a 0.05-μm thick on the silicon nitride layer with the sputtering method. After that, the aluminum metal film is patterned into a conductive area of the plate 2 combining the reflecting surface 1a and the silicon nitride layer is patterned into the plate 2, with the photography and the dry etching method (see FIG. 76).

A next process provides a noncrystalline silicon film of a 1-μm thick on the conductive area of the plate 2 with the sputtering method. This noncrystalline silicon film is referred to as a second sacrifice layer 7a (see FIG. 77). The second sacrifice layer 7a may made of a polyimide film or a photosensitive organic film, or a resist film or polycrystalline silicon film which are generally used in a semiconductor process.

A subsequent process divides each light deflecting apparatus with patterns of the first and second sacrifice layers 7 and 7a together using the photography and the dry etching method. At this time, the pattern areas of the first and second sacrifice layers 7 and 7a are slightly larger than the area of the plate 2 including the conductive area combined with the reflecting surface 1a of the reflecting member 1 (see FIG. 78). This process prepares for a next process for providing the angle brackets 5 around the plate 2.

Figure 79:
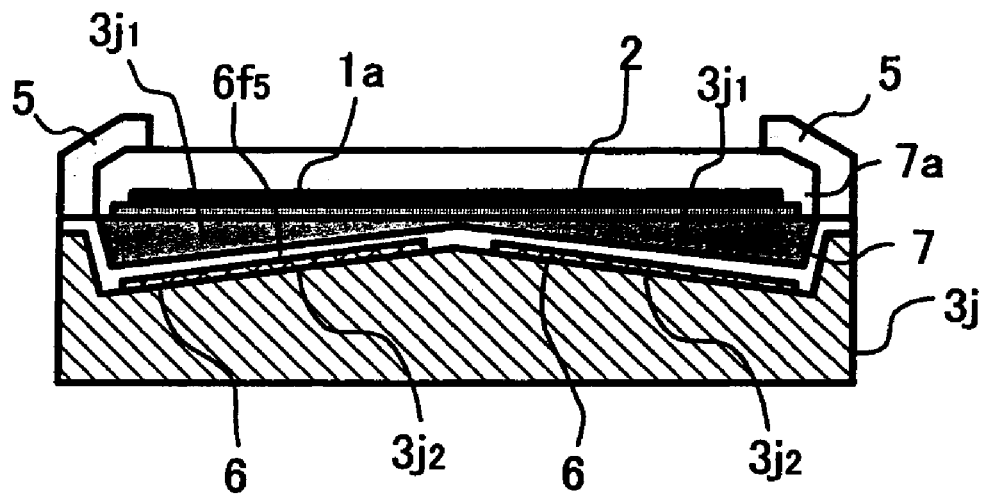
Figure 80:
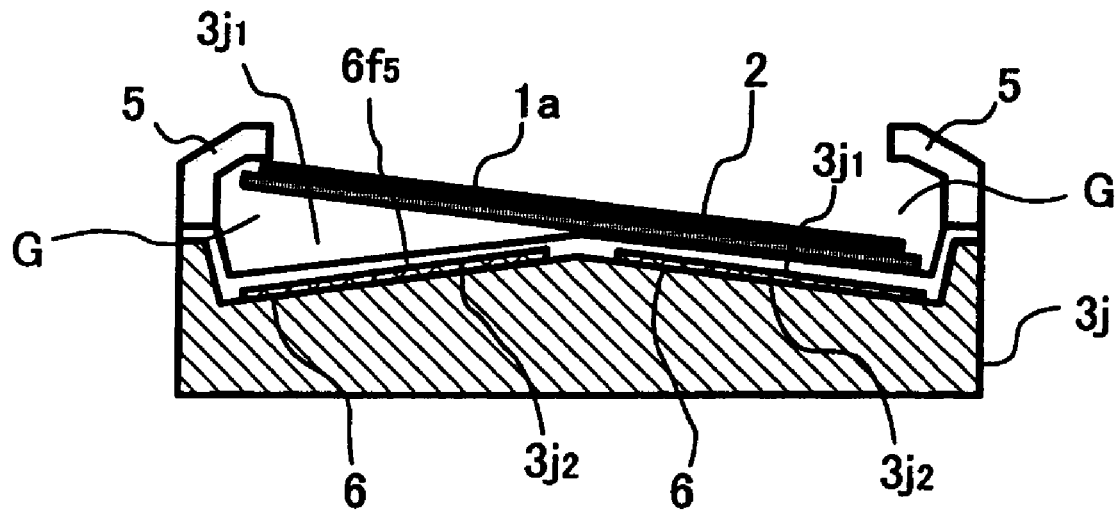

FIG. 79 shows a process for forming the angle brackets 5 (i.e., the angel brackets 5a1-5a4). In this process, a silicon oxide film of a 0.8-μm thick is formed with the plasma CVD method and is patterned to make the angle brackets 5 with the photography and the dry etching method.

Then, a final process removes the remaining first and second sacrifice layers 7 and 7a through an opening with a wet etching method so that the plate 2 is supported by the supporting member for a free movement within the free space G. Thus, the procedure for making the light deflecting apparatus 10j shown in FIG. 41 is completed (see FIG. 80).

In this process, the angle brackets 5 are positioned at the four corners of the first and second sacrifice layers 7 and 7a in the substantially square shape with leaving the four sides open and therefore the etching removal can be completed in a relatively short period of time.

In the process for forming the angle brackets 5 shown in FIG. 79, the angel brackets 5 may have other shapes as shown in FIGS. 60 and 61, for example.

The thus-made light deflecting apparatus 10j with the method explained with reference to FIGS. 72-80 is capable of stably performing a fast-responsive light deflection in directions with one deflection-axis or two deflection-axes by a simple control with a simple structure without restricting an input light wavelength. Further, the light deflecting apparatus 10j is operative with a relatively low driving voltage and has a stable mechanical strength for usage over an extended period of time with lesser variations or degradation in the mechanism.

In addition, the method explained with reference to FIGS. 72-80 is capable of achieving the micromachining and the integration machining in a relatively low cost, while requiring no specific use environment to the resultant light deflecting apparatus 10j.

Figure 81:
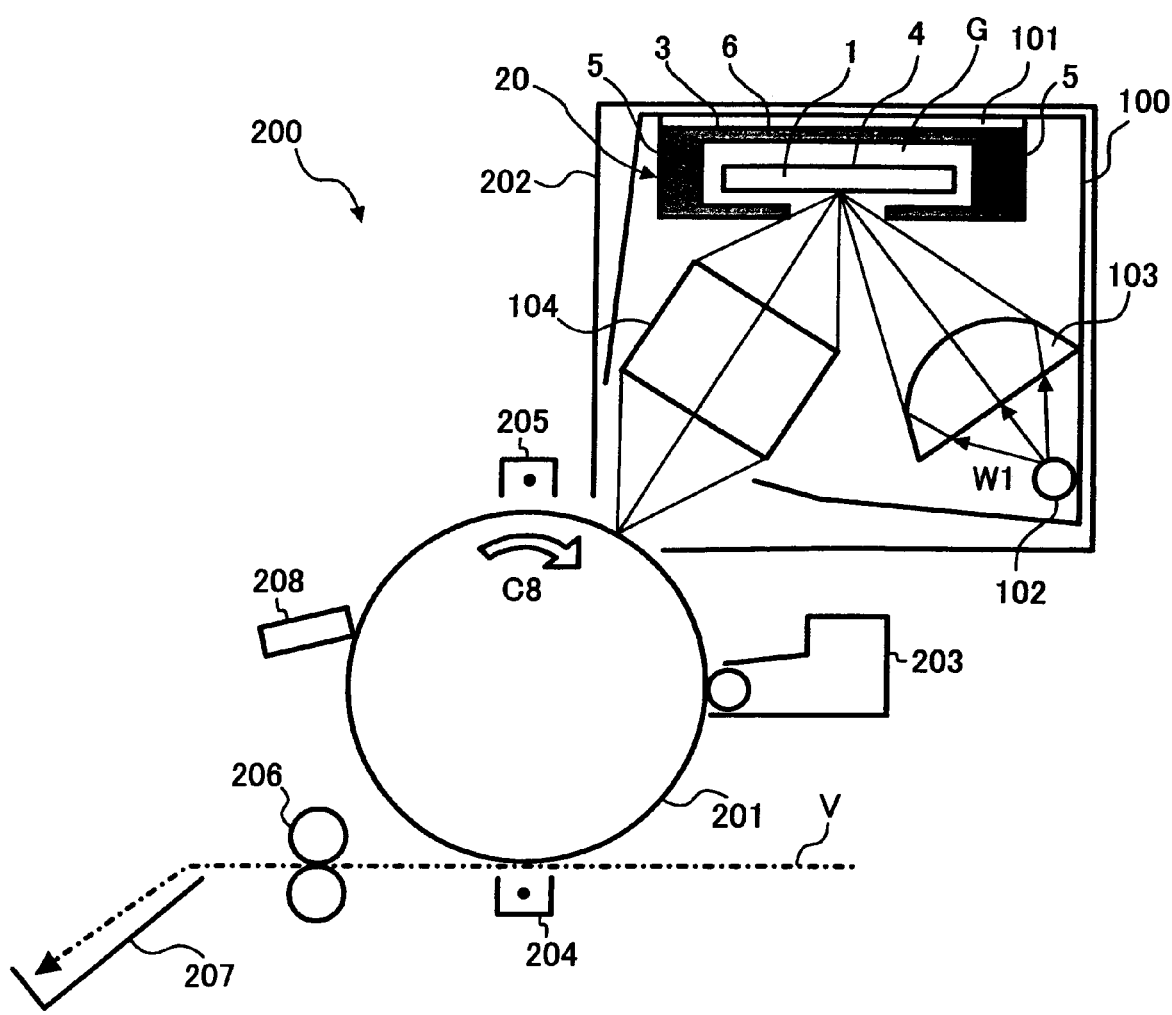
FIG. 81 is a schematic diagram for explaining an image forming apparatus including the light deflecting apparatus of FIG. 49.

Next, the image forming apparatus 200 is explained with reference to FIG. 81. FIG. 81 shows the image forming apparatus 200 which forms an image by optically writing image data with an electrophotographic method. The image forming apparatus 200 includes an image carrying mechanism 201, a latent image forming mechanism 202, a development mechanism 203, a transfer mechanism 204, a charging mechanism 205, a fixing mechanism 206, a sheet ejecting tray 207, and a cleaning mechanism 208.

The image carrying mechanism 201 includes a drum-shaped photosensitive surface and is rotated in a direction C8. The image carrying mechanism 201 is evenly charged by the charging mechanism 205. The latent image forming mechanism 202 forms a latent image on the photosensitive surface of the image carrying mechanism 201. The development mechanism 203 develops with toner the latent image formed on the photosensitive surface of the image carrying mechanism 201. The transfer mechanism 204 transfers the toner image onto a recording sheet V. The fixing mechanism 206 fixes the toner image to the recording sheet V with heat and pressure. The recording sheet V is ejected to the sheet ejecting tray 207. The cleaning mechanism 208 cleans off the photosensitive surface of the image carrying mechanism 201.

As shown in FIG. 81, the latent image forming mechanism 202 includes an optical information processing apparatus 100 which includes the light deflecting apparatus 20 of FIG. 49, i.e., a one-dimension light deflection array, including a plurality of the above-described light deflecting apparatuses 10, for example, arranged in a one-dimension formation. The optical information processing apparatus 100 further includes a driving mechanism 101, a light source 102, a first lens system 103, and a second lens system 104.

In the optical information processing apparatus 100, the light source 102 emits light W1 which travels through the first lens system 103 to each of the light deflecting apparatuses 10 of the light deflecting apparatus 20. The driving mechanism 101 independently drives each of the light deflecting apparatuses 10 of the light deflecting apparatus 20 in accordance with input image data. That is, the driving mechanism 101 independently changes the reflection angle relative to the input light W1 by changing the position of the plate 2 in each light deflecting apparatus 10 according to the input image data. Therefore, the reflection of the light W1 towards the photosensitive surface of the image carrying member 201 is controlled according to the input image data by the light deflecting apparatus 20. The light W1 reflected by the light deflecting apparatus 20 travels through the second lens system 104 to the photosensitive surface to form a latent image. Thus, the image forming apparatus 200 including the light deflecting apparatus 20 effectively forms an image according to the input image data.

Figure 82:
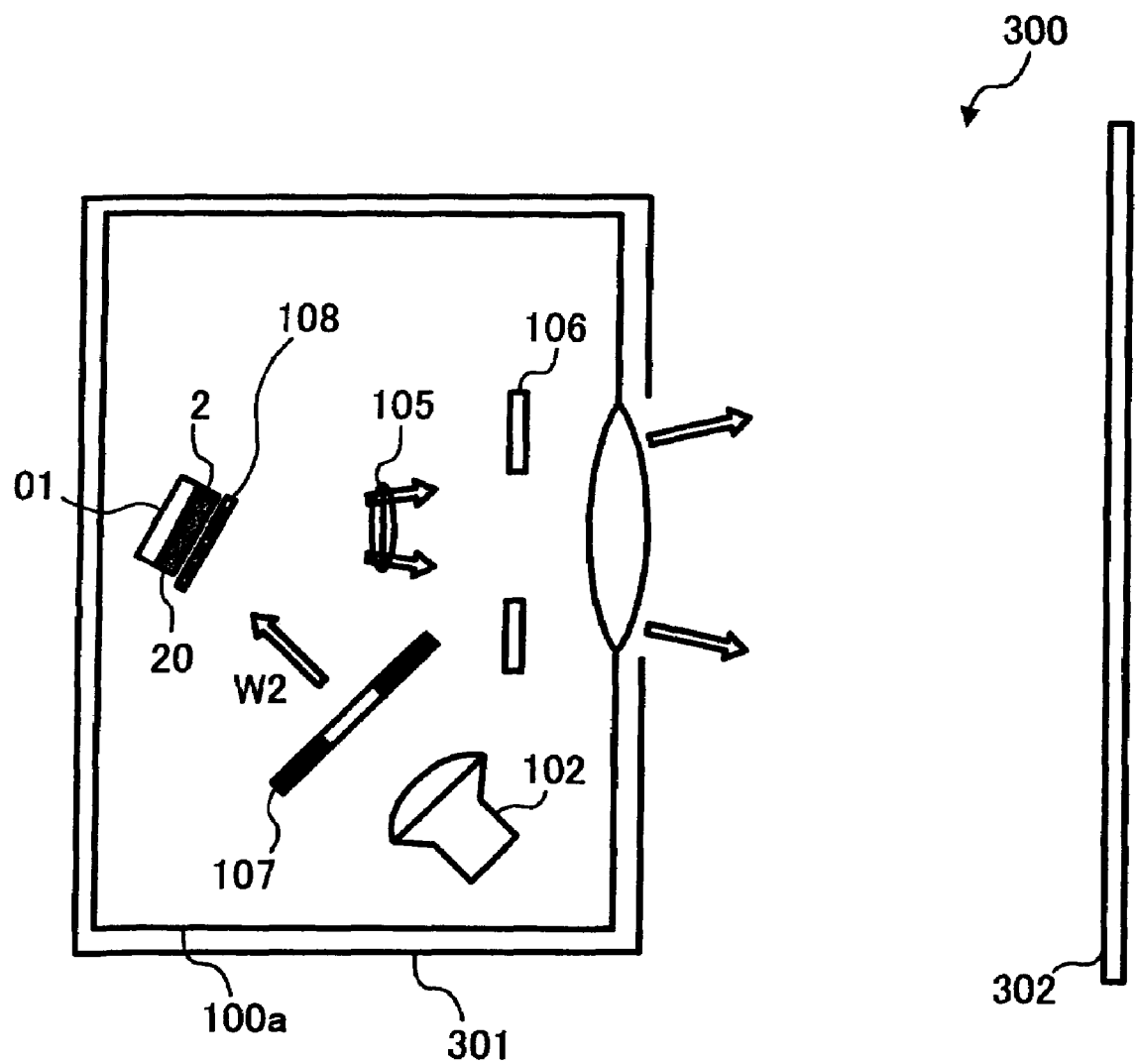
FIG. 82 is a schematic diagram for explaining an image projection display apparatus including the light deflecting apparatus of FIG. 50.

Next, the image projection display apparatus 300 is explained with reference to FIG. 82. FIG. 82 shows the image projection display apparatus 300 which projects an image by deflecting light of an image. The image projection display apparatus 300 includes a light switching mechanism 301 and a projection screen 302. The light switching mechanism 301 includes an optical information processing apparatus 100a which includes the light deflecting apparatus 30 of FIG. 50, i.e., a two-dimension light deflection array, including a plurality of the above-described light deflecting apparatuses 10, for example, arranged in a two-dimension formation. The optical information processing apparatus 100a further includes the driving mechanism 101, the light source 102, a projection lens 105, an aperture 106, a rotary color hole 107, and a micro-lens array 108.

In the optical information processing apparatus 100a, the light source 102 emits light W2 which travels, through the rotary color hole 107 for a color display and the micro-lens array 108 for a high precision, to each of the light deflecting apparatuses 10 of the light deflecting apparatus 30. The driving mechanism 101 independently drives each of the light deflecting apparatuses 10 of the light deflecting apparatus 30 in accordance with input image data. That is, the driving mechanism 101 independently changes the reflection angle relative to the input light W2 by changing the position of the plate 2 in each light deflecting apparatus 10 according to the input image data. Therefore, the reflection of the light W2 towards the screen 302 is controlled according to the input image data by the light deflecting apparatus 30. The light W2 reflected by the light deflecting apparatus 30 travels through the projection lens 105 and the aperture 106 to the screen 302 to form an image. Thus, the image projection display apparatus 300 including the light deflecting apparatus 30 effectively projects a desired image on the screen.

Figure 83:
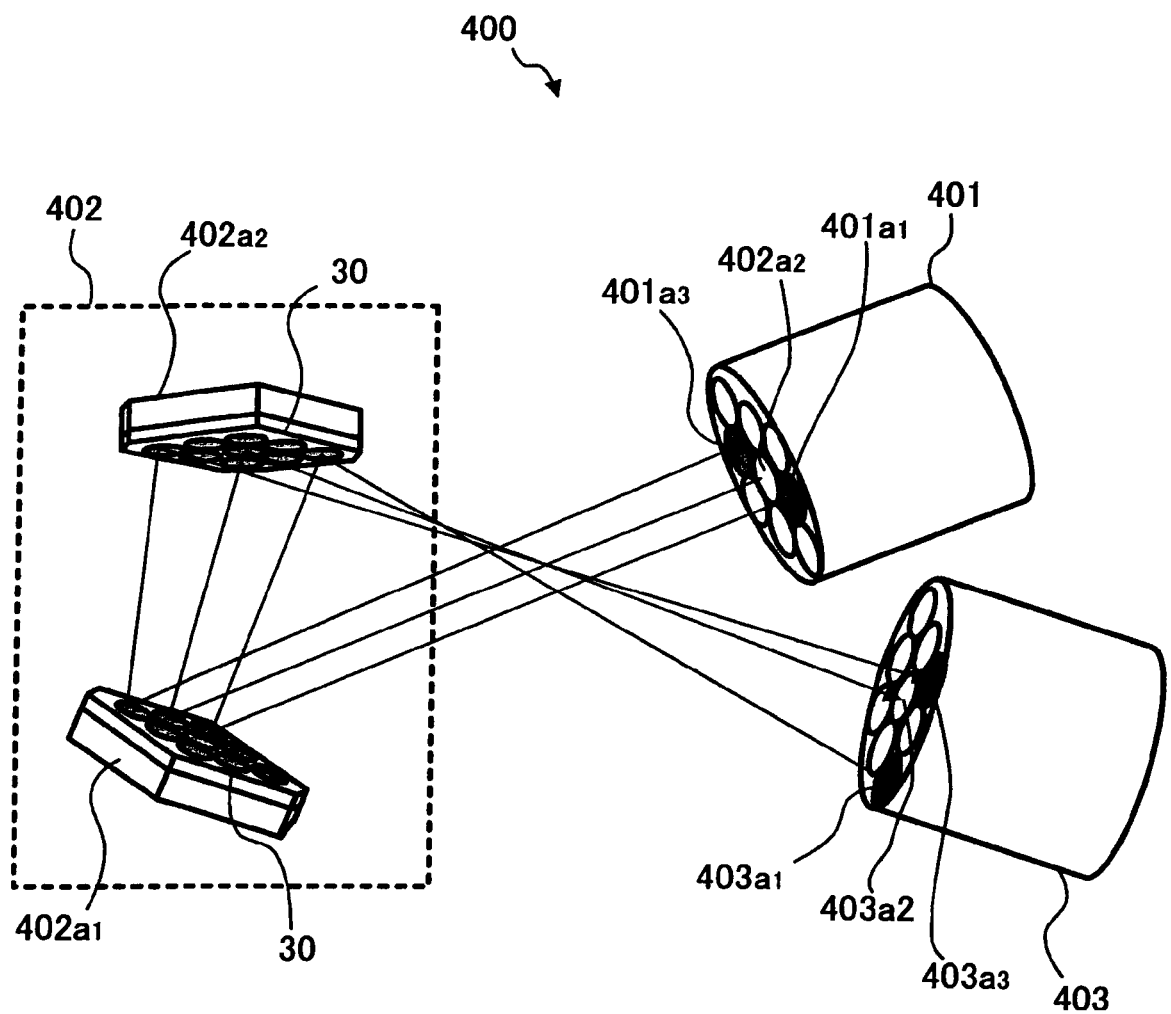
FIG. 83 is a schematic diagram for explaining an optical data transmission apparatus including the light deflecting apparatus of FIG. 50.

Next, the optical data transmission apparatus 400 is explained with reference to FIG. 83. FIG. 83 shows the optical data transmission apparatus 400 for transmitting an optical data signal. The optical data transmission apparatus 400 includes an optical data input mechanism 401, an optical data switching mechanism 402, and an optical data output mechanism 403.

The optical data input mechanism 401 includes a plurality of transmission ports, including transmission ports 401a1, 401a2, and 401a3, for example, for inputting optical data signals to the optical data switching mechanism 402. The optical data switching mechanism 402 includes light deflection controllers 402a1 and 402a2 and corresponding two stages of the light deflecting apparatuses 30 of FIG. 50, i.e., a two-dimension light deflection array, each including a plurality of the above-described light deflecting apparatuses 10, for example, arranged in a two-dimension formation. Each of light deflection controllers 402a1 and 402a2 independently and simultaneously drives the plurality of light deflecting apparatuses 10 included in each of the two light deflecting apparatuses 30. The optical data switching mechanism 402 determines light reflection directions with respect to the input optical data signals by switching the light reflection angles in the one-dimension direction or in the two-dimension direction of the plate 2 in each of the light deflecting apparatus 10 of the light deflecting apparatus 30. The optical data output mechanism 403 includes a plurality of transmission ports, including transmission ports 401b1, 401b2, and 401b3, for example, for outputting the optical data signals emitted from the optical switching mechanism 402.

Thus, the optical data transmission apparatus 400 including the light deflecting apparatus 30 effectively transmits the optical data.

In the above-described optical data switching mechanism 402, the light deflection angle is made relatively large by having the two stages of the light deflecting apparatus 30. However, a single stage of the light deflecting apparatus 30 may be used when the number of the selectable transmission ports is relatively small.

Figure 84:
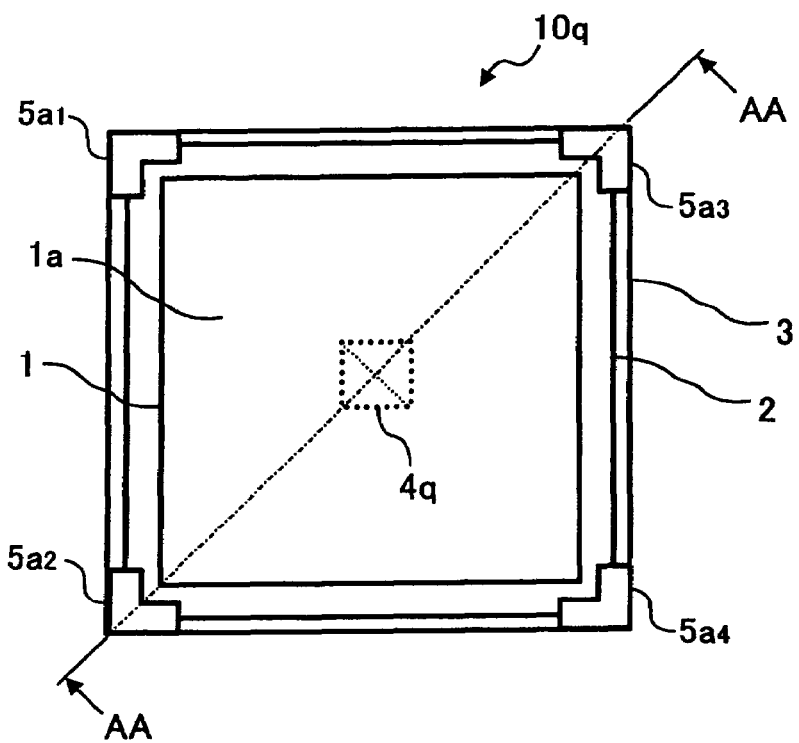
FIGS. 84 and 85 are schematic diagrams of a light deflecting apparatus according to another embodiment of the present invention.
Figure 85:
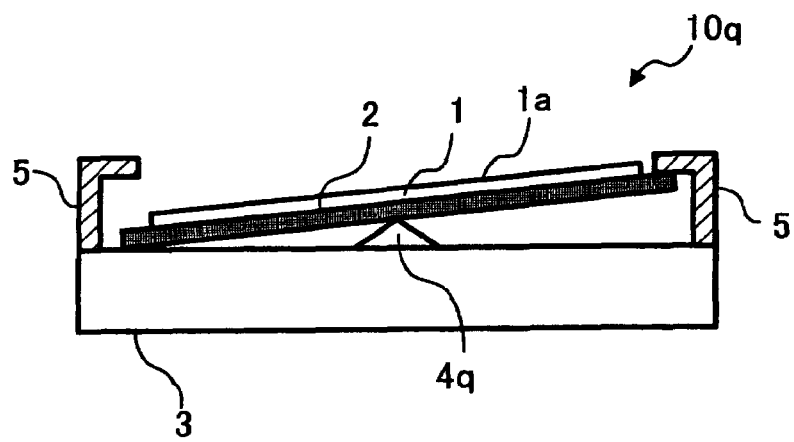

Referring to FIGS. 84 and 85, a light deflecting apparatus 10q according to another preferred embodiment of the present invention is explained. FIG. 84 is a plane view of the light deflecting apparatus 10q, and FIG. 85 is a cross-section view of the light deflecting apparatus 10q taken on line AA-AA of FIG. 84. The light deflecting apparatus 10q of FIG. 84 is an apparatus modified on the basis of the light deflecting apparatus 10c of FIG. 12, that is, the supporting member 4c is modified to a supporting member 4q having a pyramid shape. The top of the supporting member 4q is preferably rounded to disperse the stress, but it may also be pointed. The supporting member 4*q* is made of a silicon oxide film or a silicon nitride film, for example, and therefore it may have a relatively high mechanical strength.

Figure 86:
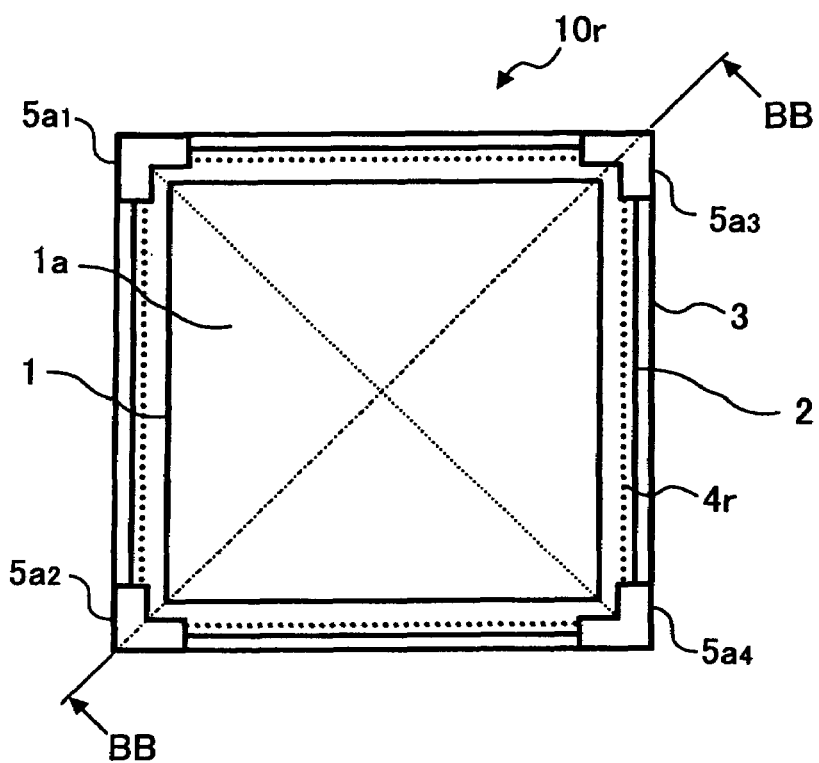
FIGS. 86 and 87 are schematic diagrams of a light deflecting apparatus according to another embodiment of the present invention.
Figure 87:
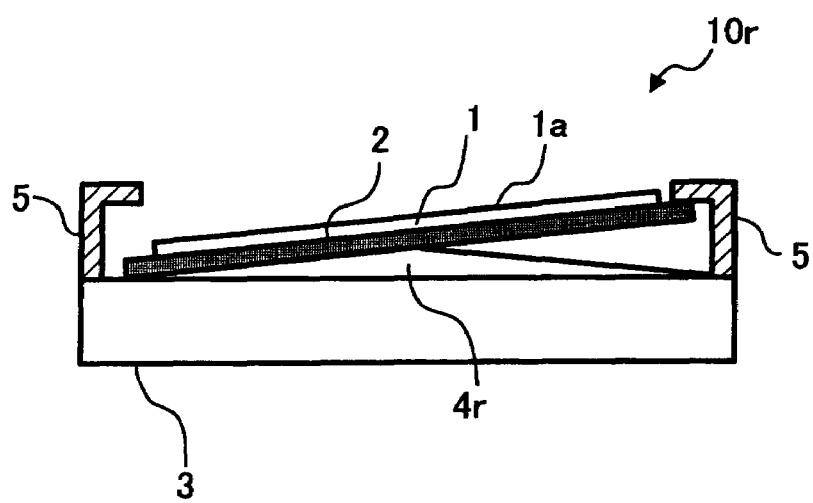

Referring to FIGS. 86 and 87, a light deflecting apparatus 10*r* according to another preferred embodiment of the present invention is explained. FIG. 86 is a plane view of the light deflecting apparatus 10*r*, and FIG. 87 is a cross-section view of the light deflecting apparatus 10*r* taken on line AA-AA of FIG. 86. The light deflecting apparatus 10*r* of FIG. 86 is an apparatus modified on the basis of the light deflecting apparatus 10*c* of FIG. 12, that is, the supporting member 4*c* is modified to a supporting member 4*r* having a pyramid shape which base has an area substantially equal to that of the plate 2. With this structure, the plate 2 can stably maintain its position when tilted due to the electrostatic attraction force since the supporting surface of the supporting member 4*r* is wide.

Figure 88:
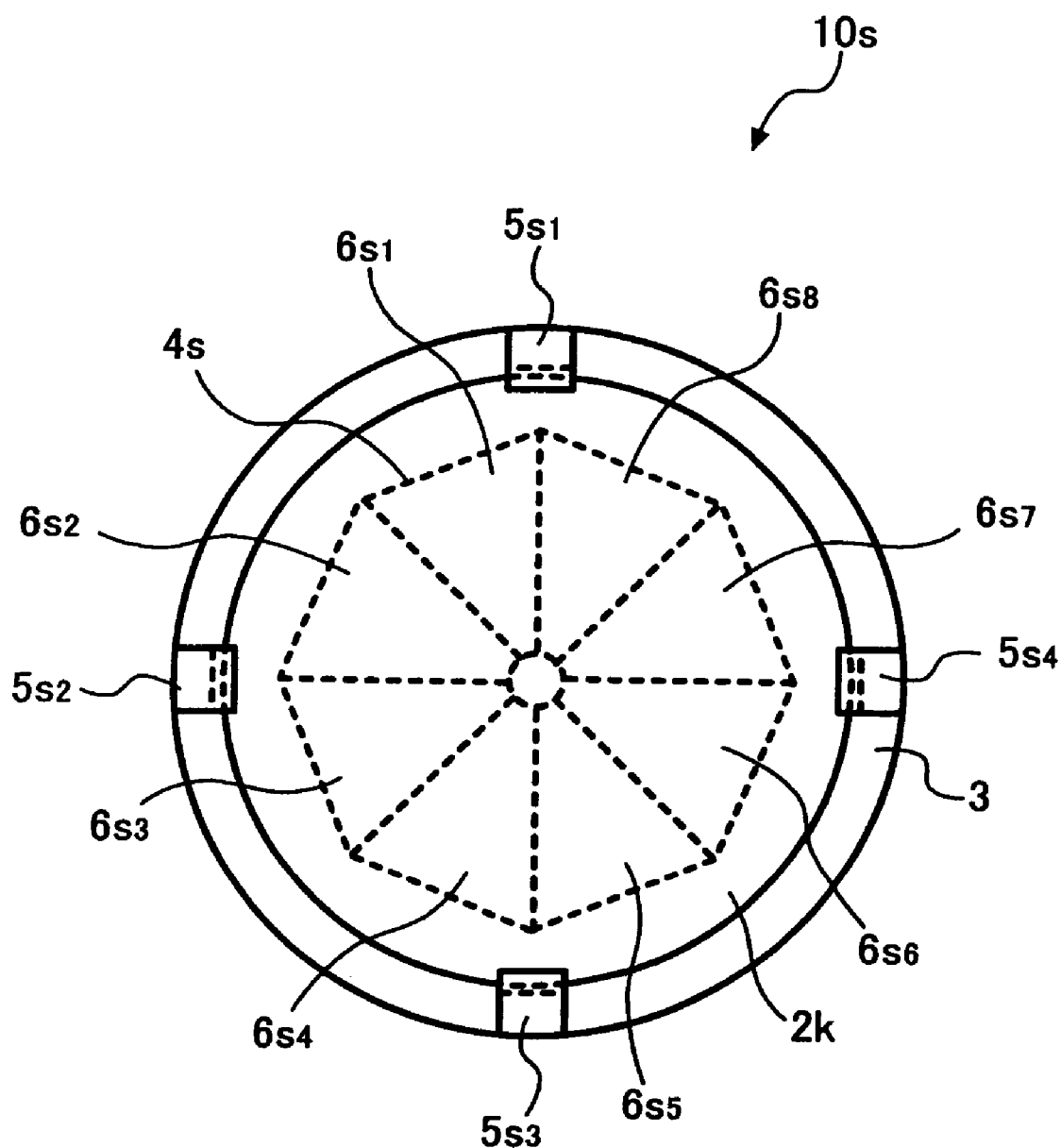
FIG. 88 is a schematic diagram of a light deflecting apparatus according to another embodiment of the present invention.

Referring to FIG. 88, a light deflecting apparatus 10*s* according to another preferred embodiment of the present invention is explained. FIG. 88 is a plane view of the light deflecting apparatus 10*s*. The light deflecting apparatus 10*s* of FIG. 88 is an apparatus modified on the basis of the light deflecting apparatus 10*k* of FIG. 42, that is, the supporting member 4 is modified to an octagonal pyramid supporting member 4*s* and the four-piece electrodes 6*k*1-6*k*4 are modified to eight pieces of corresponding triangular electrodes 6*s*1-6*s*8. In addition, the single circumferential angle bracket 5*k* is modified to four piece angle brackets 5*s*1-5*s*4.

For example, when the electrodes 6*s*1-6*s*8 are applied with the following voltages:

6*s*1-6*s*5; Y/2 volts,
6*s*6; Y volts,
6*s*7; Y/2 volt, and
6*s*8; 0 volts, the plate 2*k* is attracted by the electrostatic attraction forces acting between the plate 2*k* and the electrode 6*s*6 and between the plate 2*k* and the electrode 6*s*8 and is eventually tilted to sit on the portion of the supporting member 4*ka* corresponding to the electrode 6*s*7 existing between the electrodes 6*s*6 and 6*s*8.

The base area of the octagonal pyramid supporting member 4*s* is preferably close to the area of the plate 2*k* so that the plate 2*k* stably sits on the corresponding portion of the supporting member 4*s*.

In this example, the four angle brackets 5*s*₁-5*s*₄ are discretely disposed on the circular edge of the substrate 3. Whether such discrete arrangement or the single circumferential arrangement as shown in FIG. 42 may be determined when an entire array structure is designed.

The shape of the supporting member 4*s* is not limited to the octagonal pyramid and may be any polygonal pyramid such as a hexagonal pyramid, a heptagonal pyramid, a decagonal pyramid, and so forth. For example, when the supporting member 4*s* is a hexagonal pyramid, the light deflection is made with three axes. Likewise, an octagonal pyramid member makes the light deflection with four axes and a decagonal pyramid member makes the light deflection with five axes.

Furthermore, even if the supporting member has a conical shape, the plate 2*k* may effectively tilt with the electrode divided into an arbitrary plural electrically-isolated pieces such as the electrodes 6*ka*₁-6*ka*₈, although the plate 2*k* may not stably sit on such conical shape supporting member.

Figure 89:
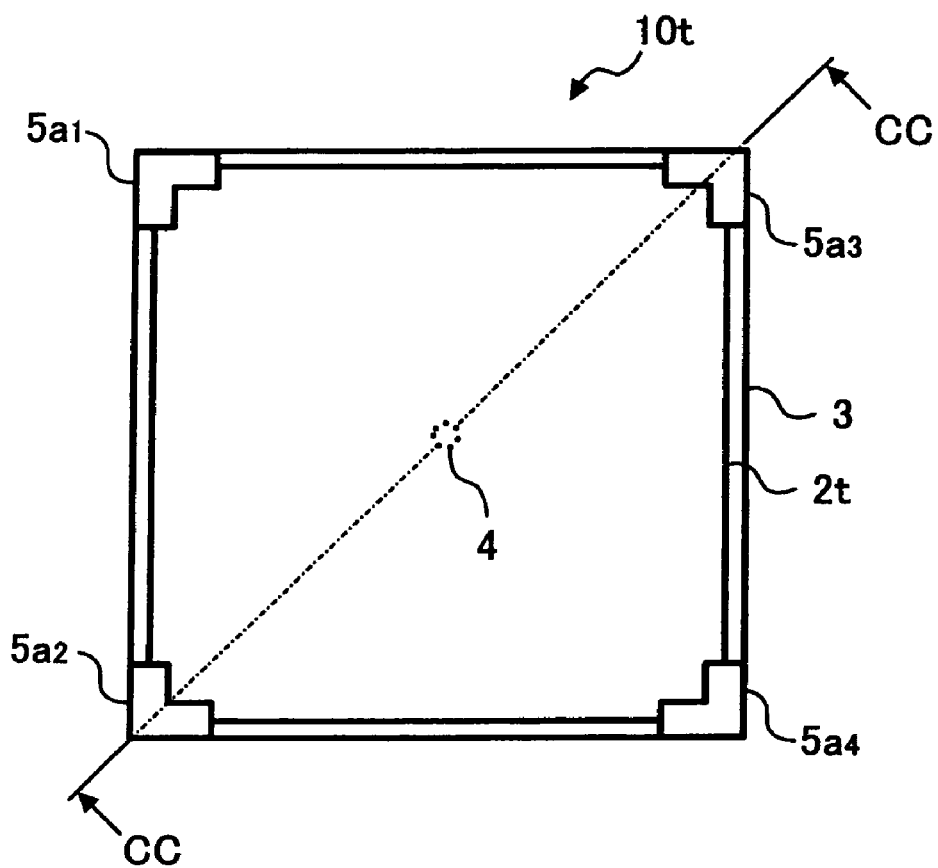
FIGS. 89 and 90 are schematic diagrams of a light deflecting apparatus according to another embodiment of the present invention.
Figure 90:
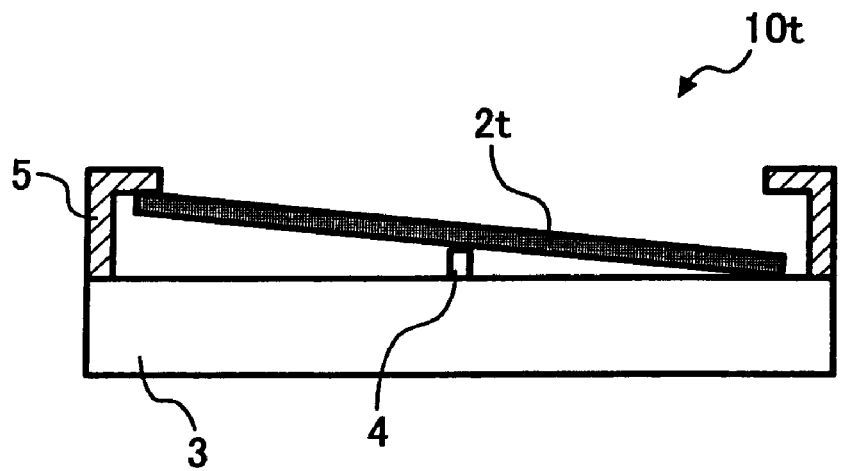

Referring to FIGS. 89 and 90, a light deflecting apparatus lot according to another preferred embodiment of the present invention is explained. FIG. 89 is a plane view of the light deflecting apparatus 10*t*, and FIG. 90 is a cross-section view of the light deflecting apparatus 10*t* taken on line CC-CC of FIG. 89. The light deflecting apparatus 10*t* of FIG. 89 is an apparatus modified on the basis of the light deflecting apparatus 10 of FIG. 1, that is, the plate 2 is modified to a single-layered plate 2*t* made of a material such as aluminum having a relatively high reflectance. With the aluminum single-layered plate 2*t*, the plate is not needed to have an extra reflecting member (e.g., the reflecting member 1).

Figure 91A:
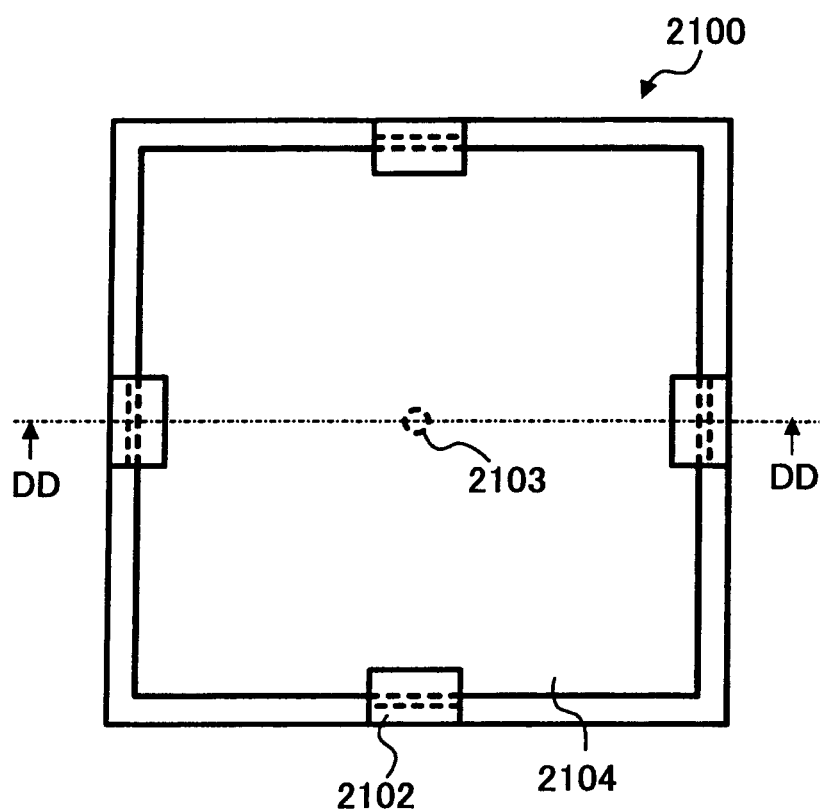
FIGS. 91A and 91B are schematic diagrams of a light deflecting apparatus according to another embodiment of the present invention.
Figure 91B:
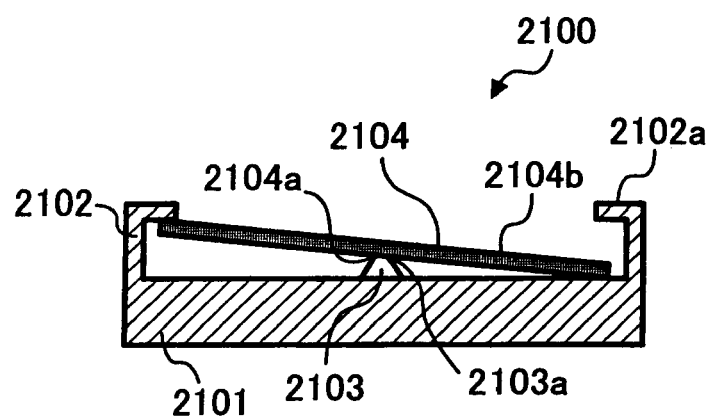

Next, a light deflecting apparatus 2100 according to another preferred embodiment of the present invention with reference to FIGS. 91A and 91B. FIG. 91A is a plane view of the light deflecting apparatus 2100, and FIG. 91B is a cross-section view taken on line DD-DD of FIG. 91A. The light deflecting apparatus 2100 deflects input light into a signal axial reflective direction or two axial reflective directions. As shown in FIGS. 91A and 91B, the light deflecting apparatus 2100 includes a substrate 2101, an angle bracket 2102, a supporting member 2103, and a plate 2104.

The substrate 2101 may be made of any material but is preferably, in consideration of miniaturization, a material generally used in a semiconductor process or a liquid crystal process, such as silicon, glass, or the like. The substrate 2101 may be combined with a driving circuit substrate (not shown) having a plane direction (100) to make the light deflecting apparatus 2100 in a simple and lower cost structure.

The angle brackets 2102 have a stopper 2102*a* at one end thereof for stopping the plate 2104. The angle brackets 2102 are preferably made of a material capable of being miniaturized and having a high mechanical strength in order to maximize an area ratio of the reflection region, particularly, when a plurality of the light reflecting apparatuses are miniaturized into an array form. In addition, since the angle brackets 2102 are likely to be obstacles to the mirroring operation, the angle brackets 2102 are preferably made of a translucent material such as a silicon oxide film so as to minimize a loss of the mirroring capability. However, when a scattering is being concerned, the angle brackets 2102 may be subjected to a treatment of providing a nature of an optical absorption to the surface thereof.

The supporting member 2103 preferably has a conical shape and its top portion 2103*a* serves as a fulcrum for the movement of the plate 2104. However, the shape of the supporting member 2103 is not limited to the cone but any shape capable of being a fulcrum for the movement of the plate 2104. At least the top portion 2103*a* of the supporting member 2103 contacting the plate 2104 is conductive. The supporting member 2103 needs to have a good conductivity and a high mechanical strength, and is preferably made of a crystal silicon film or a polycrystalline silicon film, having a low resistivity, a metal film, a metal silicide film such as a tungsten silicide film and a titan silicide film, or a multi-layered film including a metal film and an insulation film such as a silicon oxide film and a silicon nitride film. In the case of the multi-layered film including a metal film and an insulation film, a potential applying line for applying a potential to the plate 2104 and a connection hole for connecting the metal film.

The plate 2104 has no edge portion fixed, and is movably held on the top portion 2103*a* of the supporting member 2103. The plate 2104 moves within a predetermined space determined by the substrate 2101, the supporting member 2103, the angle brackets 2102, and the stoppers 2102*a*. The plate 2104 is entirely made of a conductive layer. However, the plate 2104 partly including a conductive layer on the upper or bottom surface thereof may be used due to a reason of an action by an electrostatic attraction force, later explained.

The plate 2104 includes a contact portion 2104*a* in a bottom side thereof contacting the supporting member 2103 and, in the plate 2104, at least the contact portion 2104a is conductive. The contact portion 2104a may be the above-mentioned conductive layer or a separate portion. When the contact portion 2104a is separate from the conductive portion, they are needed to be electrically connected. The plate 2104 needs to have a good conductivity and a high mechanical strength and is preferably made of a metal film including an aluminum, a chromium, a titanium, a gold, or a silver. When a light reflecting region 2104b of the plate 2104 is an entire upper surface of the plate 2104, the plate 2104 is preferably made of an aluminum metal having a superior reflection capability. As described above, the plate 2104 is restricted in moving within the predetermined space and, for this purpose, the angel brackets 2102 are arranged to allow the plate 2104 to tilt about the contacting portion 2104a supported by the top portion 2103a of the supporting member 2103. Furthermore, the plate 2104 is preferably plane and at least the light reflecting region 2104b is preferably flat. The flatness of the plate 2104 allows the light lays entering the light reflecting region 2104b to be reflected in an aligned direction. The plate 2104 preferably has a radius of curvature of a few meters or greater. The light reflecting region 2104b may be referred simply to as a light reflecting surface when discussing merely on the light reflecting function of the light reflecting region 2104b.

Figure 103:
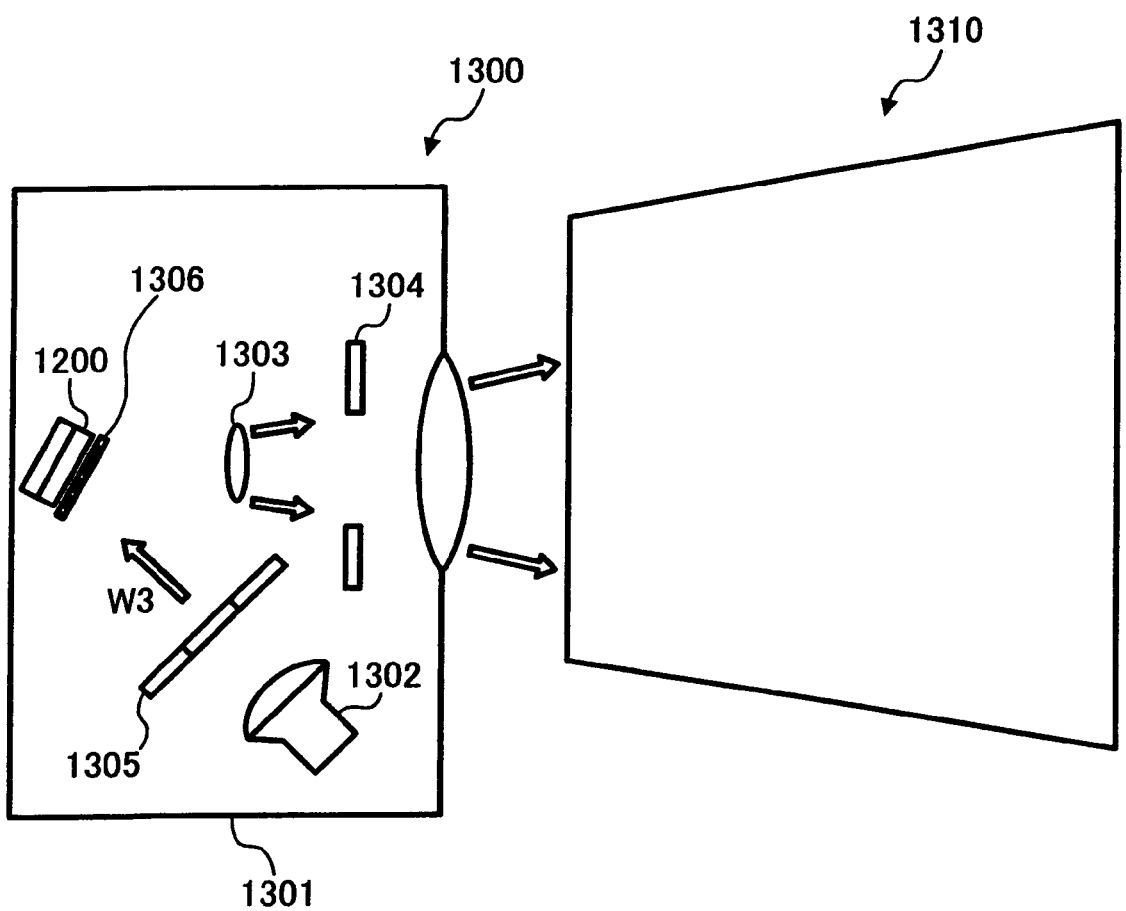
FIG. 103 is a schematic diagram of an image projection display apparatus according to an embodiment of the present invention.
Figure 104:
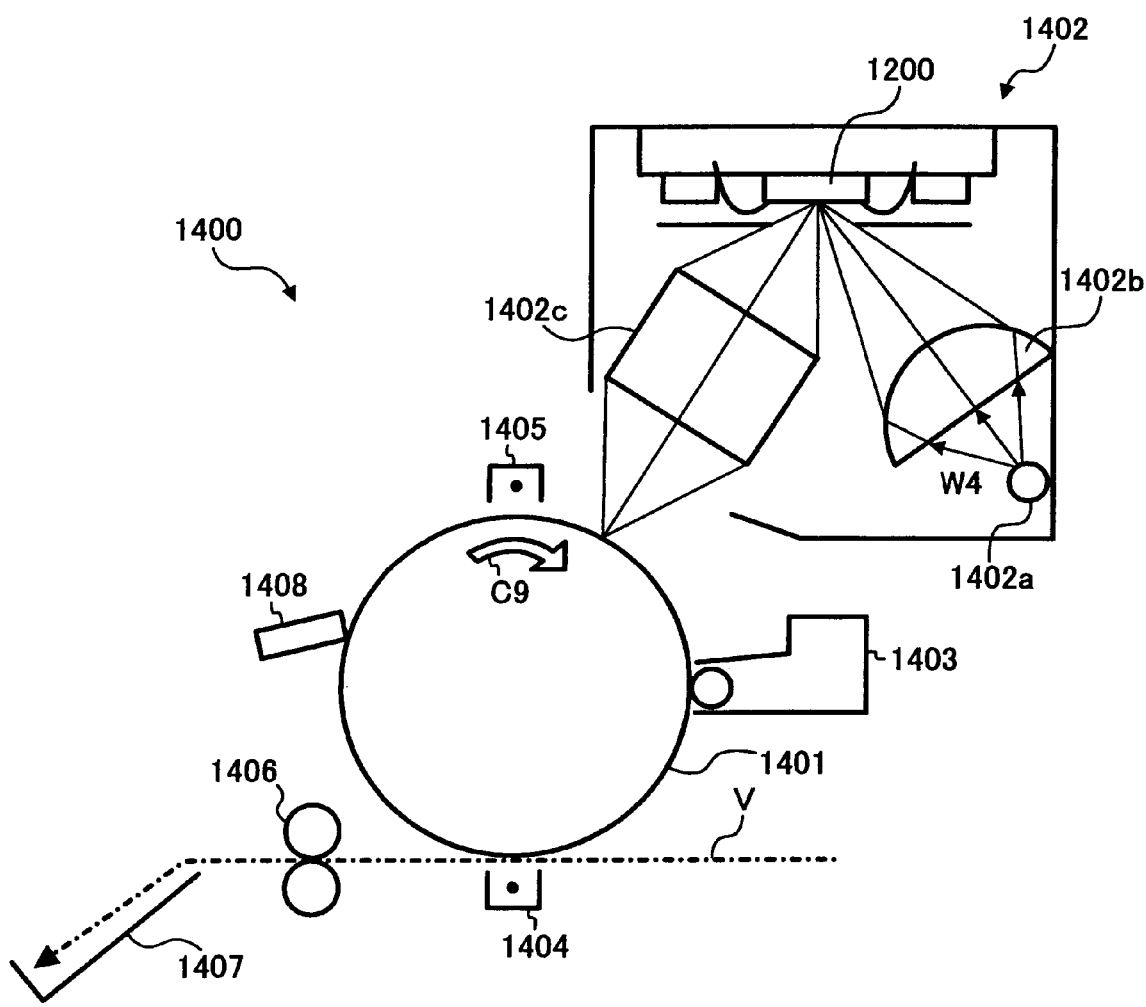
FIG. 104 is a schematic diagram of an image forming apparatus according to an embodiment of the present invention.

The above-described feature by the flatness of the light reflecting region 2104b avoids an adverse effect to between adjacent optical devices and is therefore important in particular when the light deflecting apparatus 2100 is employed in optical equipment such as an optical information processing apparatus, an image forming apparatus (e.g., an image forming apparatus 1300 explained later with reference to FIG. 103), an image projection display apparatus (e.g., an image projection display apparatus 1400 explained later with reference to FIG. 104), an optical transmission apparatus (e.g., an optical data transmission apparatus 1500 explained later with reference to FIG. 105), and so forth.

Figure 92A:
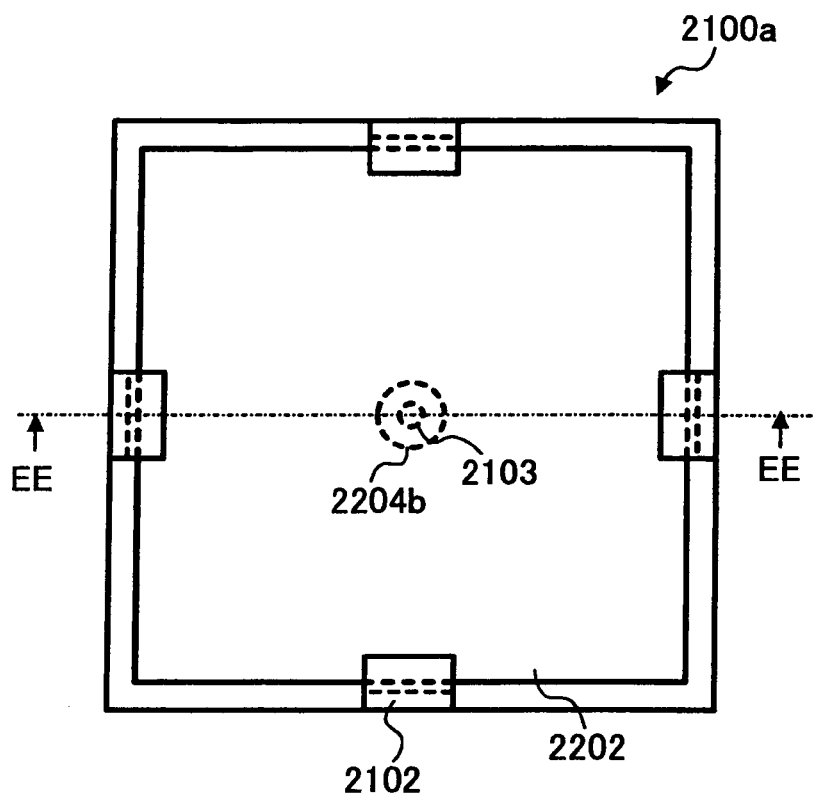
FIGS. 92A and 92B are schematic diagrams of a light deflecting apparatus according to another embodiment of the present invention.
Figure 92B:
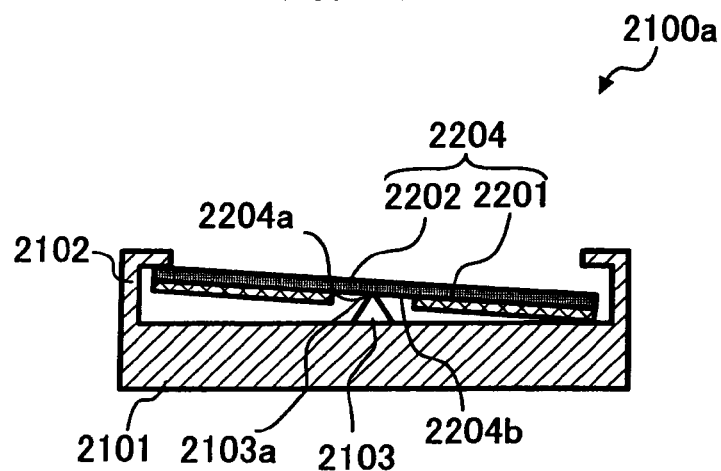

Referring to FIGS. 92A and 92B, a light deflecting apparatus 2100a according to another preferred embodiment of the present invention is explained. FIG. 92A is a plane view of the light deflecting apparatus 2100a, and FIG. 92B is a cross-section view of the light deflecting apparatus 2100a taken on line EE-EE of FIG. 92A. The light deflecting apparatus 2100a of FIG. 92A is an apparatus modified on the basis of the light deflecting apparatus 2100 of FIG. 91A, that is, the plate 2104 is modified to a plate 2204 including a dielectric layer 2201 and a conductive layer 2202. In addition, the plate 2204 includes a contacting portion 2204a which includes the conductive layer 2202 to contact the top portion 2103a of the supporting member 2103. The conductive layer 2202 may be structured in a manner similar to the plate 2104 of FIG. 91B. The dielectric layer 2201 preferably has a high dielectric strength of three or greater. More preferably, the dielectric layer 2201 is made of a silicon nitride film, having a dielectric strength of from 6 to 8 and a high mechanical strength. Reference numeral 2204b denotes an opening formed in the dielectric layer 2201 so that the contacting portion 2204a contacts the top portion 2103a. The opening 2204b is formed with a patterning process by the photography.

Figure 93A:
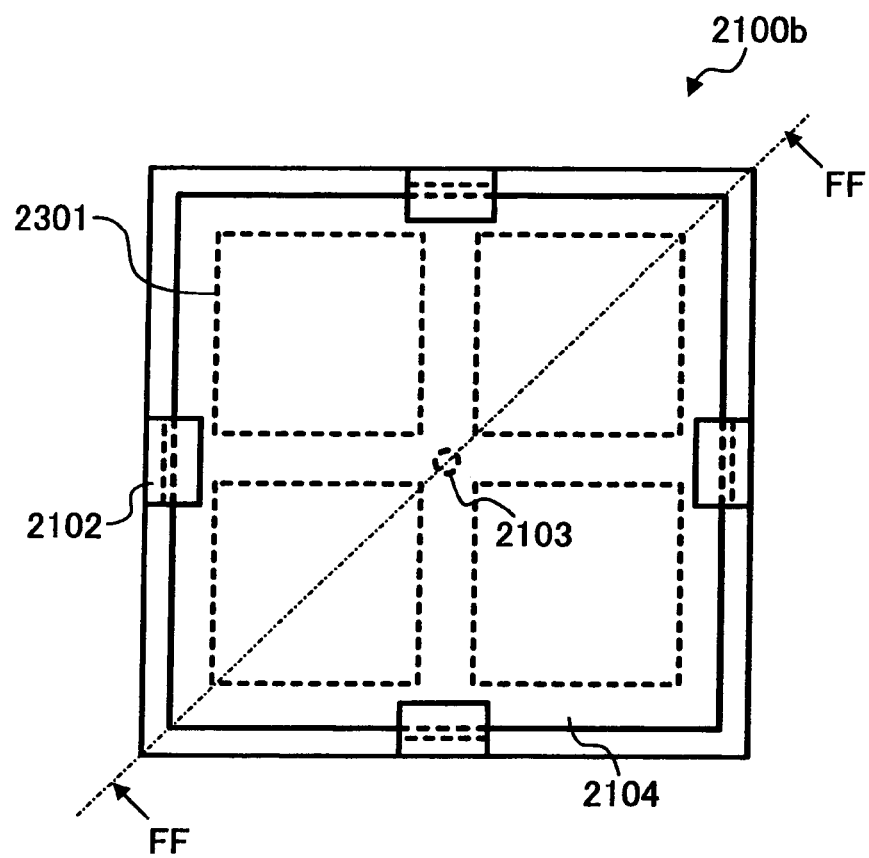
FIGS. 93A and 93B are schematic diagrams of a light deflecting apparatus according to another embodiment of the present invention.
Figure 93B:
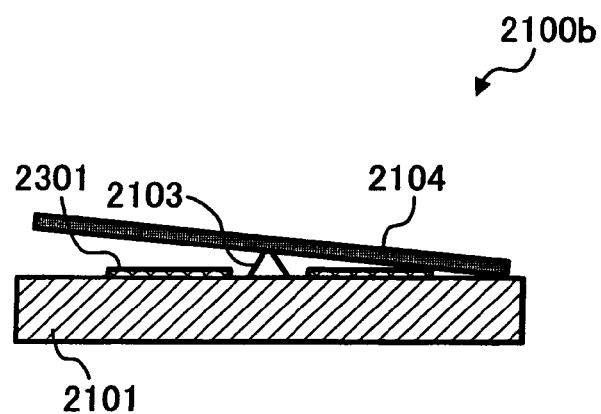

Referring to FIGS. 93A and 93B, a light deflecting apparatus 2100b according to another preferred embodiment of the present invention is explained. FIG. 93A is a plane view of the light deflecting apparatus 2100b, and FIG. 93B is a cross-section view of the light deflecting apparatus 2100b taken on line FF-FF of FIG. 93A. The light deflecting apparatus 2100b of FIG. 93A is an apparatus modified on the basis of the light deflecting apparatus 2100 of FIG. 91A, that is, four electrodes 2301 are provided to the upper surface of the substrate 2101.

The electrodes 2301 are electrically separated from the conductive top portion 2103a of the supporting member 2103. The electrodes 2301 need to be conductive and are made of metal such as an aluminum metal, titanium nitride, or a titanium. The electrodes 2301 are arranged such that at least a portion of the conductive layer included in the plate 2104 faces the electrodes 2301. A space between the portions thus facing each other is acted with an electrostatic attraction force generated due to a difference between voltages applied to one of the electrodes 2301 and to the plate 2104 via the supporting member 2103 so that the plate 2104 is tilted in a desired direction. When the application of voltage to the electrode 2301 is changed to another electrode 2301, the plate 2104 can quickly move in another direction. Thus, by arbitrarily changing the application of the voltage to the four electrodes 2301, the tilt movement of the plate 2104 can be controlled with tow-axis directions in a high precision manner.

Figure 94A:
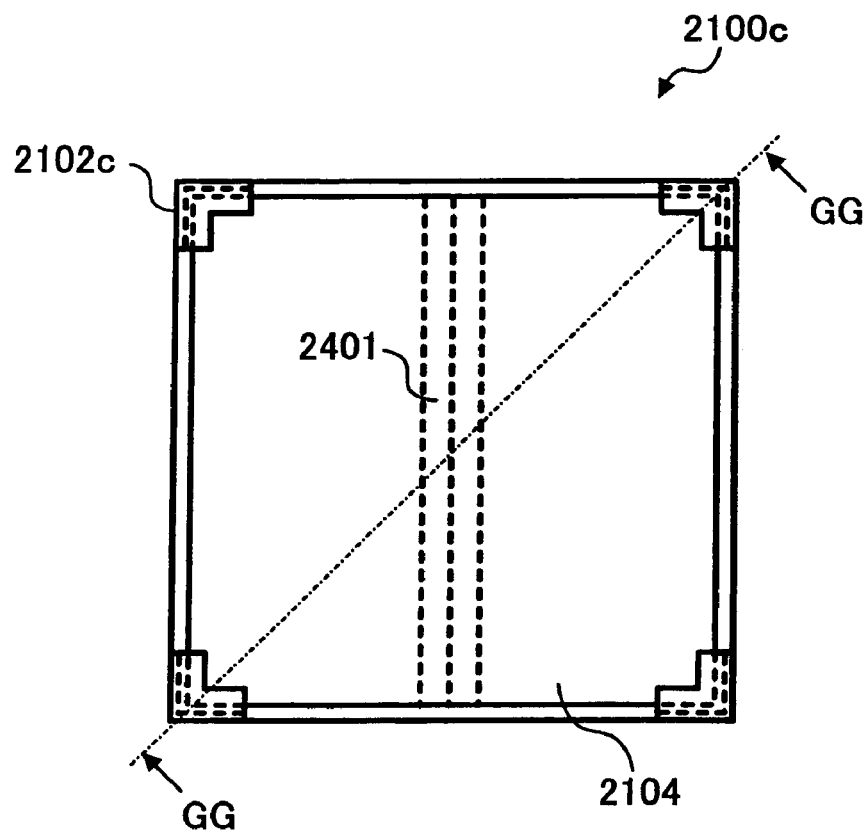
FIGS. 94A and 94B are schematic diagrams of a light deflecting apparatus according to another embodiment of the present invention.
Figure 94B:
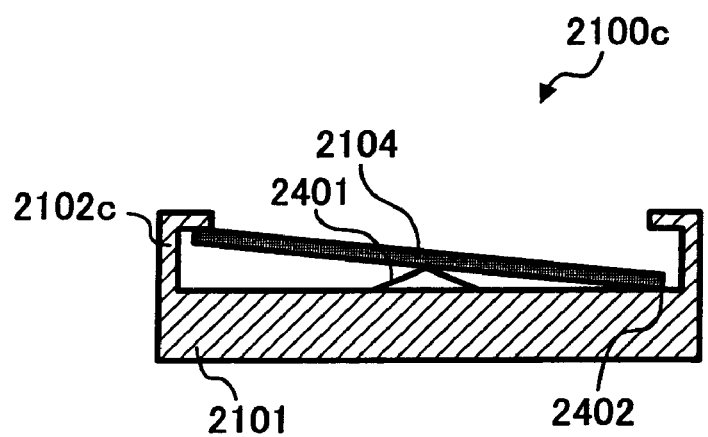
Figure 95A:
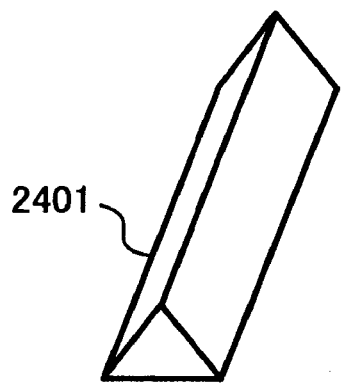
FIGS. 95A-95C are illustrations showing different shapes of supporting member.
Figure 95B:
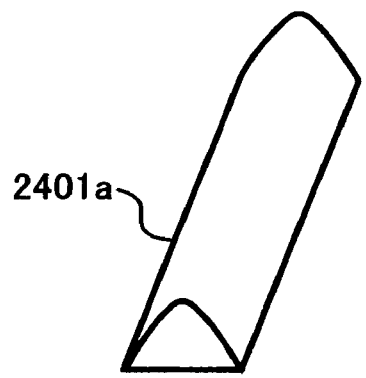
Figure 95C:
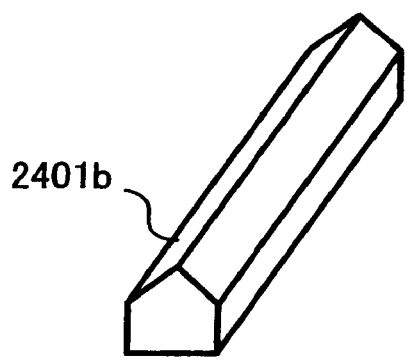

Referring to FIGS. 94A and 94B, a light deflecting apparatus 2100c according to another preferred embodiment of the present invention is explained. FIG. 94A is a plane view of the light deflecting apparatus 2100c, and FIG. 94B is a cross-section view of the light deflecting apparatus 2100c taken on line GG-GG of FIG. 94A. The light deflecting apparatus 2100c of FIG. 94A is an apparatus modified on the basis of the light deflecting apparatus 2100 of FIG. 91A, that is, the supporting member 2103 is modified to a supporting member 2401 having a rectangular solid shape. In addition, the angle brackets 2102 are modified to angle brackets 2102c differently shaped and arranged from those of the light deflecting apparatus 2100 of FIG. 91A. As shown in FIG. 95A, the supporting member 2401 has a ridgeline supporting the plate 2104 and two wide area slopes for contacting the plate 2104 when the plate 2104 is tilted. With this ridgeline of the supporting member 2401, the plate 2104 can arbitrarily be tilted in directions with one deflection-axis. The shape of the supporting member 2401 is not limited to that shown in FIG. 95A. For example, a supporting member 2401a having a rounded top, as shown in FIG. 95B, may be used as an alternative to the supporting member 2401. For another example, a supporting member 2401b having pentagonal rectangular solid shape, as shown in FIG. 95C, may also be used as an alternative to the supporting member 2401.

Figure 96A:
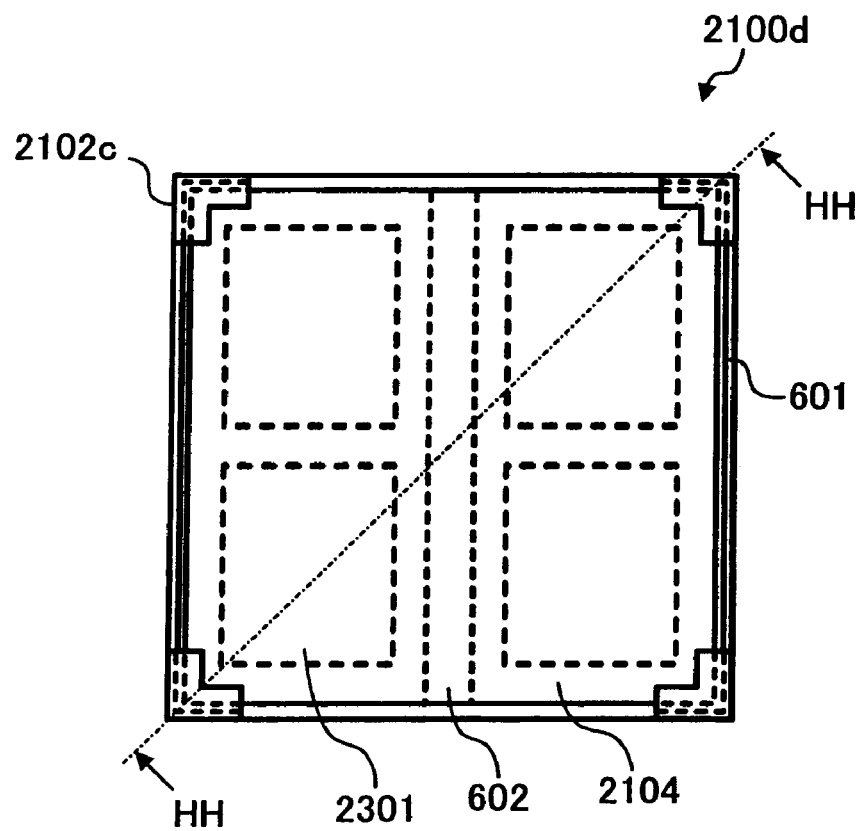
FIGS. 96A and 96B are schematic diagrams of a light deflecting apparatus according to another embodiment of the present invention.
Figure 96B:
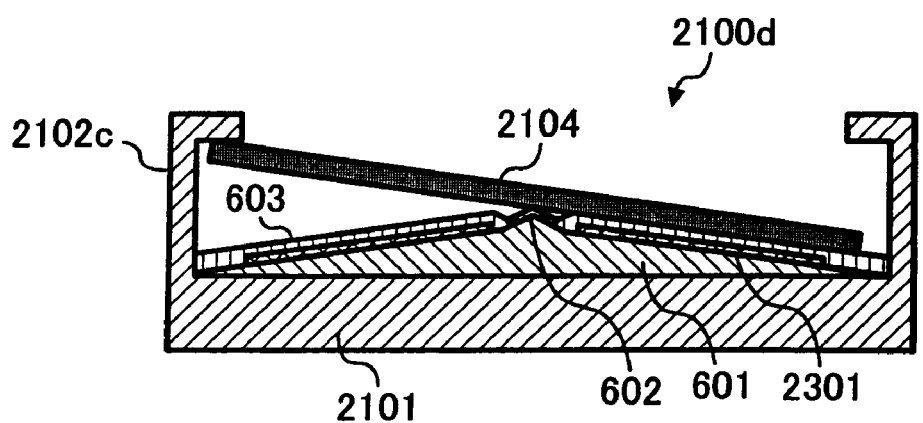

Referring to FIGS. 96A and 96B, a light deflecting apparatus 2100d according to another preferred embodiment of the present invention is explained. FIG. 96A is a plane view of the light deflecting apparatus 2100d, and FIG. 96B is a cross-section view of the light deflecting apparatus 2100d taken on line HH-HH of FIG. 96A. The light deflecting apparatus 2100d of FIG. 96A is an apparatus modified on the basis of the light deflecting apparatus 2100c of FIG. 94A, that is, the supporting member 2401 is modified to a supporting member 601 having a triangular solid shape. As shown in FIG. 96A, the supporting member 601 has wide two roof-like-shaped slopes corresponding to nearly an entire area of the plate 2104 and is attached with the four electrodes 2301 thereon. The supporting member 601 are preferably made of an insulating material to electrically separate the electrodes 2301 from each other but includes a top portion 602 made of a conductive material to apply a voltage to the plate 2104. The top portion 602 is preferably formed together with the supporting member 601 at the same time into the same film.

In addition, to prevent an occurrence of a short circuit between the plate 2104 and the electrodes 2301 when the plate 2104 is tilted and contacts the electrodes 2301, the electrodes 2301 are covered with an insulating film 603 which is preferably made of an insulating material such as a silicon oxide film or a silicon nitride film. As an alternative to the insulating film 603, the plate 2104 may include the dielectric layer 2201, as explained with reference to FIG. 92B. The insulating film 603 is needed to have an opening for allowing an connection to the top portion 602 of the supporting member 601.

With this structure, a portion of the electrodes 2301 comes closer to the plate 2104 as it is closer to the ridgeline thereof and accordingly a greater electrostatic attraction force is generated. In other words, the plate 2104 can be driven with a smaller voltage. Also, the contact of the plate 2104 with the slopes of the supporting member 601 is made with their surfaces and accordingly the impact of the contact can be dispersed. Therefore, the movement of the plate 2104 can stably be controlled.

Figure 97A:
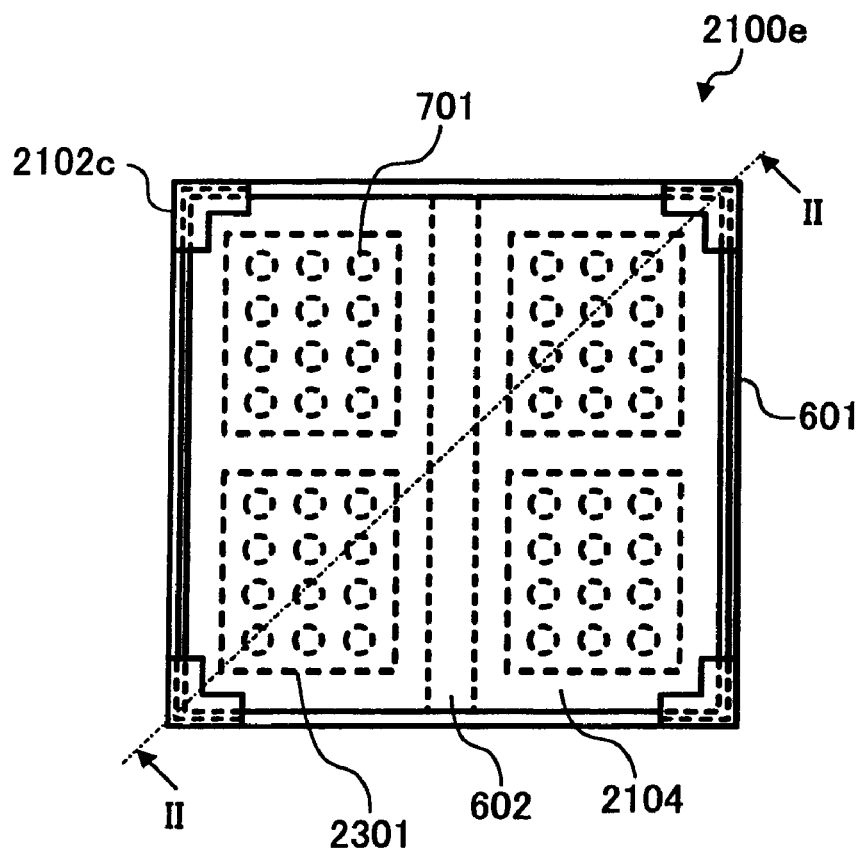
FIGS. 97A and 97B are schematic diagrams of a light deflecting apparatus according to another embodiment of the present invention.
Figure 97B:
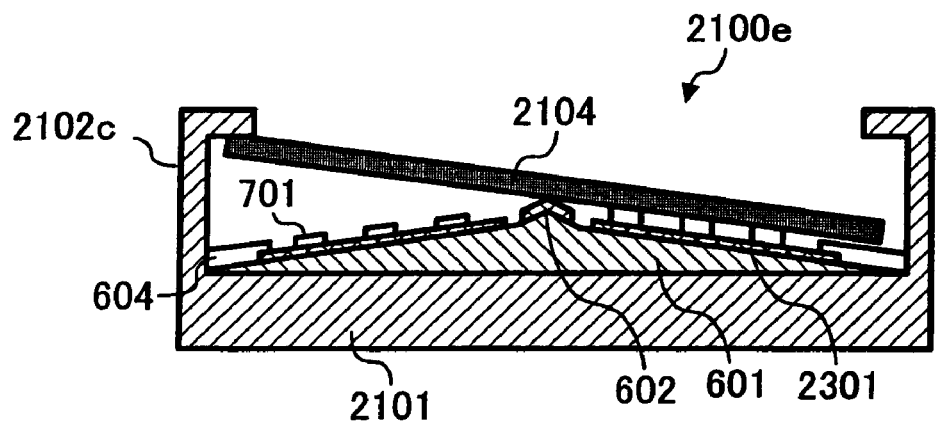

Referring to FIGS. 97A and 97B, a light deflecting apparatus 2100e according to another preferred embodiment of the present invention is explained. FIG. 97A is a plane view of the light deflecting apparatus 2100e, and FIG. 97B is a cross-section view of the light deflecting apparatus 2100e taken on line II-II of FIG. 97A. The light deflecting apparatus 2100e of FIG. 97A is an apparatus modified on the basis of the light deflecting apparatus 2100d of FIG. 96A, that is, the insulating film 603 is modified to an insulating film 604 having a plurality of small circular projections 701 arbitrarily arranged relative to the slope surfaces of the supporting member 601. The direction of the light reflection is determined by the contact of the plate 2104 with these small circular projections 701 of the insulating film 604. The plurality of small circular projections 701 are preferably made by a process of patterning an insulating film (e.g., the insulating film 604), which is later explained.

The size, height, and pitch of the projections 701 can be determined on a basis of a relationship between the electrostatic attraction force and a stiffness of the plate 2104. The shape of the projections 701 may freely be determined within a limit that the plate 2104 does not contact the electrodes 2301 due to its deformation. When the plate 2104 is a thin film having a high stiffness, it resists being deformed. Therefore, in this case, the projections 701 can be formed with a small size, a low height, and small pitch. With such structure, the contact area between the projections 701 and the plate 2104 can be made small and, as a result, an adhesion of the projections 701 and the plate 2104 can be avoided in a usage for an extended period of time.

Figure 98A:
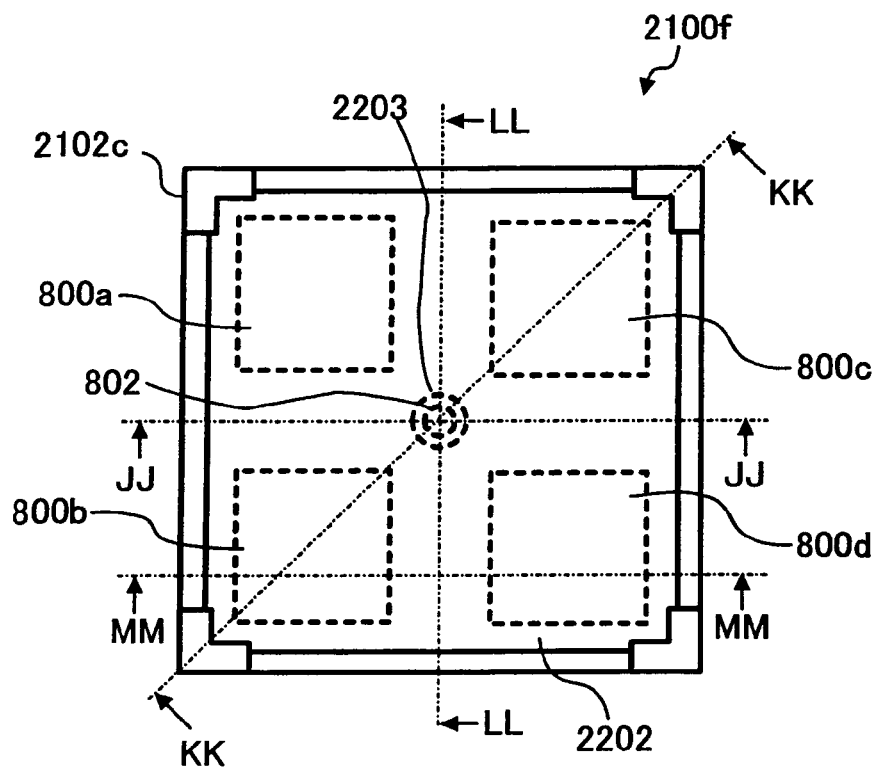
FIGS. 98A-98K are schematic diagrams of a light deflecting apparatus according to another embodiment of the present invention, with an explanation of an operation principle.
Figure 98B:
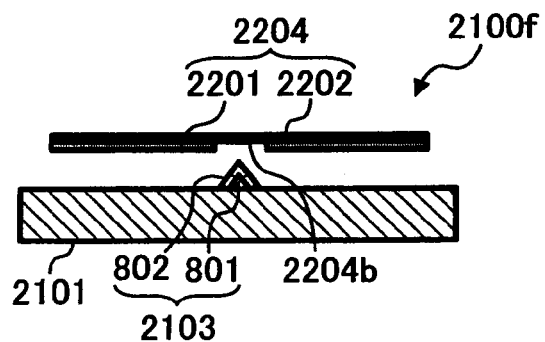
Figure 98C:
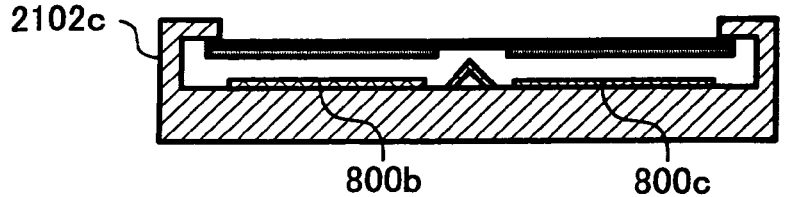

Referring to FIGS. 98A-98K, a light deflecting apparatus 2100f according to another preferred embodiment of the present invention is explained. FIG. 98A is a plane view of the light deflecting apparatus 2100f. FIGS. 98B and 98C are cross-section views of the light deflecting apparatus 2100f taken on line JJ-JJ and line KK-KK, respectively, of FIG. 98A. FIGS. 98D-98K explain operations of the light deflecting apparatus 2100f.

In the light deflecting apparatus 2100f of FIG. 98A, the substrate 2101, the supporting member 2103, the plate 2204 including the dielectric layer 2201, the conductive layer 2202, the contacting portion 2204a, and the opening 2204b are equivalent to those of the light deflecting apparatus 2100a of FIG. 92B. The angle brackets 2101c are equivalent to those of the light deflecting apparatus 2100c of FIG. 94B. Further, reference numerals 800, 800b, 800c, and 800d denote electrodes which are equivalent to the electrodes 2301 of the light deflecting apparatus 2100b of FIG. 93B. Further, reference numerals 801 and 802 denote a dielectric layer and a conductive layer, respectively, of the supporting member 2103. The electrodes 800a-800d are arranged to face the plate 2204 having the dielectric layer 2201 and the conductive layer 2202, and are made of the same material as the electrodes 2301. The top portion 2103a of the supporting member 2103 is formed in a multi-layered form including the dielectric layer 801 made of an insulating silicon film and the conductive layer 802. The conductive layer 802 is made of the same material as the electrodes 800a-800d and is patterned together with the electrodes 800a-800d.

In the following discussion, the views of FIGS. 98D, 98F, 98H, and 98J show the movements of the plate 2204 with a first axis taken on line LL-LL, and the views of FIGS. 98E, 98G, 98I, and 98K show the movements of the plate 2204 with a second axis taken on line JJ-JJ.

Figure 98D:
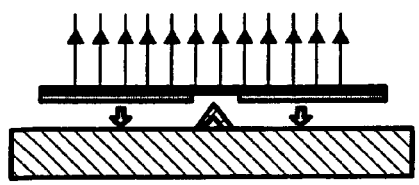
Figure 98E:
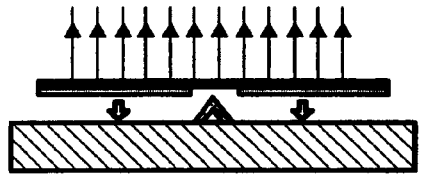

FIGS. 98D and 98E are cross section views of the light deflecting apparatus 2100f taken on line JJ-JJ and line LL-LL, respectively, of FIG. 98A, and are virtually made, for the sake of clarity, to demonstrate a condition when the light deflecting apparatus 2100f is in an initial status, in consideration of the nature that the plate 2204 is freely movable with being held by the supporting member 2103.

Figure 98F:
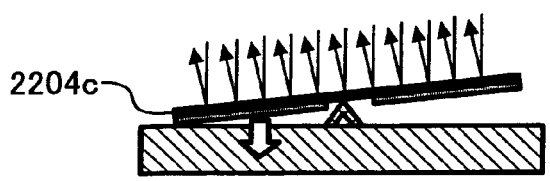
Figure 98G:
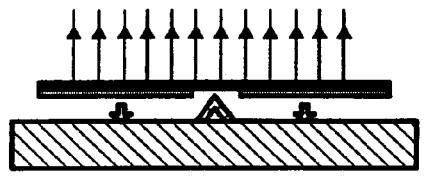

FIGS. 98F and 98G are cross section views of the light deflecting apparatus 2100f taken on line JJ-JJ and line LL-LL, respectively, of FIG. 98A, demonstrating a reset operation of the light deflecting apparatus 2100f. When the light deflecting apparatus 2100f settled in the initial status performs the reset operation, the plate 2204 is moved from the position in the initial status of FIGS. 98D and 98E to a reset position, as shown in FIGS. 98F and 98G, respectively. In the reset position, the plate 2204 has one edge portion (e.g., a portion 2204c) contacting the substrate 2101 with the central portion being supported by the supporting member 2103.

In the reset operation, the electrodes 800a and 800d are applied with a voltage of X volts, for example, and the electrodes 800c and 800d and the conductive layer 802 are applied with a voltage of 0 volts, for example. With the application of these voltages, an electrostatic attraction force is generated between the plate 2204 and the electrodes 800a-800d and the conductive layer 802 in a direction indicated by white arrows indicated underneath the plate 2204, as shown in FIGS. 98D and 98E. The white arrows of FIGS. 98D and 98E and those of FIGS. 98F-98K and FIG. 99 schematically indicate, by size, directions and magnitudes of the electrostatic attraction force acting between the plate 2204 and the electrodes 800a-800d, as the electrostatic attraction force varies depending upon a portion of the plate 2204.

Accordingly, the white arrows in FIG. 98F schematically indicate that magnitudes of the electrostatic attraction force acting between the plate 2204 and the electrodes 800a-800d are uneven, and therefore the plate 2204 is tilted to the reset position by the electrostatic attraction force. FIG. 98G shows this tilting movement from a 90-degree different angle which is the view taken on line LL-LL. In FIG. 98G, as the white arrows indicate, the electrostatic attraction force evenly acts between the plate 2204 and the electrodes 800a-800d, and therefore the movement of the plate 2204 is not seen in the view of FIG. 98G. That is, the view of FIG. 98F shows the tilt movement of the plate 2204 in the first axis direction and the view of FIG. 98G shows the tilt movement of the plate 2204 in the second axis direction. Thus, the angle of the plate 2204 is changed and the light reflecting angle is directed in a desired direction which is referred to as a reset direction. As the plate 2204 is moved in the reset direction, its edge portion (e.g., a portion 2204d) contacts the substrate 2101. In this situation, the light deflecting apparatus 2100f is said to be in a reset status.

The above-mentioned voltage of X volts is determined according to various factors including distances between the plate 2204 and each of the electrodes 800a-800d and capacitances of the plate 2204 and the electrodes 800a-800d, for example. This voltage of X volts required in the reset operation is slightly greater than a voltage Z required in a regular tilting operation for moving the plate 2204 held on the supporting member 2103.

Figure 98H:
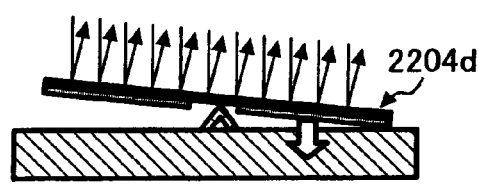
Figure 98I:
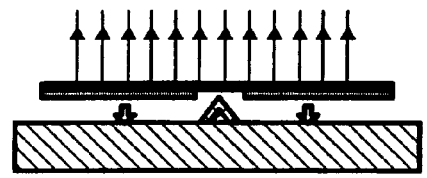

FIGS. 98H and 98I are cross section views of the light deflecting apparatus 2100f taken on line JJ-JJ and LL-LL, respectively, of FIG. 98A, demonstrating a first operation of the light deflecting apparatus 2100f. When the light deflecting apparatus 2100f staying in the reset position, as shown in FIGS. 98F and 98G, performs the first operation, the plate 2204 is tilted in an opposite direction and changes its position from the reset position of FIGS. 98F and 98G to a first position shown in FIGS. 98H and 98I. In the first position, the plate 2204 has an edge portion (e.g., a portion 2204d) contacts the substrate 2101 with being held by the supporting member 2204. Thus, the light deflecting apparatus 2100f can quickly change the direction of the light deflection with the first axis. In the first operation, the electrodes 800a and 800b are applied with a voltage of 0 volts, for example, and the electrodes 800c and 800d are applied with a voltage of X volts.

When the same bias voltages of either positive or negative are added to the voltages of the electrodes and the conductive layer (i.e., the plate 2204), it causes no voltage difference at any portion between the electrodes and the conductive layer. In this case, the plate 2204 does not change its position. That is, the electrostatic attraction force is generated not by the voltage itself but by the voltage difference existing between the electrodes and the conductive layer.

In this example, the voltages applied to the electrodes 800a-800d are changed, while maintaining the application of the voltage of 0 volts to the conductive layer 802. However, to merely switch the position of the plate 2204 from the reset position to the first position, it can simply be achieved by changing the application of the voltage to the conductive layer 802. That is, the application of the voltage to the conductive layer 802 is changed from 0 volts to X volts while maintaining the applications of the voltage of X volts to the electrodes 800a and 800b and of 0 volts to the electrodes 800c and 800d. In this way, the plate 2204 can be settled in the reset position by the application of a voltage of 0 volts and in the first position by the application of a voltage of X volts.

Thus, the plate 2204 receives a greater electrostatic attraction force in its one-half side when there is a voltage difference between the one-half side of the plate 2204 and the electrode or when a voltage difference between the one-half side of the plate 2204 and the electrode is greater than that between the other one-half of the plate 2204 and the electrode. As a consequence, the plate is moved in the direction attracted. That is, the tilt directions of the plate 2204 can be switched at a high speed by applying arbitrary voltages to the electrodes 800a-800d opposing to each other relative to the supporting member 2103 to equalize the voltage of the conductive layer 802 to the voltage of one of the electrodes 800a-800d.

Figure 98J:
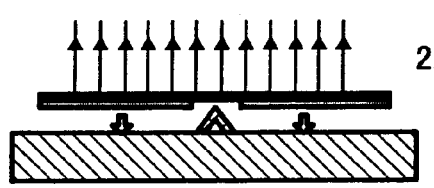
Figure 98K:
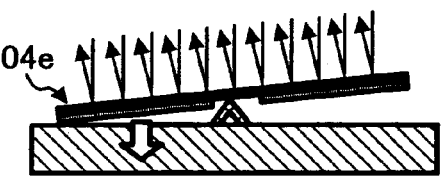

FIGS. 98J and 98K are cross section views of the light deflecting apparatus 2100f taken on line JJ-JJ and LL-LL, respectively, of FIG. 98A, demonstrating a second operation of the light deflecting apparatus 2100f. When the light deflecting apparatus 2100f settled in the reset status shown in FIGS. 98F and 98G performs the second operation, the plate 2204 is tilted, as shown in FIG. 98K, and changes its position from the reset position of FIGS. 98F and 98G to a second position shown in FIGS. 98J and 98K. In this case, the tilting movement of the plate 2204 shown in FIGS. 98J and 98K is made about the second axis taken on line JJ-JJ. In the second position, the plate 2204 has an edge portion (e.g., a portion 2204e) contacts the substrate 2101. Thus, the light deflecting apparatus 2100f changes the direction of the light deflection with the second axis. In the second operation, the electrodes 800a, 800c, and the conductive layer 802 are applied with a voltages of 0 volts, and the electrodes 800b and 800d are applied with a voltage of X volts.

In this way, the light deflecting apparatus 2100f changes the direction of the light deflection with the first and second axes by the first and second operations applying the above-described voltages to the electrodes 800a-800d and the conductive layer 802. Therefore, the light deflecting apparatus 2100f has four different light reflection directions.

Figure 99:
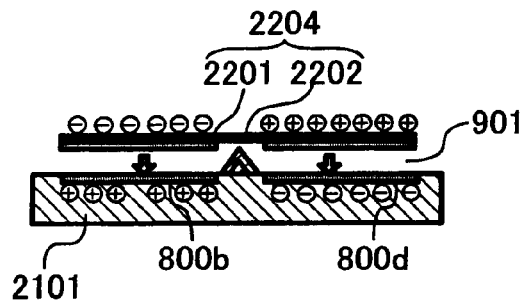
FIG. 99 is a schematic diagram for explaining a principle of an electrostatic attraction force.

With reference to FIG. 99, the principle of the electrostatic attraction is explained. FIG. 99 is a cross section view of the light deflecting apparatus 2100f, for example, taken on line MM-MM of FIG. 98A. In FIG. 99, the light deflecting apparatus 2100f is in the reset operation, with the applications of a positive voltage of X volts to the electrode 800b and a voltage of 0 volts to 800d. Initially, the plate 2204 is in an electrically floating status. When the electrode 800b is applied with the positive voltage of X volts, it will have positive charges. Subsequently, negative charges appear in the dielectric layer 2201 of the plate 2204 facing the electrode 800b in a dielectric manner via a space 901. At the same time, the negative charges in the dielectric layer 2201 are quickly dispersed in a conductive manner in the conductive layer 2202 of the plate 2. This can be expressed in such a way that the negative charges are efficiently generated in the dielectric layer 2201 by the conductive layer 2202. Thereby, an electrostatic attraction force is generated between the electrode 800b and the corresponding portion of the plate 2204 and the plate 2204 is attracted to the electrode 800b.

On the other hand, the generation of the negative charges in the plate 2204 subsequently cause a generation of positive charges in a dielectric manner in the dielectric layer 2201 of the plate 2204 facing the electrode 800d via the space 901. The positive charges generated will schematically spread in the conductive layer 2202 of the plate 2204 in a conductive manner. Then, in response to the positive charges, negative charges schematically appear on the electrode 800d. Therefore, an electrostatic attraction force is also generated between the electrode 800d and the corresponding portion of the plate 2204.

In this way, the electrostatic attraction is generated between the plate 2204 and the electrodes 800b and 800d, for example.

The above-described steps in the generation of the electrostatic attraction actually proceed substantially in a simultaneous fashion in response to the voltage difference between the electrodes 800b and 800d.

In addition, the dielectric layer 2201 and the conductive layer 2202 of the plate 2204, which are electrically floating, have a certain voltage determined between the voltages of the electrodes 800b and 800d. Accordingly, the voltage difference between this certain voltage and the voltage of the electrode 800b generates the electrostatic attraction and also the voltage difference between the certain voltage and the voltage of the electrode 800d generates the electrostatic attraction. This certain voltage may vary mainly according to structural factors including areas of the space 901 and the electrodes 800b and 800d, for example. The thus-generated electrostatic attraction forces cause the plate 2204 to tilt towards the electrodes.

Figure 100A:
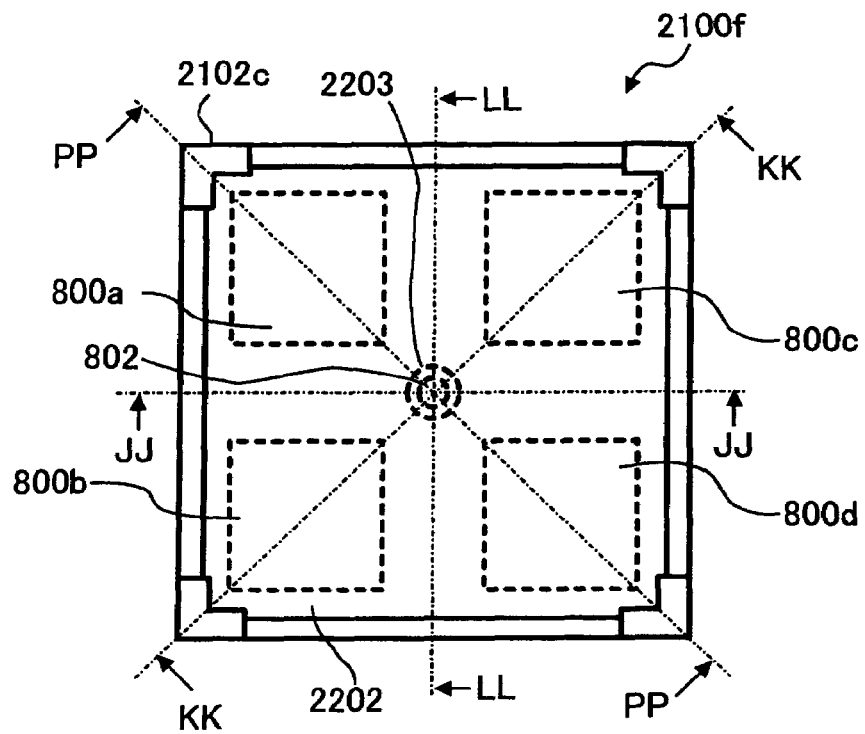
FIGS. 100A-100M are schematic diagrams of a light deflecting apparatus according to another embodiment of the present invention, with an explanation of an operation principle.
Figure 100B:
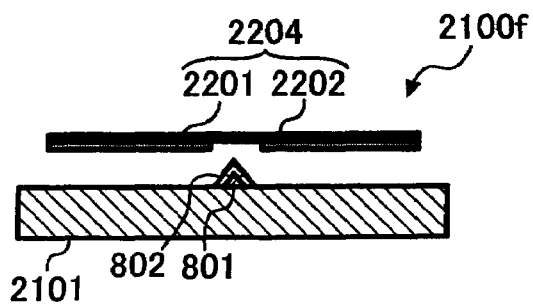
Figure 100C:
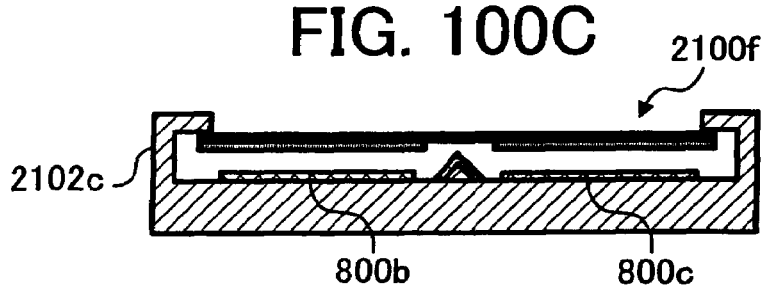

Referring to FIGS. 100A-100M, another light deflecting operation by the light deflecting apparatus 2100f is explained. FIG. 100A is a plane view of the light deflecting apparatus 2100f with indications of cross section lines. FIGS. 100B and 100C are cross-section views of the light deflecting apparatus 2100*f* taken on line JJ-JJ and line KK-KK, respectively, of FIG. 100A. FIGS. 100D-100M explain operations of the light deflecting apparatus 2100*f*.

In the following discussion, the views of FIGS. 100D, 100F, 100H, and 100J show the movements of the plate 2204 with a first axis taken on line LL-LL, and the views of FIGS. 100E, 100G, 100I, and 100K show the movements of the plate 2204 with a second axis taken on line JJ-JJ. In addition, the view of FIG. 100L shows the movement of the plate 2204 with a third axis taken on line PP-PP and the view of FIG. 100M shows the movement of the plate 2204 with a fourth axis taken on line KK-KK.

Figure 100D:
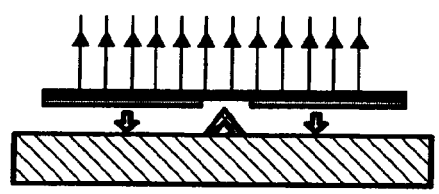
Figure 100E:
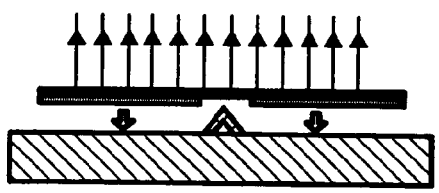
Figure 100F:
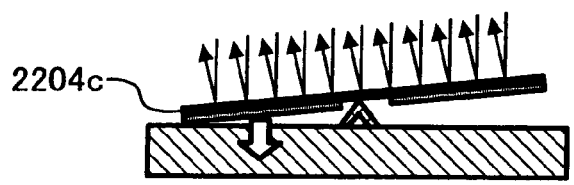
Figure 100G:
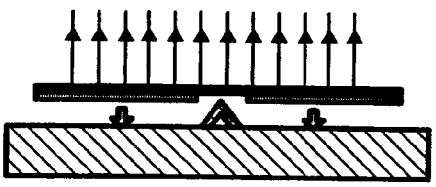

FIGS. 100D and 101E show the initial status of the light deflecting apparatus 2100*f* in a manner similar to FIGS. 98D and 98E. FIGS. 100F and 100G show the reset operation which is similar to that shown in FIGS. 98F and 98G, except for the voltages applied to the electrodes 800a-800d. The electrodes 800a is applied with a voltage of Y volts. The electrodes 800c and 800d and the conductive layer 802 are applied with a voltage of Y/2 volts. The electrode 800b is applied with a voltage of 0 volts. BY the reset operation, the plate 2204 contacts the supporting member 2103 and is applied with a voltage of Y/2 volts from the conductive layer 802 of the supporting member 2103.

The electrodes 800c and 800d are applied with the same voltage as the plate 2204, and there is no electrostatic attraction force generated between the plate 2204 and the electrodes 800c and 800d. The voltage differences between the electrode 800b and the plate 2204 and between the plate 2204 and the electrode 800a are both Y/2 volts, and relatively strong electrostatic attraction forces are generated therebetween. Accordingly, the plate 2204 is tilted in the direction of the electrodes 800a and 800b. This status is referred to as the reset status.

Figure 100H:
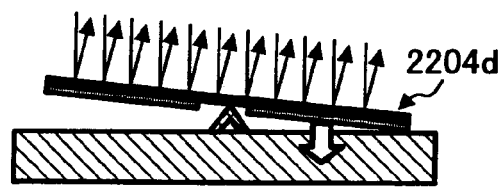
Figure 100I:
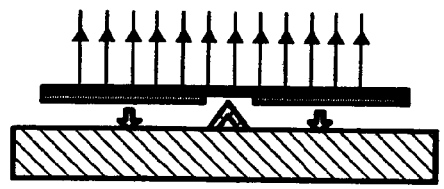

The first operation for moving the plate 2204 with the first axis is shown in FIGS. 100H and 100I. In this operation, the electrode 800c is applied with a voltage of Y/2 volts, the electrodes 800a and 800b and the conductive layer 802 are applied with a voltage of approximately Y/2 volts, and the electrode 800d is applied with a voltage of 0 volts. Under such conditions, the plate 2204 is quickly tilted in the opposite direction relative to the reset direction and stops its movement when the portion 2204d of the plate 2204 contacts the substrate 2101.

When the same bias voltages of either positive or negative are added to the voltages of the electrodes and the conductive layer, no change is caused in the movement of the plate. That is, the tilt direction of the plate 2204 can quickly be changed by applications of different voltages to adjacent two electrodes and intermediate voltages to the remaining two electrodes and the conductive layer 802. The voltage of Y volts is a predetermined voltage and is determined such that a voltage of Y/2 volts applied to the conductive layer 802 is slightly greater than a voltage of Z volts which is a lowest value to cause the plate 2204 to tilt to a different position.

Figure 100J:
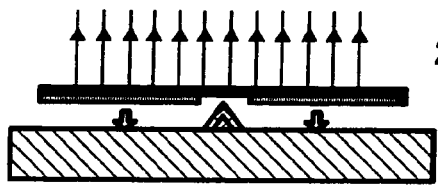
Figure 100K:
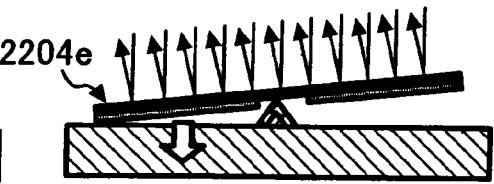
Figure 100L:
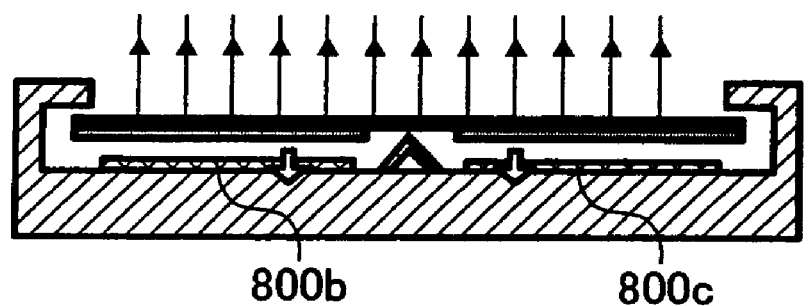
Figure 100M:
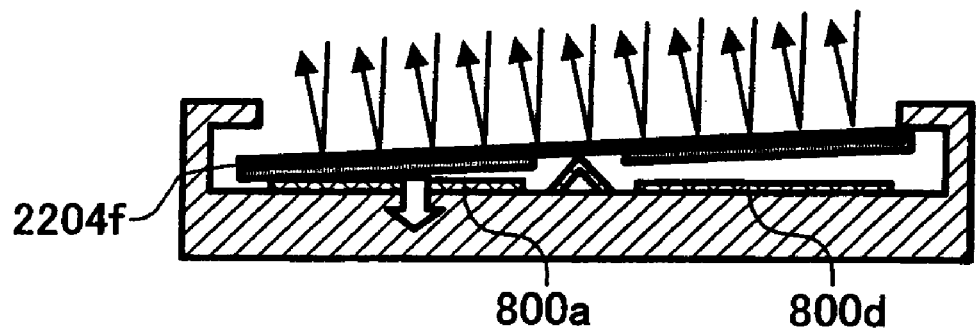

The second operation for moving the plate 2204 with the second axis is shown in FIGS. 100J and 100K. In this operation, the electrode 800b is applied with a voltage of Y volts, the electrodes 800a and 800c and the conductive layer 802 are applied with a voltage of approximately Y/2 volts, and the electrode 800d is applied with a voltage of 0 volts. Under such conditions, the plate 2204 is quickly tilted with a different axis and stops its movement when the portion 2204e of the plate 2204 contacts the substrate 2101. Therefore, the plate 2204 can be tilted with different two axes by the first and second operations.

As for the action of the electrostatic attraction force, the case of the above-described first operation, shown in FIGS. 100H and 100I, is explained. When the conductive layer 802 is applied with a voltage of approximately Y/2 volts, the plate 2204 will have a voltage of approximately Y/2 volts. Accordingly, the portions of the plate 2204 facing the electrodes 800a and 800b have substantially the same voltages as the electrodes 800a and 800b and therefore no electrostatic attraction force is generated. However, the portions of the plate 2204 facing the electrodes 800c and 800d have a voltage difference of approximately Y/2 volts and therefore electrostatic attraction forces are caused in response to the voltage difference of approximately Y/2 volts. With such forces, the plate 2204 is moved to the other position with the first axis.

In the second operation, shown in FIGS. 100J and 100K, the electrostatic attraction forces are generated in a manner similar to the above-described first operation and, as a result, the plate 2204 is moved to the other position with the second axis. In this example, the electrodes applied with the largest voltage and the smallest voltage are needed to be in the same side relative to the line of the movement axis for the plate 2204 passing through the top portion of the plate 2204. In the case of four electrodes, adjacent two electrodes are needed to have the largest and smallest voltages.

One of remarkable advantages of the light deflecting apparatus according to the present invention is explained below with reference to FIG. 100H. In FIG. 100H, the electrodes 800c and 800d are applied with voltages of Y volts and 0 volts, respectively. Therefore, even if the plate 2204 is disengaged from the supporting member 2103 and becomes in an electrically-floating status during the tilting movement, the electrostatic attraction force is generated to act on the plate 2204 facing the electrodes 800c and 800d, as described in the explanation made with reference to FIG. 99. Accordingly, the plate 2204 is changed to a desired position to perform the light reflection in a desired direction. That is, one of the advantages of the light deflecting apparatus according to the present invention is that the light deflecting apparatus can stably perform the light deflection. This advantage will be effective particularly when the light deflecting apparatus is used in an upside down orientation, in which the plate 2204 is usually disengaged from the supporting member 2103 when no voltage is applied to the light deflecting apparatus.

The light deflecting apparatus 2100*f* performs a third operation to change the axis of light deflection. The third operation is explained with reference to FIGS. 100L and 100M. In the third operation, the electrode 800a is applied with a voltage of X volts. The electrodes 800b and 800c are applied with a voltage of X/2 volts. The electrode 800d and the conductive layer 802 are applied with a voltage of 0 volts. The value X is the one used in the description made with reference to FIGS. 98A-98K.

A strong electrostatic attraction force is generated between a portion of the plate 2204 and the electrode 800a, and acts on such portion of the plate 2204. A weak electrostatic attraction force is generated between another portion of the plate 2204 and the electrodes 800b and 800c, and acts on such another portion of the plate 2204. No electrostatic attraction force is generated between further another portion of the plate 2204 and the electrode 800d, and therefore acts on such further another portion of the plate 2204. As a consequence, the plate 2204 is tilted in a direction towards the electrode 800a, as shown in FIG. 100M. The plate 2204 ultimately contacts the substrate 2101 by an edge portion 2204*f* of the plate 2204 which is on an edge of a diagonal line of the plate 2204. Thus, the light deflecting apparatus 2100*f* performs the light deflection with the third axis taken on line KK-KK. Likewise, the light deflecting apparatus 2100f can perform the light deflection with the forth axis taken on line PP-PP by arbitrarily changing the applications of voltages to the electrodes 800a-800d and the conductive layer 802. With the third and fourth axes, it is possible for the light deflecting apparatus 2100f to use four different tilt positions.

Thus, the light deflecting apparatus 2100f can perform the light deflection with eight different tilt positions with arbitrarily applications of voltages to the electrodes 800a-800d and the conductive layer 802. As described above, the voltage of X/2 volts applied to the electrodes 800b and 800c generates a weak electrostatic attraction force with the voltage of 0 volts applied to the plate 2204. Therefore, the plate 2204 may bend when it has a relatively small stiffness. To avoid this problem, it is preferable to apply a smaller voltage or a voltage of 0 volts, the same voltage as applied to the conductive layer 802, to the electrodes 800b and 800c, or to apply no voltage to the electrodes 800b and 800c to make them in an electrically floating status. When the electrodes 800b and 800c are applied with the voltage of X/2 volts or are made in an electrically floating status, the tilt position of the plate 2204 can easily be changed in an opposite direction towards the electrode 800d simply by changing the voltage applied to the conductive layer 802 from 0 volts to X volts.

It should be understood from the above-described various examples that the basic principle to tilt the normal to the light reflecting surface of the plate 2204 to a specific side is to apply a voltage to an electrode in the specific side such that a difference in voltage between the electrode in the specific side and the plate 2204 becomes maximum. The plate 2204 can be tilted towards a side by an application of a voltage between the plate 2204 and adjacent two electrodes and towards an edge on a diagonal line by an application of a voltage between the plate 2204 and one electrode.

Figure 101:
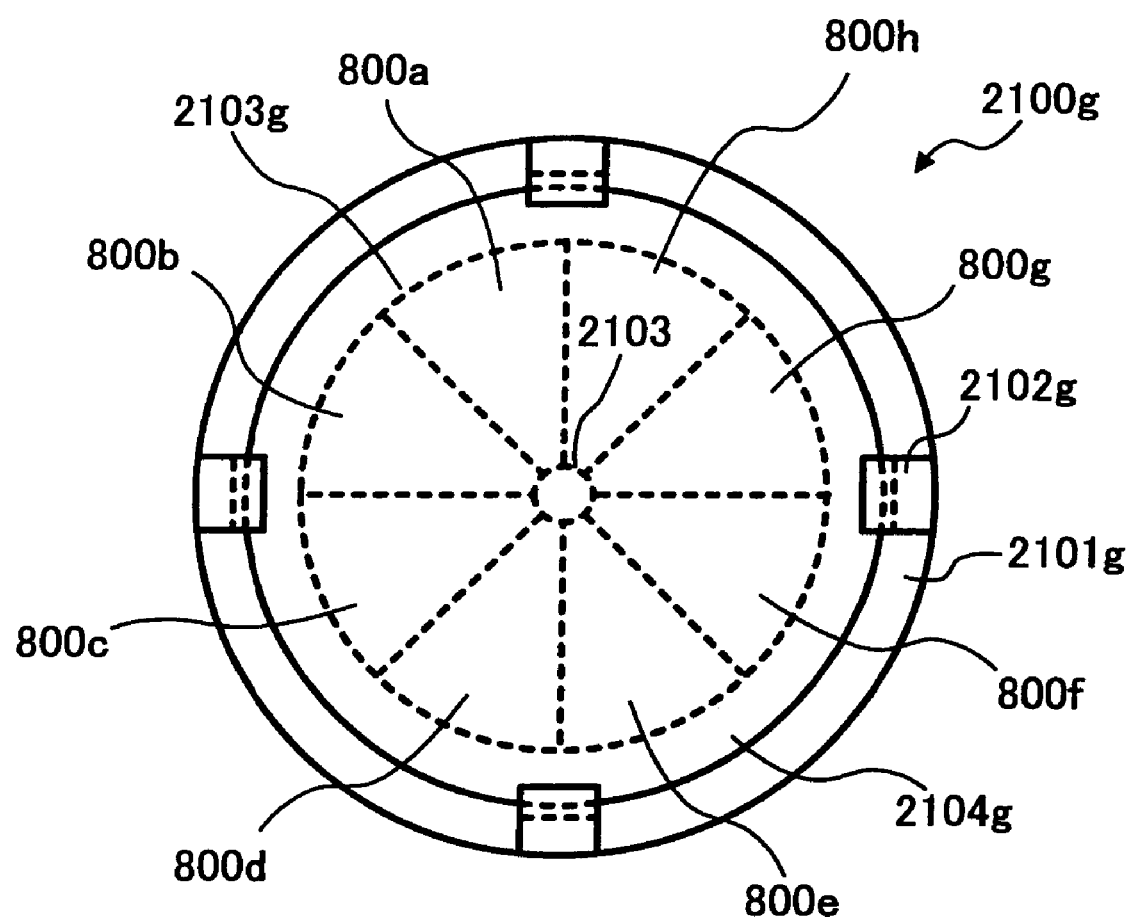
FIG. 101 is a schematic diagram of a light deflecting apparatus according to another embodiment of the present invention.

Referring to FIG. 101, a light deflecting apparatus 2100g according to another preferred embodiment of the present invention is explained. FIG. 101 shows the light deflecting apparatus 2100g modified on a basis of the light deflecting apparatus 2100b of FIG. 93A. The substrate 2101, the supporting member 2103, and the plate 2104 are modified to a substrate 2101g, a supporting member 2103g, and a plate 2104g, which are in a circular form. Accordingly, the angle brackets 2102 are modified to angle brackets 2102g and the electrodes 2301 are modified to eight electrodes 800a-800h, for example.

In the light deflecting apparatus 2100g, the electrode 800a is applied with a voltage of X volts, the electrode 800e is applied with a voltage of 0 volts, and other electrodes are remained in an electrically floating status, for example. Then, the conductive layer 802 of the supporting member 2103g is applied with a voltage of 0 volts. Consequently, the plate 2104g is tilted to the electrode 800a due to a large voltage difference between the plate 2104g and the electrode 800a. If the conductive layer 802 is alternatively applied with a voltage of X volts, the plate 2104g is tilted in an opposite direction towards the electrode 800e. In this way, the plate 2104g can be tilted in every direction where an electrode presents by applications of voltage combinations relative to the electrodes and the conductive layer of the supporting member. Accordingly, the direction of the light reflection can selectively be determined among from eight directions.

In this embodiment, the supporting member 2103g having a conical shape may have another shape such as an octagonal pyramid, for example, so that the octagonal shape of the supporting member corresponds to the shapes of the electrodes 800a-800h. With this structure, the plate 2104g can stay in each of the eight tilt positions in a more stable manner.

When the number of the electrodes is six or more, the electrodes applied with the largest and smallest voltages are unnecessarily adjacent and allow a presence of one or more other electrodes therebetween. An electrode can be inserted between the electrodes with the largest and smallest voltages in a case of six electrodes. However, in a case of eight electrodes, up to two electrodes can be inserted between the electrodes with the largest and smallest voltages. When one or more different electrodes are inserted between the electrodes with the largest and smallest voltages, the plate is tilted in a direction towards a region between the two electrodes with the largest and smallest voltages due to the relationship of the electrostatic attraction forces. When the number of the electrodes inserted between the electrodes with the largest and smallest voltages is odd, such as one or three, the plate stably stays on the electrode inserted between the electrodes with the largest and smallest voltages. It is therefore preferable to apply no voltage to the inserted electrode and to make it in an electrically floating status so as to prevent a short circuit or a discharge between the largest and smallest voltages.

Figure 102A:
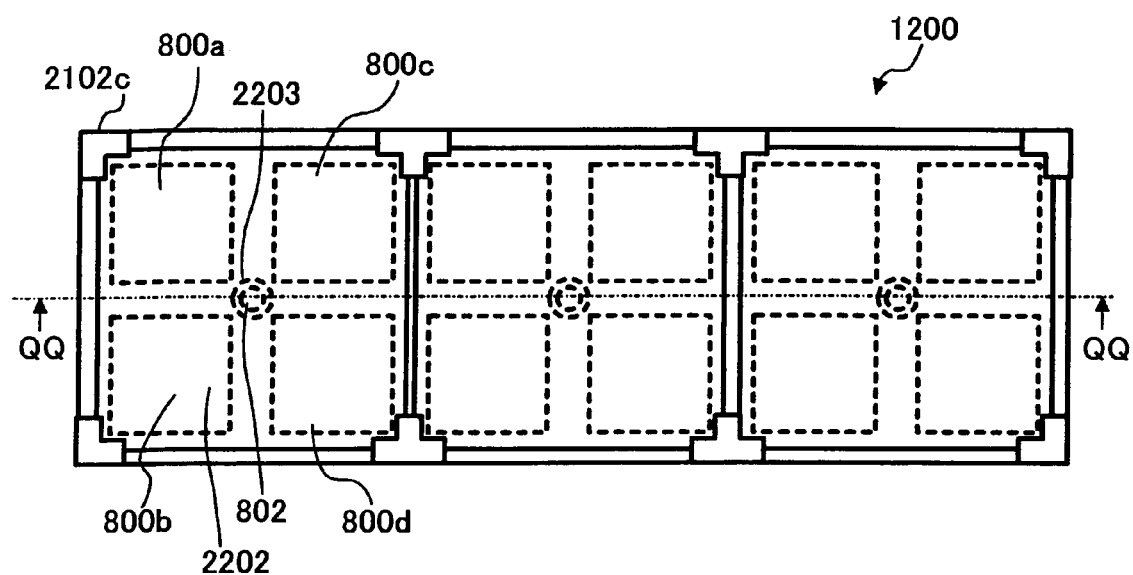
FIGS. 102A and 102B are schematic diagrams of a light deflecting array apparatus according to an embodiment of the present invention.
Figure 102B:
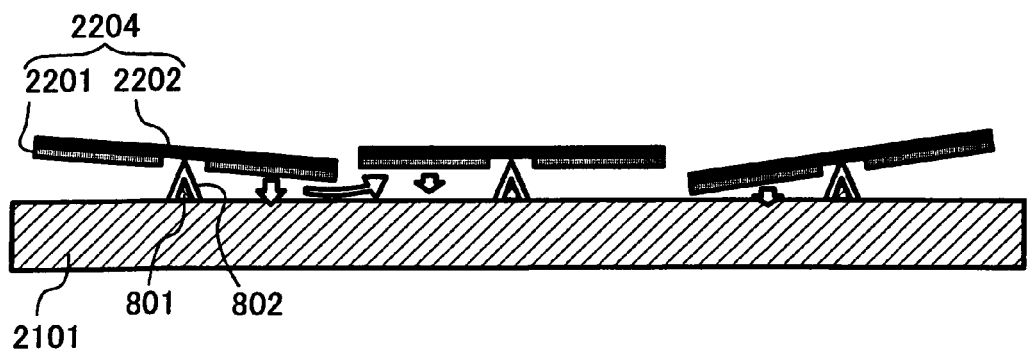

Next, a light deflecting array apparatus 1200 is explained with reference to FIGS. 102A and 102B. FIG. 102A is a plane view of the light deflecting array apparatus 1200, and FIG. 102B is a cross-section view of the light deflecting array apparatus 1200 taken on line QQ-QQ of FIG. 102A. The light deflecting array apparatus 1200 includes three pieces of the light deflecting apparatuses 2100f of FIG. 98A, for example, which are arranged in a one-dimension direction. The light deflecting array apparatus 1200 may include a number of the light deflecting apparatuses 2100f larger than three, and the light deflecting apparatuses 2100f can be arranged in two-dimension directions. With the light deflecting apparatus 1200 having a large number of integrated light deflecting apparatuses 2100f, for example, it becomes possible to control a high precision light deflection by driving them simultaneously and independently. Each of the integrated light deflecting apparatuses 2100f may be referred to as an element.

In the light deflecting array apparatus 1200, a space around the plate 2204 in each of the light deflecting apparatus 2100f is in a near vacuum. Such near vacuum in the light deflecting apparatus 2100f can be produced by conducting a vacuum sealing when the light deflecting apparatus 2100f is packaged.

In FIG. 102B, a manner in that the plates 2204 of the light deflecting array apparatus 1200 are surrounded in the atmosphere is schematically expressed. In a first element arranged in the leftmost position, the plate 2204 is tilted and the air under the plate 2204 is pressed. This pressed air produces a buoyant force which acts on the plate 2204 of a second element arranged in the middle position. The movement of the plate 2204 which is moving in a direction indicated by a white arrow is disturbed by the buoyant force produced by the first element. This problem is avoided by making the space around the plate 2204 in the near vacuum.

When the plate 2204 is tilted at a high speed, the atmospheric air generally becomes a viscous drag which produces a slight delay in response. In a single device of the light deflecting array apparatus 1200, this viscous drag can be reduced by a package for covering the entire apparatus to keep dust out.

In addition, the near vacuum of space around the plate 2204 may be filled with an inert gas such as a nitrogen gas, an argon gas, a helium gas, a neon gas, and so forth. Amongst, the nitrogen gas is relatively inexpensive and safe and is therefore preferable. An inert gas can be enclosed in the space around the plate 2204 by conducting the packaging of the light deflecting array apparatus 1200 in the same inert gas. With the inert gas enclosed in the space around the plate 2204, the moisture content in the space is reduced so that the contacting portion of the plate 2204 is prevented from fixing to the substrate 2101. However, if there is a concern that the enclosed gas produces a viscous drag in response to the movement of the plate 2204, the pressure of the gas is preferably reduced before being enclosed.

Next, an image projection display apparatus 1300 using the light deflecting array apparatus 1200 is explained with reference to FIG. 103. FIG. 103 shows the image projection display apparatus 1300 which projects an image by deflecting light of an image with the light deflecting array apparatus 1200. The image projection display apparatus 1300 includes a light switching mechanism 1301 and a projection screen 1310. The light switching mechanism 1301 includes the light deflecting array apparatus 1200, a light source 1302, a projection lens 1303, an aperture 1304, a rotary color hole 1305, and a micro-lens array 1306.

In the light switching mechanism 1301, the light source 102 emits light W3 which travels, through the rotary color hole 1305 for a color display and the micro-lens array 1306 for a high precision, to the light deflecting array apparatus 1200. The light W3 is reflected by the plates 2204 of the elements of the light deflecting array apparatus 1200. The plates 2204 are independently driven in accordance with input image data. That is, each of the plates 2204 changes its position according to the input image data and, as a result, the reflection angle relative to the input light W3 is changed according to the input image data. Therefore, the reflection of the light W3 is controlled according to the input image data by the light deflecting array apparatus 1200. The light W3 reflected by the light deflecting array apparatus 1200 travels through the projection lens 1303 and the aperture 1304 to the screen 1310 to form an image. Thus, the image projection display apparatus 1300 including the light deflecting array apparatus 1200 effectively projects a desired image on the screen.

In the image projection display apparatus 1300, the light deflecting array apparatus 1200 is arranged at a position such that the normal to each of the light reflecting surfaces of the plates 2204 is in a direction substantially equal to a direction of gravity when the plates 2204 are in their initial status. With this arrangement, the gravity acts on the plate 2204 in contact with the supporting member 2103 and evenly acts on the plate 2204 without deviation even when the plate 2204 is tilted in any direction. Therefore, the plate 2204 can stably be tilted for a usage over an extended period of time. Since the plate 2204 in this embodiment has no edge fixed to the substrate 2101, the above-described effect by gravity is generated to a great extent. FIG. 103 merely indicates a general structure of the image projection display apparatus and, therefore, there is no indication in FIG. 103 for a direction of the plate 2204 in the initial status. When the arrangement of the plate 2204 in the initial status relative to the gravity is applied, mirrors may effectively be used intermediately on an as needed basis.

Next, an image forming apparatus 1400 using the light deflecting array apparatus 1200 is explained with reference to FIG. 104. FIG. 104 shows the image forming apparatus 1400 which forms an image by optically writing image data with an electrophotographic method using the light deflecting array apparatus 1200. The image forming apparatus 1400 includes an image carrying mechanism 1401, a latent image forming mechanism 1402, a development mechanism 1403, a transfer mechanism 1404, a charging mechanism 1405, a fixing mechanism 1406, a sheet ejecting tray 1407, and a cleaning mechanism 1408. The latent image forming mechanism 1402 includes the light deflecting array apparatus 1200, a light source 1402a, a first lens system 1402b, and a second lens system 1402c.

The image carrying mechanism 1401 includes a drum-shaped photosensitive surface and is rotated in a direction C9. The image carrying mechanism 1401 is evenly charged by the charging mechanism 1405. The latent image forming mechanism 1402 forms a latent image on the photosensitive surface of the image carrying mechanism 1401. At this time, the elements of the light deflecting array apparatus 1200 are switched in accordance with the input image data so as to form the latent image. The development mechanism 1403 develops with toner the latent image formed on the photosensitive surface of the image carrying mechanism 1401. The transfer mechanism 1404 transfers the toner image onto a recording sheet V. The fixing mechanism 1406 fixes the toner image to the recording sheet V with heat and pressure. The recording sheet V is ejected to the sheet ejecting tray 1407. The cleaning mechanism 1408 cleans off the photosensitive surface of the image carrying mechanism 1401.

In the latent image forming mechanism 1402, light W4 emitted from the light source 1402a travels through the first lens system 1403 to the light deflecting array apparatus 1200. The elements of the light deflecting array apparatus 12000 are independently and simultaneously driven in accordance with input image data. That is, every reflection angles relative to the input light W4 are changed according to the input image data. Therefore, the reflection of the light W4 towards the photosensitive surface of the image carrying member 1401 is controlled according to the input image data by the light deflecting array apparatus 1200. The light W4 reflected by the light deflecting array apparatus 1200 travels through the second lens system 1404 to the photosensitive surface to form a latent image. Thus, the image forming apparatus 1400 including the light deflecting array apparatus 1200 effectively forms an image according to the input image data.

Figure 105A:
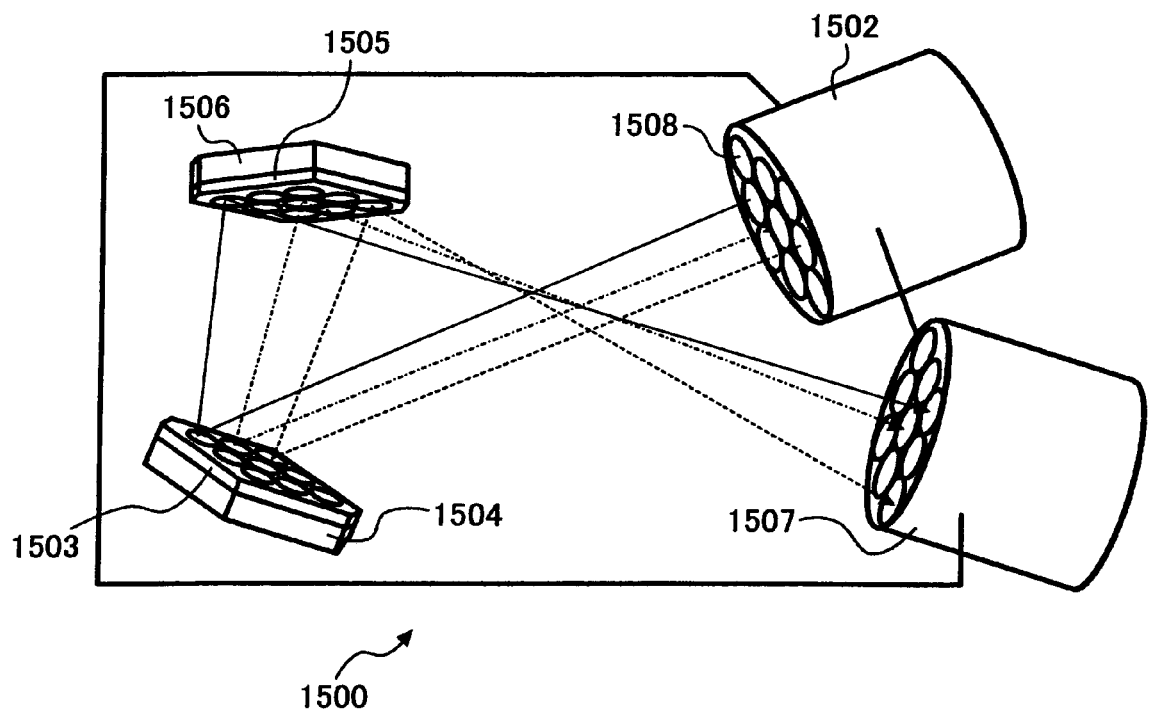
FIGS. 105A and 105B are schematic diagrams of optical data transmission apparatuses according to embodiments of the present invention.

Next, an optical data transmission apparatus 1500 using the light deflecting array apparatus 1200 is explained with reference to FIG. 105A. FIG. 105A shows the optical data transmission apparatus 1500 for transmitting an optical data signal. The optical data transmission apparatus 1500 includes an optical data input mechanism 1502, a first optical deflecting array 1503, a first control mechanism 1504, a second optical deflecting array 1505, a second control mechanism 1506, an optical data output mechanism 1507, and a plurality of signal transmission ports 1508.

An optical data signal is transmitted to the optical data transmission apparatus 1500 from the optical data input mechanism 1502 which includes a plurality of signal transmission ports 1508. In the optical data transmission apparatus 1500, the optical data signal is deflected in two-dimension directions by the first and second optical deflecting arrays 1503 and 1505 and is output from the selected output ports of the optical data output mechanism 1507 which includes a plurality of signal transmission ports 1508. In this embodiment, the two stages of the first and second optical deflecting arrays 1503 and 1505 are preferably provided to achieve a relatively wide deflecting angle. However, a single optical deflecting array may also be suitable depending upon a number of the selected ports. The elements included in the optical deflecting arrays 1503 and 1505 are driven by the control mechanisms 1504 and 1506, respectively, in an independent and simultaneous manner.

Although the optical data input mechanism and the optical data output mechanism are separated in the above discussion for the convenience sake, it should be noted that input and output mechanisms in the optical data transmission are generally in common since optical data is bi-directionally transmittable.

Figure 105B:
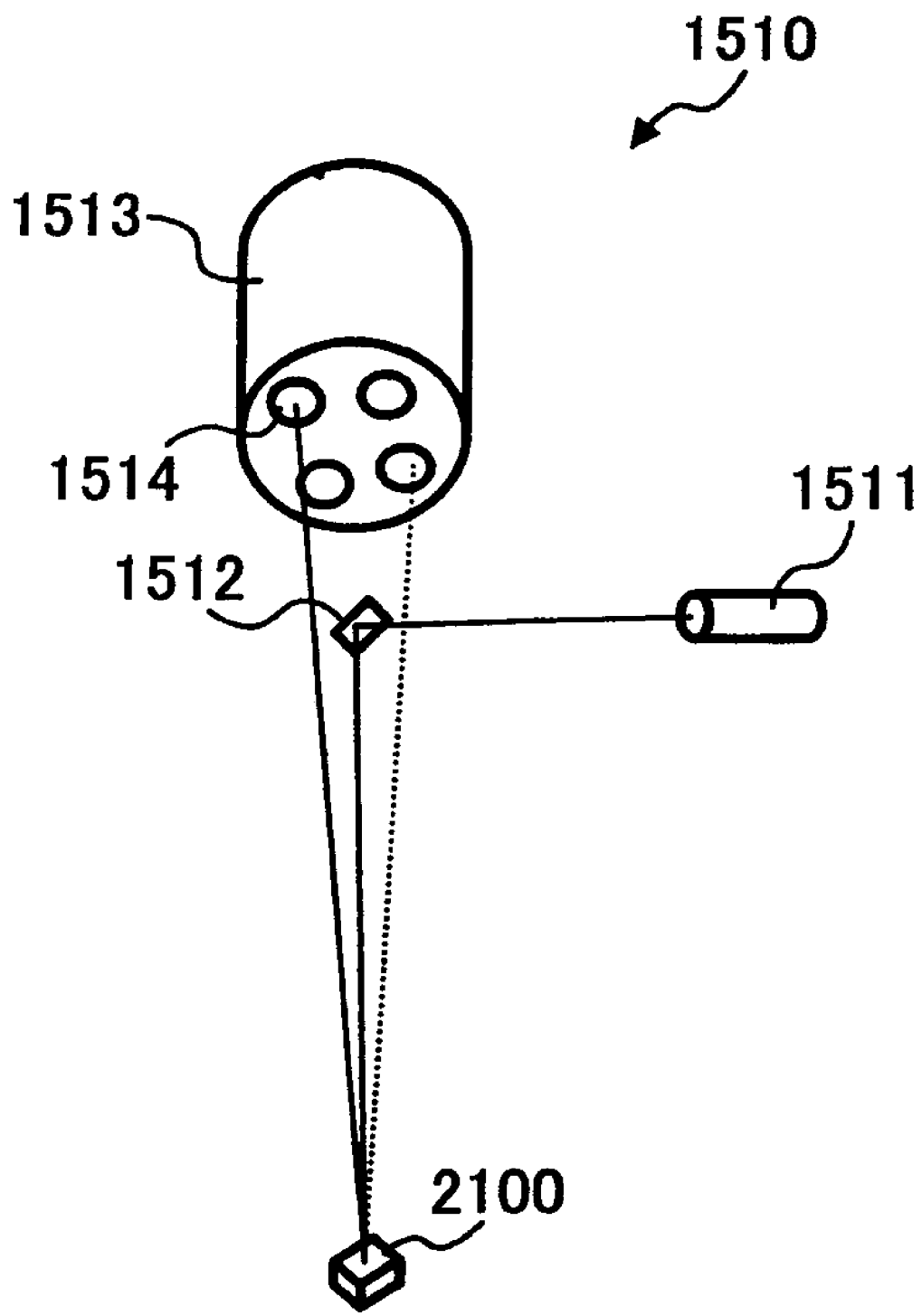

FIG. 105B shows an optical data transmission apparatus 1510 using a single unit of the light deflecting apparatus 2100f, for example. The optical data transmission apparatus 1510 includes an input/output port 1511, the light deflecting apparatus 2100f, and a signal input/output mechanism 1513. The signal input/output mechanism includes four input/output ports 1514, for example. Since the light deflecting apparatus 2100f can select four light deflection directions, as described above, it is possible to provide a single input/output port at one end and four input/output ports at the other end. In FIG. 105B, a light path shown with a solid line indicates a case when the input/output port 1514 is selected by the light deflecting apparatus 2100f, and a light path shown with a dotted-line indicates a case when the light deflecting apparatus 2100f switches to another input/output port.

Reference numeral 1512 denotes a mirror which reflects the light from the input/output port 1511 to the light deflecting apparatus 2100f. As an alternative to this, it is possible to eliminate the mirror 1512 and to arrange the input/output port 1511 at the center of the signal input/output mechanism 1513, by which the manufacturing cost can be reduced. In addition, it is possible to integrate plural sets of the above-described input/output ports into a single unit.

Referring to FIGS. 106A-106H, an exemplary method of making a light deflecting apparatus is explained. In this discussion, a light deflecting apparatus to be made is an apparatus similar to the light deflecting apparatus 2100f of FIG. 98A, as an example. Each of the views shown in FIGS. 106A-106H is a cross section view taken on line KK-KK of FIG. 98A. In this method, a plurality of sections are formed on a silicon substrate. The plurality of sections are arranged in either a one-dimension direction or two-dimension directions. To make a plurality of single units of the light deflecting apparatus 2100f, it is preferable to provide a margin for separation between the sections. However, the sections are needed to be formed as close as possible to make an array of the light deflecting apparatuses 2100f.

A first process (see FIG. 106A) provides a silicon oxide film 1601, which forms the dielectric layer 801 of the supporting member 2103, on the silicon substrate 2101 with the plasma CVD method. Then, a photography using a photomask having a pattern with an area coverage modulation or a photography which thermally deforms a resist pattern is used to form a resist pattern having an approximate shape and a thickness of the supporting member 2103. After that, the formed resist pattern is deformed to an exact shape of the dielectric layer 801 with the dry etching method.

Figure 106A:
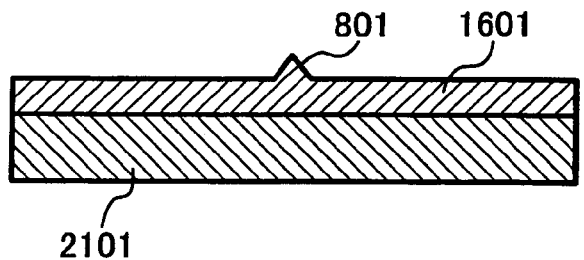
FIGS. 106A-106H are schematic diagrams for explaining a method of making the light deflecting apparatus of FIG. 98A.
Figure 106B:
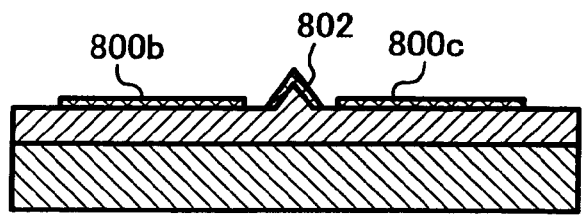
Figure 106C:
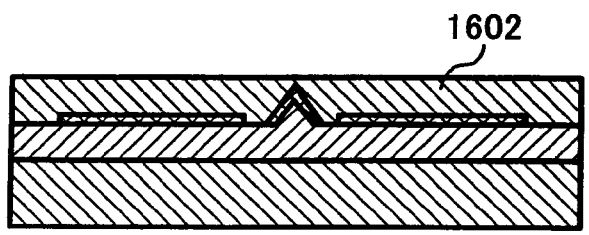
Figure 106D:
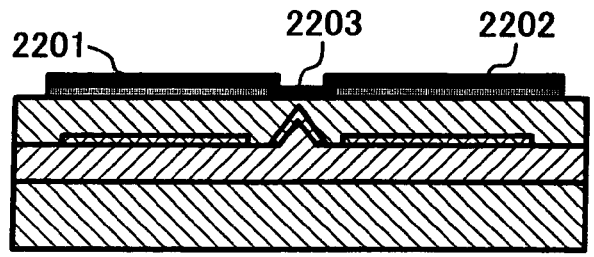
Figure 106E:
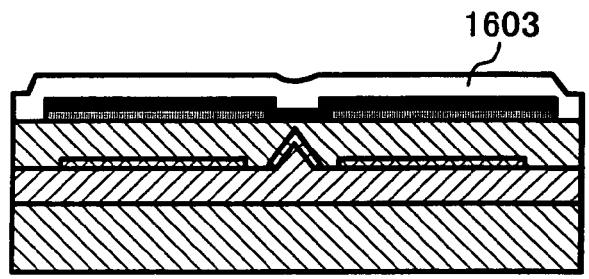
Figure 106F:
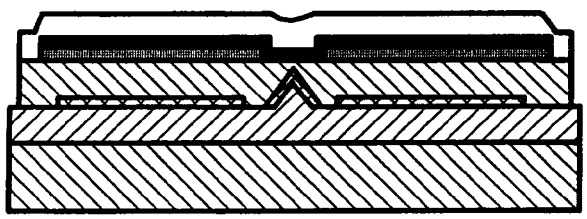
Figure 106G:
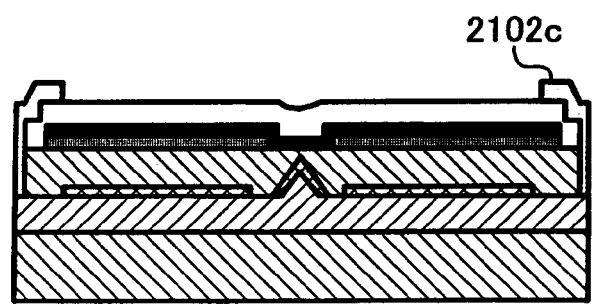
Figure 106H:
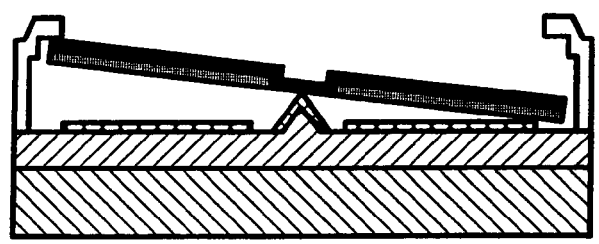
Figure 107A:
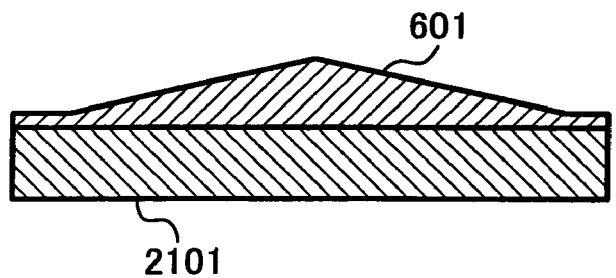
FIGS. 107A-107I are schematic diagrams for explaining a method of making the light deflecting apparatus of FIG. 97A.
Figure 107B:
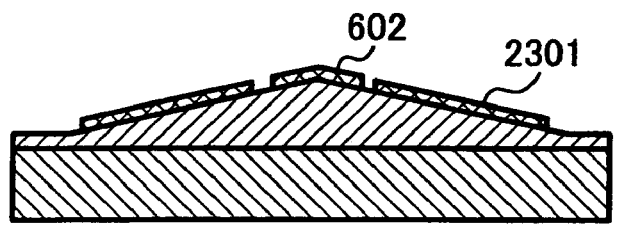
Figure 107C:
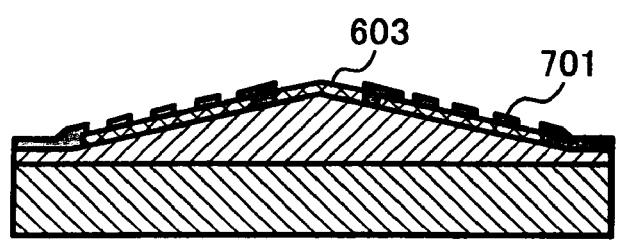
Figure 107D:
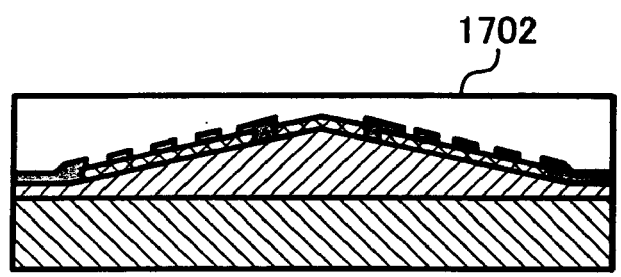
Figure 107E:
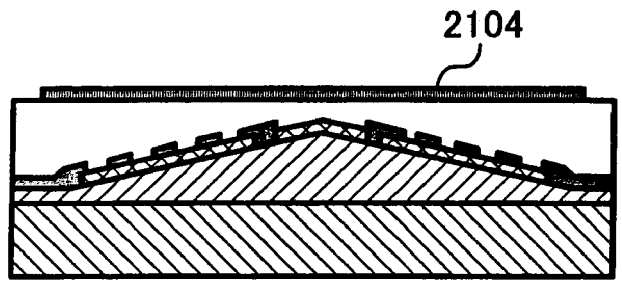
Figure 107F:
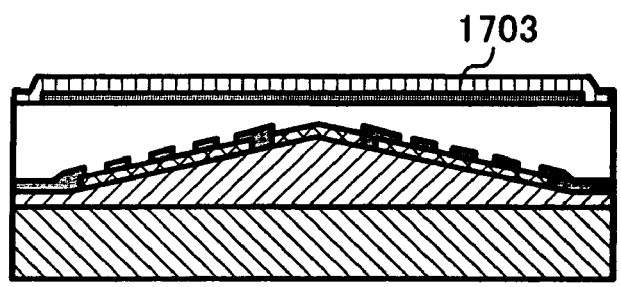
Figure 107G:
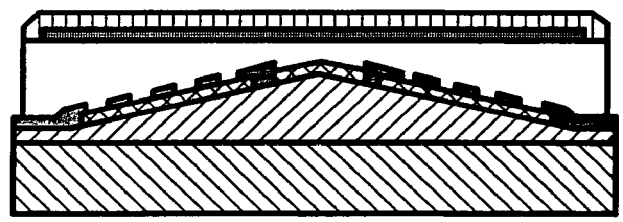
Figure 107H:
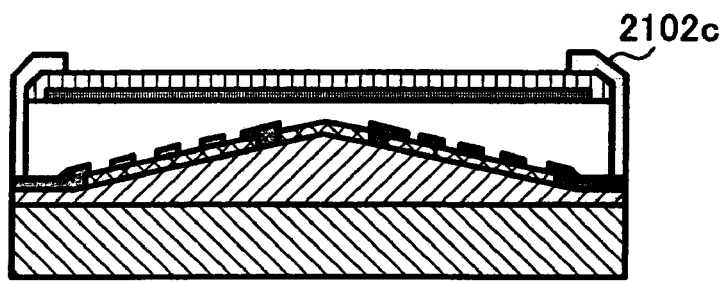
Figure 107I:
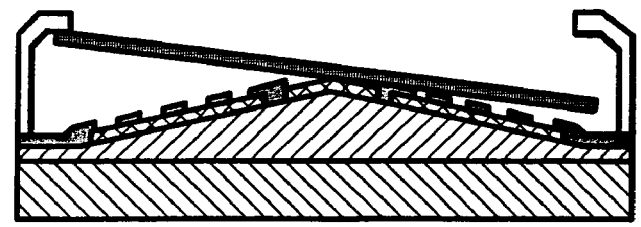

A subsequent process (see FIG. 106B) provides the electrodes 800b, 800d, and the conductive layer 801 made of a titanium nitride thin film. The electrodes 800a and 800c which are not shown in FIG. 106B are also formed at the same time in this process. In this process, the titanium nitride thin film is formed with the DC magnetron sputtering process with a target of titanium, and is patterned into the electrodes 800a-800d using the photography and the dry etching method.

The next process (see FIG. 106C) forms a noncrystalline silicon film with the sputtering method, and the noncrystalline silicon film is smoothed through the process time control using the CMP technology. The remaining noncrystalline silicon film is referred to as a first sacrifice layer 1602. As an alternative to the noncrystalline silicon film, the first sacrifice layer 1602 may be made of a polyimide film or a photosensitive organic film (i.e., a resist film generally used in a semiconductor process), or a polycrystalline silicon film. The smoothing method may be the reflow method with the thermal processing or the etch back method with the dry etching.

The next process (see FIG. 106D) forms a silicon nitride layer as the dielectric layer 2201 of the plate 2204 with the plasma CVD method. Then, the silicon nitride layer is patterned into the opening 2203 and the dielectric layer 2201 using the photography and the dry etching method. Subsequently, an aluminum metal film constituting the light reflecting region combined with the conductive layer 2202 is formed with the sputtering method. After that, the aluminum metal film is patterned with the photography and the dry etching method.

The next process (see FIG. 106E) forms a noncrystalline silicon film with the sputtering method. This noncrystalline silicon film is referred to as a second sacrifice layer 1603. As an alternative to the noncrystalline silicon film, the second sacrifice layer 1603 may be made of a polyimide film or a photosensitive organic film (i.e., a resist film generally used in a semiconductor process), or a polycrystalline silicon film. The second sacrifice layer 1603 is preferably made of the same material as the first sacrifice layer 1602.

The subsequent process (see FIG. 106F) divides each light deflecting apparatus with patterns of the first and second sacrifice layers 1602 and 1603 together using the photography and the dry etching method. At this time, the pattern areas of the first and second sacrifice layers 1602 and 1603 are slightly larger than the area of the plate 2204. This process prepares for the next process for providing the angle brackets 2102c.

The next process (see FIG. 106G) forms a silicon oxide film constituting the angle brackets 2102c with the plasma CVD method. Then, the silicon oxide film is patterned to make the angle brackets 2102c with the photography and the dry etching method.

The next process (see FIG. 106H) removes the remaining first and second sacrifice layers 1602 and 1603 through an opening with a wet etching method using a TMAH (tetramethyl-ammonium-hydroxide) liquid so that the plate 2204 is supported by the supporting member 2103 for a free movement within the predetermined space. Thus, the procedure for making the light deflecting apparatus 2100f shown in FIG. 98A is completed.

Referring to FIGS. 107A-107I, another exemplary method of making a light deflecting apparatus is explained. In this discussion, a light deflecting apparatus to be made is an apparatus similar to the light deflecting apparatus 2100e of FIG. 97A, as an example. Each of the views shown in FIGS. 107A-107I is a cross section view taken on line II-II of FIG. 97A. This method is a part of the manufacturing procedure for manufacturing the light deflecting apparatus 2100e, including at least processes of forming a dielectric thin film on a plurality of electrodes and patterning the dielectric thin film to form projections.

A first process (see FIG. 107A) provides a silicon oxide film, which forms the supporting member 601, on the silicon substrate 2101 with the plasma CVD method. Then, a photography using a photomask having a pattern with an area coverage modulation or a photography which thermally deforms a resist pattern is used to form a resist pattern having an approximate shape and a thickness of the supporting member 601. After that, the formed resist pattern is deformed to an exact shape of the supporting member 601 with the dry etching method.

The next process (see FIG. 107B) forms the electrodes 2301 and the conductive top portion 602 made of a titanium nitride thin film. In this process, the titanium nitride thin film is formed with the DC magnetron sputtering process with a target of titanium, and is patterned into the electrodes 2301 using the photography and the dry etching method.

The next process (see FIG. 107C) forms a silicon nitride film serving as the insulating film 603 for protecting a short circuit between the plate 2104 and the electrodes 2301 with the plasma CVD method. After that, the silicon nitride film is patterned into the projections 701 in a desired shape at predetermined positions using the photography and the dry etching method. At this time, an opening is provided near the conductive top portion 602 for applying a voltage to the plate 2104.

The next process (see FIG. 108D) forms a noncrystalline silicon film with the sputtering method, and the noncrystalline silicon film is smoothed through the process time control using the CMP technology. The remaining noncrystalline silicon film is referred to as a first sacrifice layer 1702. As an alternative to the noncrystalline silicon film, the first sacrifice layer 1702 may be made of a polyimide film or a photosensitive organic film (i.e., a resist film generally used in a semiconductor process), or a polycrystalline silicon film. The smoothing method may be the reflow method with the thermal processing or the etch back method with the dry etching.

The next process (see FIG. 107E) forms the plate 2104 made of an aluminum metal film having conductivity to combine with the light reflecting region with the sputtering method. After that, the aluminum metal film is patterned with the photography and the dry etching method.

The next process (see FIG. 107F) forms a noncrystalline silicon film with the sputtering method. This noncrystalline silicon film is referred to as a second sacrifice layer 1703. As an alternative to the noncrystalline silicon film, the second sacrifice layer 1703 may be made of a polyimide film or a photosensitive organic film (i.e., a resist film generally used in a semiconductor process), or a polycrystalline silicon film. The second sacrifice layer 1703 is preferably made of the same material as the first sacrifice layer 1702.

The subsequent process (see FIG. 107G) divides each light deflecting apparatus with patterns of the first and second sacrifice layers 1702 and 1703 together using the photography and the dry etching method. At this time, the pattern areas of the first and second sacrifice layers 1702 and 1703 are slightly larger than the area of the plate 2104. This process prepares for the next process for providing the angle brackets 2102c.

The next process (see FIG. 107H) forms a silicon oxide film constituting angle brackets 2102c with the plasma CVD method. Then, the silicon oxide film is patterned to make the angle brackets 2102c with the photography and the dry etching method.

The next process (see FIG. 107I) removes the remaining first and second sacrifice layers 1702 and 1703 through an opening with a wet etching method using a TMAH (tetra-methyl-ammonium-hydroxide) liquid so that the plate 2104 is supported by the supporting member 601 for a free movement within the predetermined space. Thus, the procedure for making the light deflecting apparatus 2100e shown in FIG. 97A is completed.

Figure 108A:
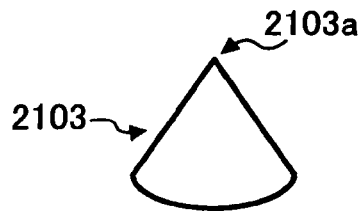
FIGS. 108A-108D and 109A-109C are schematic diagrams showing different shapes of supporting member.
Figure 108B:
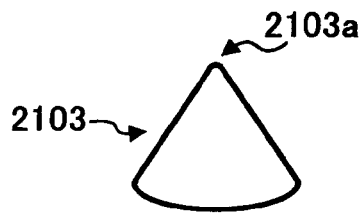
Figure 108C:
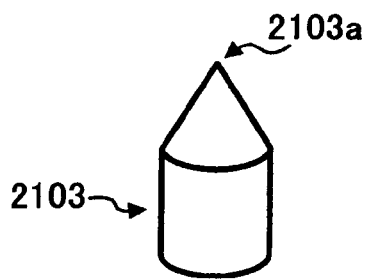
Figure 108D:
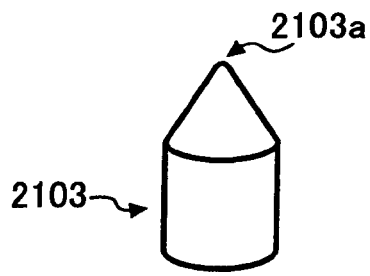

Referring to FIGS. 108A-108D and 109A-109C, various shapes of the supporting member is explained. FIG. 108A shows the supporting member 2103 in a basic conical shape having a top portion 2103a which may be needed to be strengthen to support the plate 2104 which is acted by the electrostatic attraction force. To provide a high mechanical strength to the top portion 2103a, the top portion 2103a may be rounded, as shown in FIG. 108B. FIG. 108C shows a preferable shape of the supporting member 2103 which combines a frustum of a cone and a circular cylinder and provides a wider apex angle to the top portion 2103a in comparison with the supporting members 2103 having the conical shape with the same height. The top portion 2103a of FIG. 108C may also be rounded, as shown in FIG. 108D.

Figure 109A:
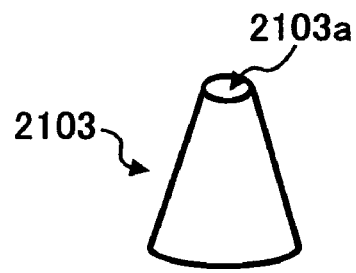
Figure 109B:
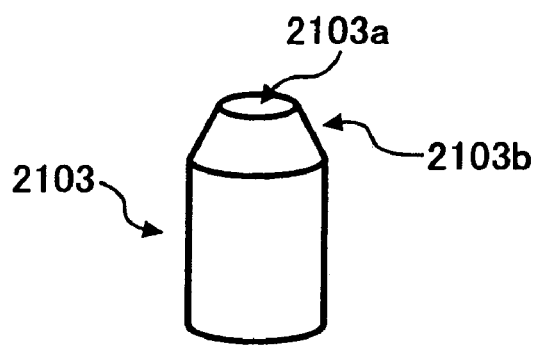
Figure 109C:
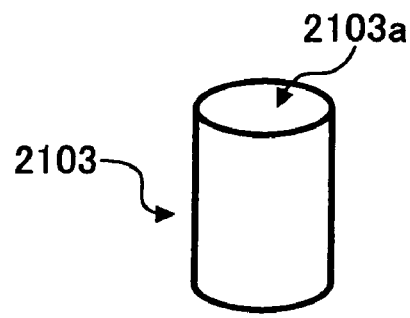

It is also possible to provide a flat apex to the top portion 2103a, as shown in FIGS. 109A-109C. With these flat apexes, a concern of a stress concentration is eliminated. A shape combining a frustum of a cone and a circular cylinder, as shown in FIG. 109B, is also preferable. When the area of the top portion 2103a is relatively small, the circular cylinder, as shown in FIG. 109C, may also be used.

Figure 110A:
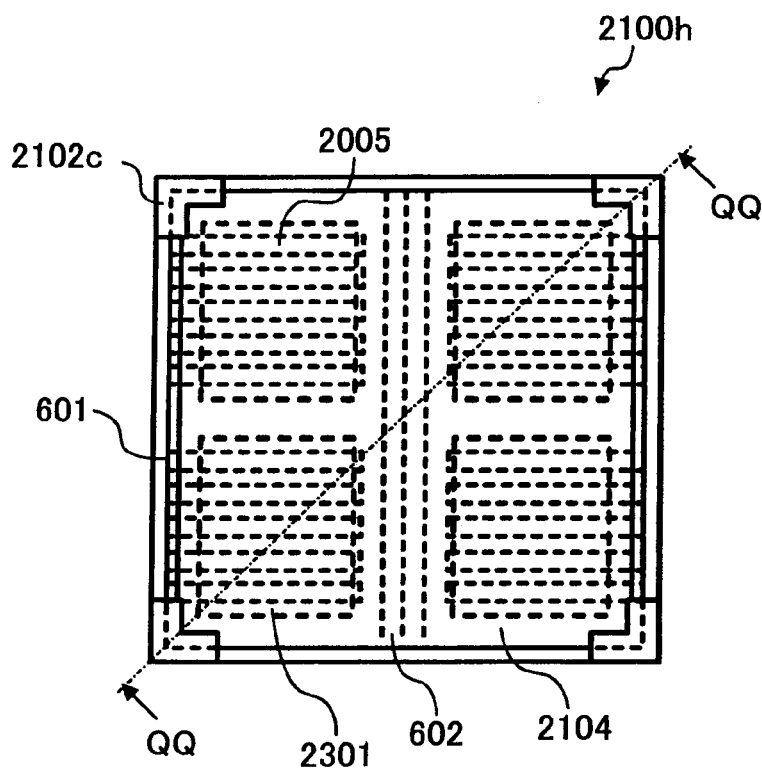
FIGS. 110A and 110B are schematic diagrams of a light deflecting apparatus according to another embodiment of the present invention.
Figure 110B:
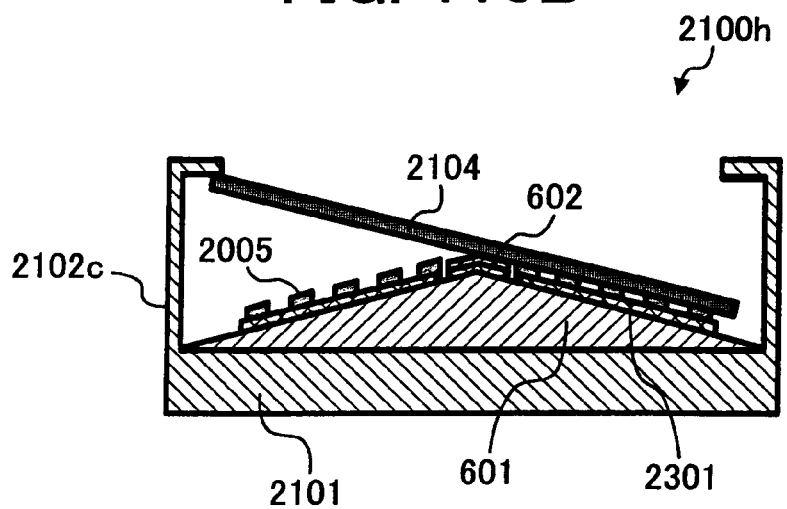

Referring to FIGS. 110A and 110B, a light deflecting apparatus 2100h according to another preferred embodiment of the present invention is explained. FIG. 110A is a plane view of the light deflecting apparatus 2100h, and FIG. 110B is a cross-section view of the light deflecting apparatus 2100h taken on line QQ-QQ of FIG. 110A. The light deflecting apparatus 2100h of FIG. 110A is an apparatus modified on the basis of the light deflecting apparatus 2100e of FIG. 97A, that is, the projections 701 are modified to projections 2005. The projections 2005 have a strip shape different from the projections 701, although they can be formed by a method similar to that used for the projections 701 and have a function similar to that of the projections 701.

The projections 2005 are made of an insulation film and are placed on the four electrodes 2301 in a form of a plurality of strip shapes. A width and a length of each strip and a pitch of the strips are arbitrarily determined according to a relationship between the electrostatic attraction force and the stiffness of the plate 2104 within a limit that the plate 2104 does not touch the electrodes 2301 when being elastically deformed. The roof-like-shaped slopes of the supporting member 601 may be in a polygonal shape similar to that shown in FIG. 101.

Since the size of the projections 2005 is near a limit of resolution in preparation of a photomask for forming the shape of the projections 2005, the projections 701 only in the circular shape, as shown in FIG. 97A, may be produced with a degraded machining accuracy. The strop-shaped projections, as shown in FIG. 110A, have a larger area and increase the machining accuracy.

Figure 111A:
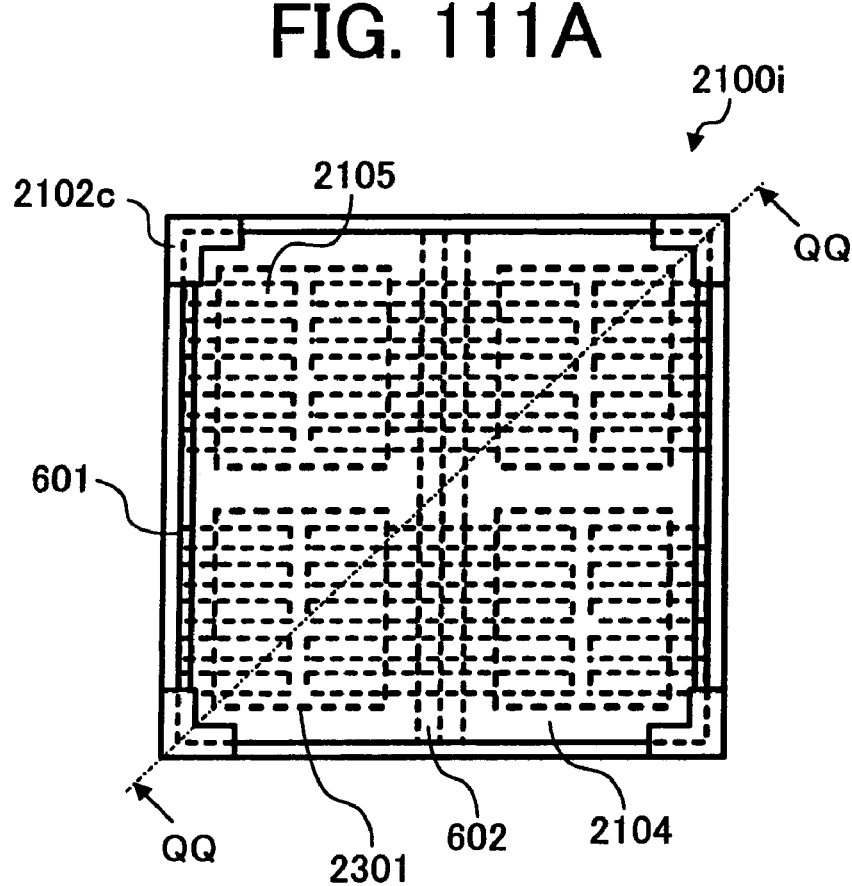
FIGS. 111A and 111B are schematic diagrams of a light deflecting apparatus according to another embodiment of the present invention.
Figure 111B:
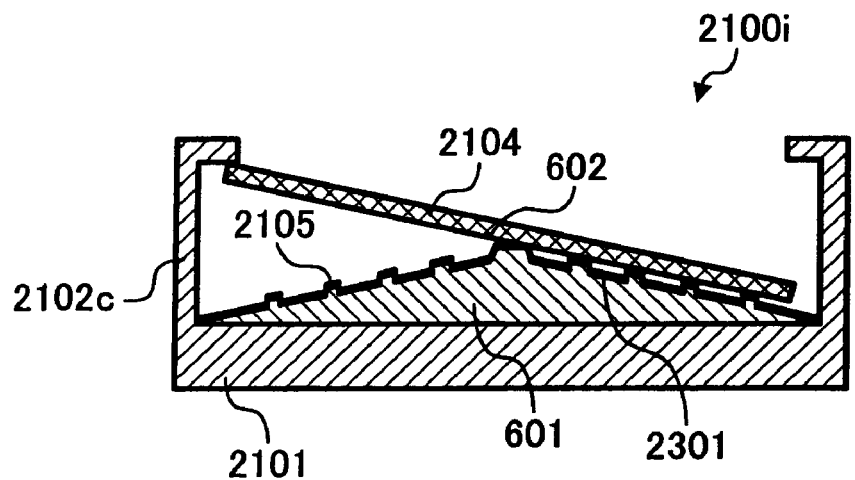

Referring to FIGS. 111A and 111B, a light deflecting apparatus 2100i according to another preferred embodiment of the present invention is explained. FIG. 111A is a plane view of the light deflecting apparatus 2100i, and FIG. 111B is a cross-section view of the light deflecting apparatus 2100i taken on line RR-RR of FIG. 11A. The light deflecting apparatus 2100i of FIG. 111A is an apparatus modified on the basis of the light deflecting apparatus 2100h of FIG. 110A, that is, the projections 2005 are modified to projections 2105. The projections 2105 are formed in a method partly different from the method used for the projections 701 but are similar to the projections 2005 in other aspects. The projections 2105 are not placed on the electrodes 2301 but are projected between the electrodes.

The projections 2105 are formed with a predetermined pattern when the supporting member 601 is formed and before the four electrodes 2301 are formed. When the supporting member 601 is made of an insulating material, it is sufficient to pattern the surface of the supporting member 601 itself. However, when the supporting member 601 is made of a conductive material, the insulative projections 2105 are formed with a predetermined pattern after an insulating film is formed on the surface of the supporting member 601. The electrodes 2301 are formed in flat surfaces provided around the projections 2105. In addition, it is needed to form a conductive member 602 on the top portion of the supporting member 601 for applying a voltage to the plate 2104. This conductive member 602 can be formed together when the electrodes 2301 are formed. The reason of forming the electrodes 2301 out of the projections 2105 is that, when the electrodes are arranged under the projections, electrostatic charges are generated on the projection surfaces due to polarization and attract the plate 2104. When such attraction of the plate 2104 by the electrostatic charges is greater, a fixing phenomenon may occur in which the plate 2104 is kept attracted to the projections even after the voltages applied to the electrodes are out.

Figure 112:
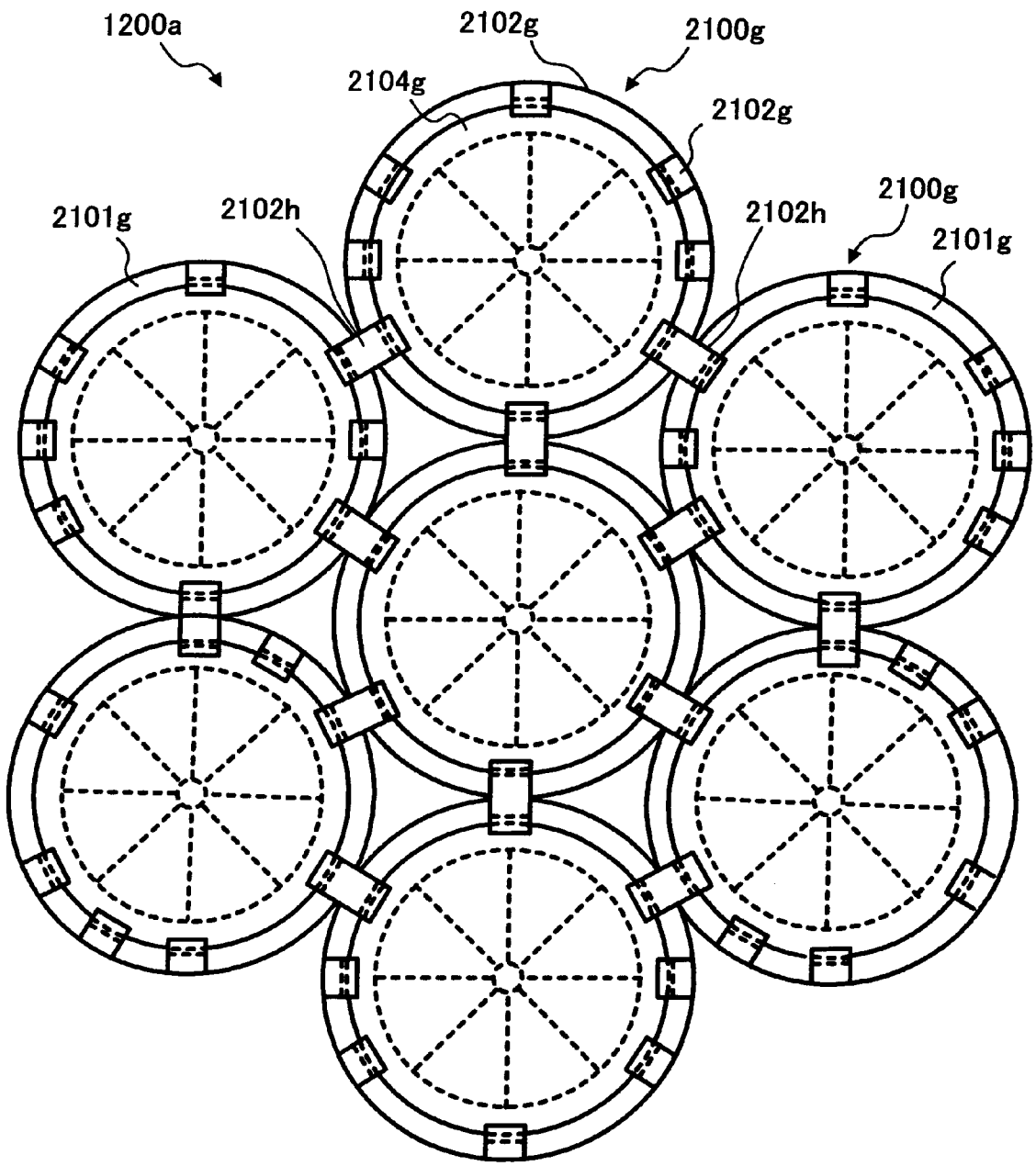
FIG. 112 is a schematic diagrams of a light deflecting array apparatus according to another embodiment of the present invention.

Referring to FIG. 112, a light deflecting array apparatus 1200a is explained. As shown in FIG. 112, the light deflecting array apparatus 1200a includes a plurality of the light deflecting apparatuses 2100g of FIG. 101 arranged in a closest-packed structure and in a two-dimension array form. For this arrangement, the angle brackets are modified. The view shows only a minimum portion of the array structure but an actual array will have an extended structure in two-dimension directions.

In FIG. 112, reference numeral 2102h denotes joint angle brackets which have functions of stopping the plate 2104 as the angle brackets and jointing two light deflecting apparatuses. Each of the joint angle brackets 2102h is shared by two light deflecting apparatuses 2100g. In general, when equal-sized small circles are arranged in a smallest-packed structure, as shown in FIG. 112, each circle is surrounded in contact by six circles making contact in a regular manner between adjacent two among the six circles. Accordingly, six joint angle brackets 2102h are needed to joint the light deflecting apparatus 2100g at the center to the six surrounding light deflecting apparatus 2100g. In integration of a plurality of the light deflecting apparatus 2100g to make the light deflecting array apparatus 1200a, for example, it is possible to form the substrate 2101g and the joint angle brackets 2102h in one piece.

To make a one-direction light deflecting array apparatus (not shown) using the light deflecting apparatuses 2100g, it may also be possible to integrate the substrate 2101 and the joint angle brackets 2102h in one piece. In this case, the number of the joint angle brackets 2102h may be four, as shown in FIG. 101.

In addition, when the plurality of the light deflecting apparatuses 2100g are arranged in a square matrix form, not in a closest-packed structure, the number of the joint angle brackets 2102h may suitably be four.

Figure 113A:
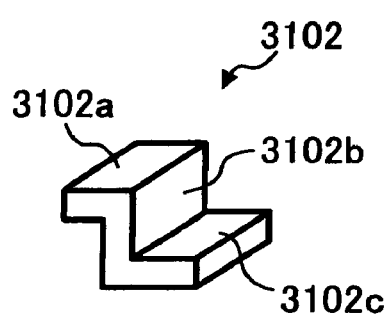
FIGS. 113A, 113B, and 114 are schematic diagrams showing different shapes of an angle bracket.
Figure 113B:
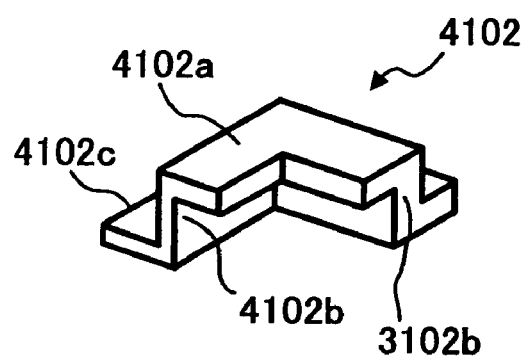
Figure 114:
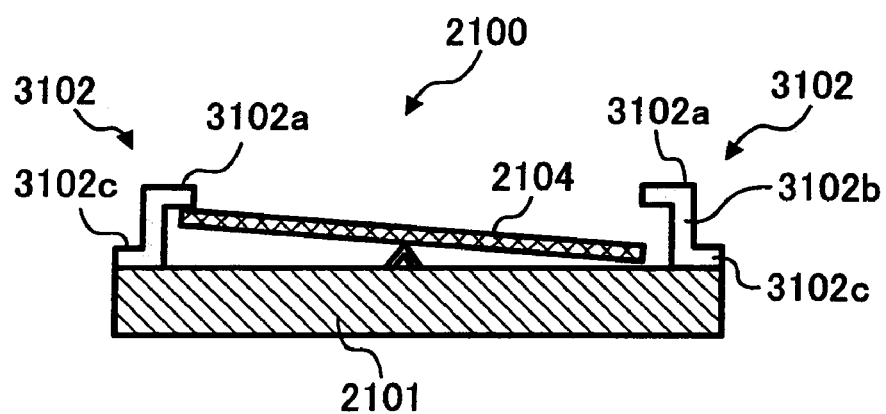

Referring to FIGS. 113A, 113B and 114, the angle brackets 2102 in modified shapes are explained. FIG. 113A shows an edge angle bracket 3102 having an angled top portion 3102a, a vertical portion 3102b, and an extended base portion 3102c. The angled top portion 3102a and the extended base portion 3102c are projected in opposite directions relative to the vertical portion 3102b. This edge angle bracket 3102 is used in the light deflecting apparatuses such as those shown in FIGS. 91 and 101, for example, in which the angle brackets are arranged at each side or circumferential edge, not at the corners. As understood from a view of FIG. 114, the space reserved for the tilt movement of the plate 2104 is limited to a space smaller than the substrate 2101 by the presence of the extended base 3102c. This is a result of increasing the mechanical strength of the angle brackets, since the angle brackets are prone to be broken even by a relatively small stress if they are joined to the substrate 2101 with too small areas.

FIG. 113B shows a corner angle bracket 4102 having an angled top portion 4102a, a vertical portion 4102b, and an extended base portion 4102c. This corner angle bracket 4102 is used in the light deflecting apparatuses such as those shown in FIG. 94, for example, in which the angle brackets are arranged at each corner of the substrate 2101. A way for using such corner angle bracket 4102 and its effect are more or less similar to those of the edge angle bracket 3102.

Figure 115A:
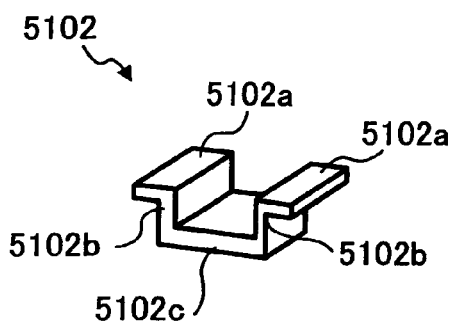
FIGS. 115A, 115B, 116, and 117 are schematic diagrams showing further different shapes of angle bracket.

Referring to FIGS. 115A, 115B, 116, and 117, the joint angle brackets 2102h in different shapes are explained. FIG. 115A shows an U-like-shaped joint angle bracket 5102 which is an angle bracket shared by two light deflecting apparatuses in a way as shown in FIG. 112. The U-like-shaped joint angle bracket 5102 has a shape such that two edge angle brackets 3102 are connected. More specifically, a flat-formed base 5102c is equally placed on a connecting line K of connected two substrates 2101, disposing vertical portions 5102b on edges of the flat-formed base 5102c facing each other and stopper portions 5102a on the vertical portions 5102b to project in directions respectively opposite to the connecting line K.

Figure 116:
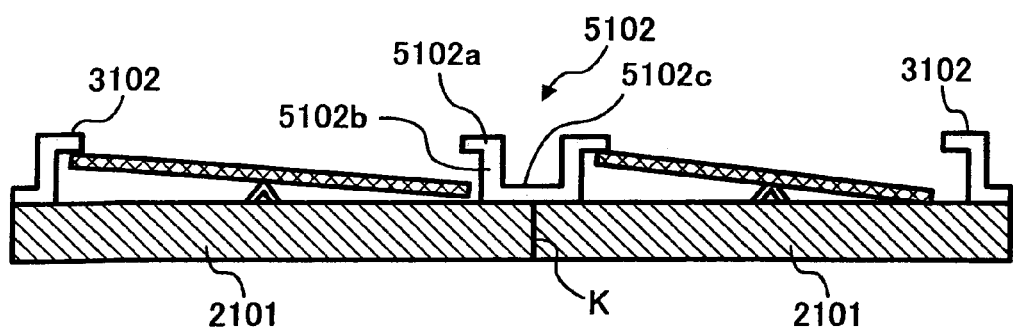
Figure 117:
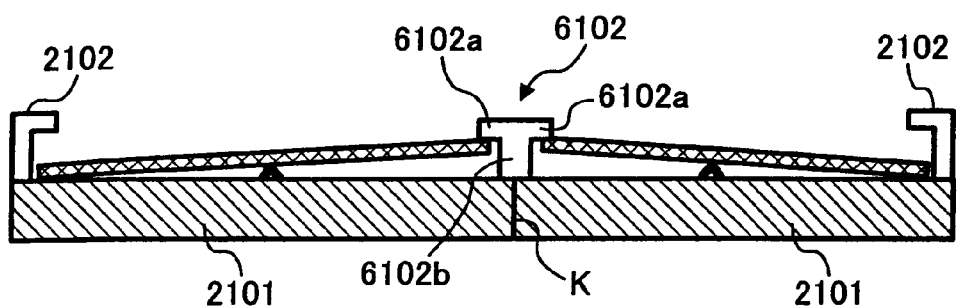
Figure 118:
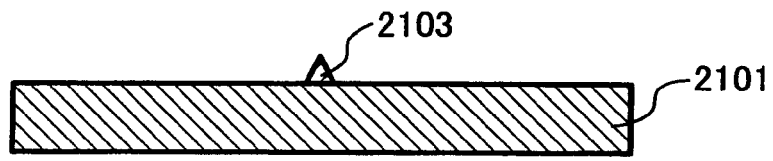
FIGS. 118-127 are schematic diagrams for explaining a method of making a light deflecting apparatus modified based on the light deflecting apparatus of FIG. 98A.
Figure 119:
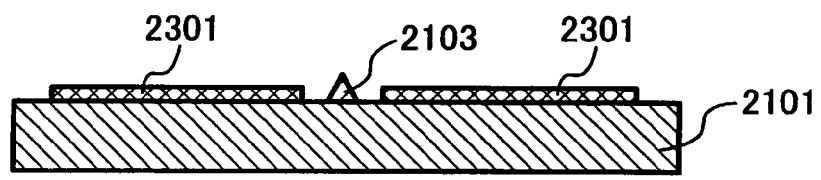
Figure 120:
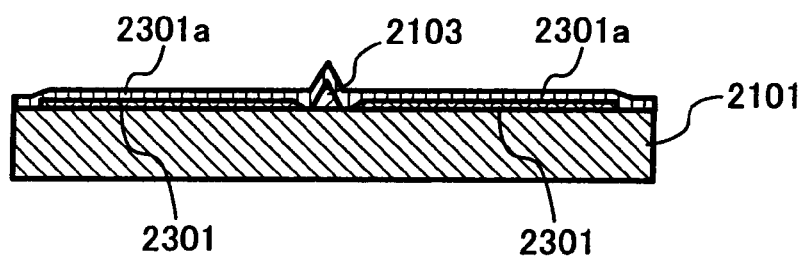
Figure 121:
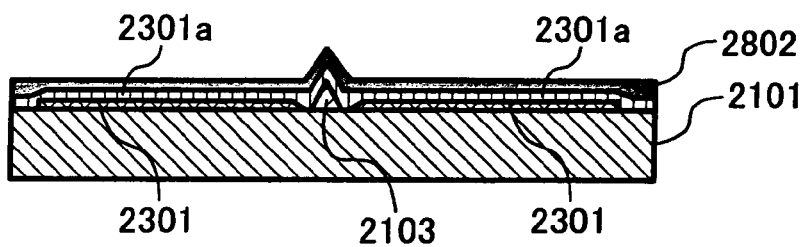
Figure 122:
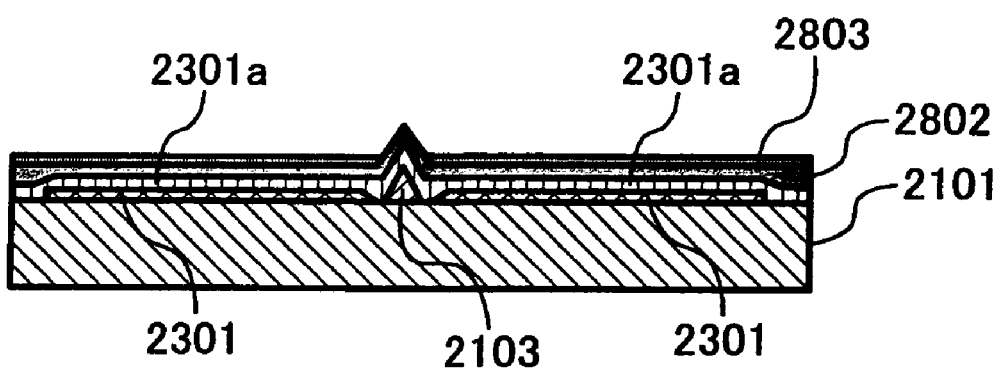
Figure 123:
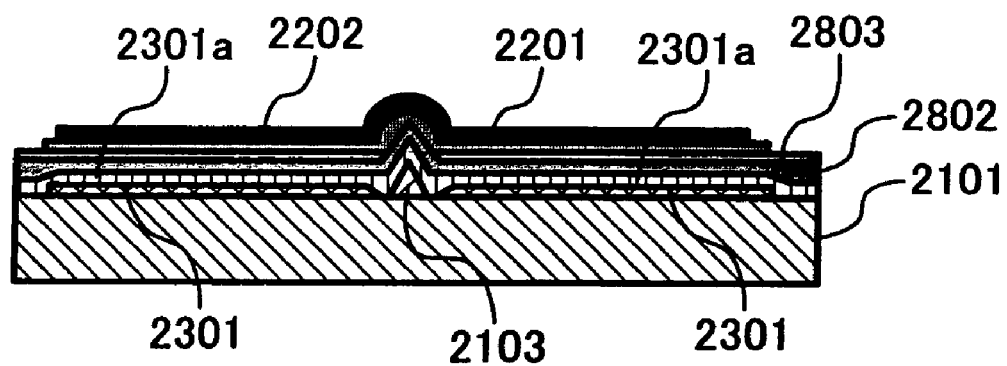
Figure 124:
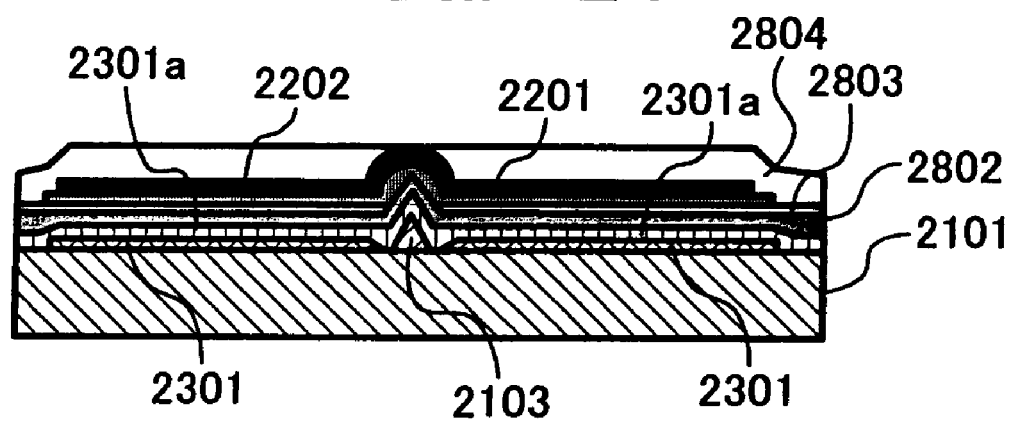
Figure 125:
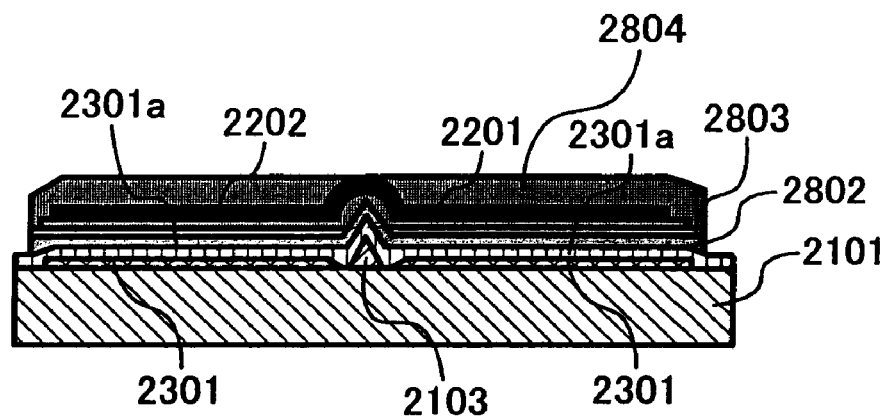
Figure 126:
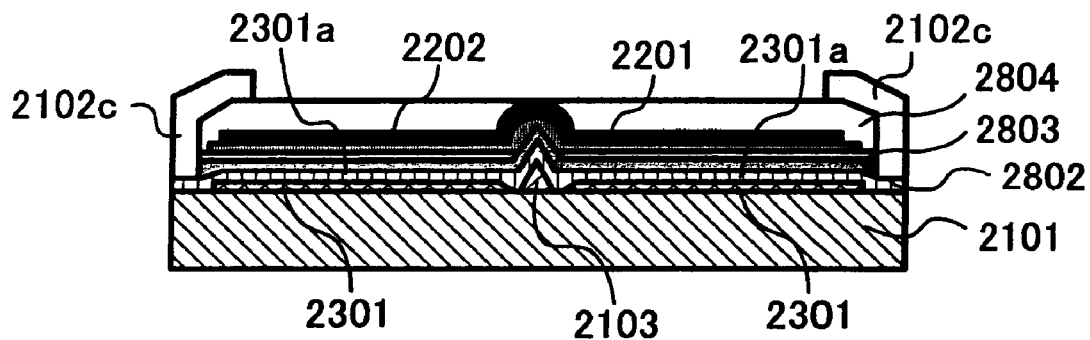
Figure 127:
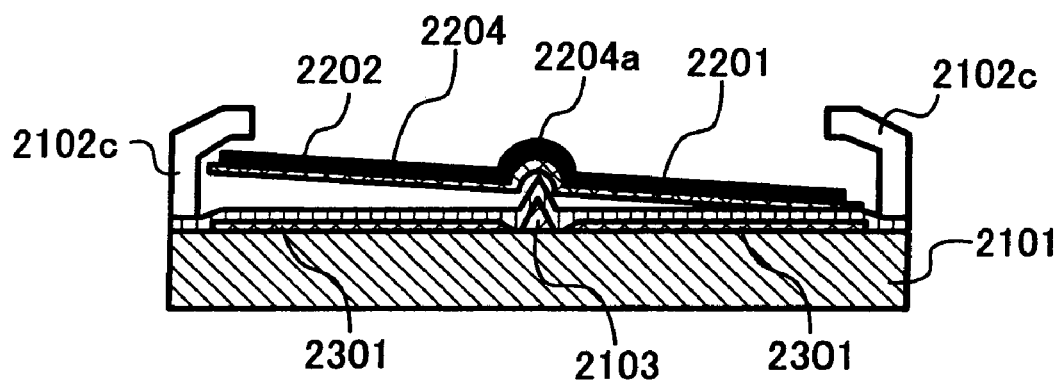

FIG. 116 shows a manner in which the U-like-shaped joint angle bracket 5102 is used.

Figure 115B:
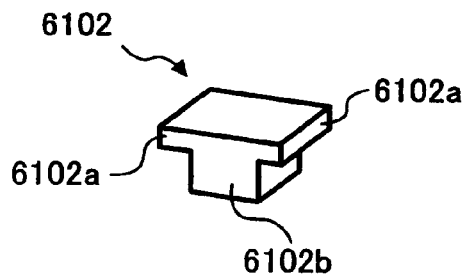

FIG. 115B shows a T-like-shaped joint angle bracket 6102 which is made by connecting two angle brackets 2102 shown in FIG. 91. The T-like-shaped joint angle bracket 6102 has a flat top portion 6102a and a vertical portion 6102b. The width of the vertical portion 6102b is at least twice of the width of the vertical portion 5102b so that the vertical portion 6102b is directly connected to the substrate 2101 with a sufficiently large area to have a relatively high mechanical strength.

Referring to FIGS. 118-127, an exemplary method of making a light deflecting apparatus is explained. In this discussion, a light deflecting apparatus to be made is referred to as a light deflecting apparatus 2100j. The light deflecting apparatus 2100j is similar to the light deflecting apparatus 2100f of FIG. 98A, except for the relatively small convex portion 2204a provided to the central position of the plate 2204 in contact with the supporting member 2103. With this convex portion 2204a, the plate 2204 stably tilts with a self-centering effect.

A first process (see FIG. 118) provides the supporting member 2103. A silicon oxide film constituting the supporting member 2103 is formed on the silicon substrate 2101 with the plasma CVD method. Then, the photography using a photomask having a pattern with an area coverage modulation or the photography which thermally deforms a resist pattern is used to form a resist pattern having an approximate shape and a thickness of the supporting member 2103. After that, the formed resist pattern is deformed to an exact shape of the supporting member 2103 with the dry etching method.

In the above process, the silicon oxide film having a thickness of approximately 2 μm may be formed, and the works for forming the supporting member 2103 may be performed in an upper layer of approximately 1 μm.

The height of the top of the supporting member 2103 is approximately 1 μm.

The next process (see FIG. 119) provides the electrodes 2301. In this process, the electrodes 2301 are made of a titanium nitride (TiN) film. A titanium nitride film is formed to have a thickness of 0.01 μm with the DC magnetron sputtering process and is patterned into the electrodes 2301 with the photography and the dry etching method.

The next process (see FIG. 120) provides a protection layer 2301a on the electrode 2301. The protection layer 2301a is made of a silicon nitride film having a thickness of 0.2 μm with the plasma CVD method.

The next process (see FIG. 121) provides a first sacrifice layer 2802. A noncrystalline silicon film having a thickness of 2 μm is formed on the protection layer 2301a with the sputtering method, and the noncrystalline silicon film is smoothed through a process time control using the CMP. In this example, the process time control is conducted with reference to a time period in that the thickness of the noncrystalline silicon film on the top of the supporting member 2103 is completely removed and the supporting member 2103 is exposed outside. In addition, the CMP is set to conditions in that the supporting member 2103 and the protection layer 2301a are more polished so that, around the top portion of the supporting member 2103, a supporting point 2103a of the supporting member 2103 remains and the noncrystalline silicon film thinly remains. The supporting point of the supporting member 2103 is projected by approximately 0.2 μm. The noncrystalline silicon film remaining on the protection layer 2301a is referred to as the first sacrifice layer 2802.

As an alternative to the noncrystalline silicon film, the first sacrifice layer 2802 may be made of a polyimide film or a photosensitive organic film, or a resist film or a polycrystalline silicon film which are generally used in a semiconductor process. The smoothing method may be the etch back method with the dry etching.

The next process (see FIG. 122) provides a second sacrifice layer 2803. A noncrystalline silicon film of a 0.1-μm thick is formed on the first sacrifice layer 2802 to cover the top portion of the supporting member 2103 with the sputtering method.

The next process (see FIG. 123) provides the dielectric and conductive layers 2201 and 2202, respectively. A 0.2-μm-thick silicon nitride film constituting the dielectric layer 2201 is formed on the first sacrifice layer 2802 with the plasma CVD method and subsequently a 0.05-μm-thick aluminum metal film is formed on the silicon nitride layer with the sputtering method. After that, the aluminum metal film and the silicon nitride layer are patterned with the photography and the dry etching method, respectively. The dielectric layer 2201 is formed in a shape slightly smaller than the substrate 2101 to leave a sufficient space to form the angle brackets 2102c in the later process. Further, the conductive layer 2202 is formed in a shape slightly smaller than the dielectric layer 2201 so as to be placed on the dielectric layer 2201.

The next process (see FIG. 124) provides a third sacrifice layer 2804. A 1-μm-thick noncrystalline silicon film is formed with the sputtering method. This noncrystalline silicon film is referred to as a second sacrifice layer 2804. The third sacrifice layer 2804 may made of a polyimide film or a photosensitive organic film, or a resist film or polycrystalline silicon film which are generally used in a semiconductor process.

The next process (see FIG. 125) provides a space for forming the angle brackets 2102c. The first, second, and third sacrifice layers 2802, 2803, and 2804 are patterned together at the same time using the photography and the dry etching method. As a result of this patterning, a portion around the circumference of the substrate 2101 is removed and a space for the angle brackets 2102c is formed. At this time, the areas of the remaining first, second, and third sacrifice layers 2802, 2803, and 2804 are slightly larger than the area of dielectric layer 2201 so that the dielectric layer 2201 is not exposed.

The next process (see FIG. 126) provides the angle brackets 2102c. A 0.8-(m-thick silicon oxide film is formed with the plasma CVD method and is patterned with the photography and the dry etching method, thereby making the angle brackets 2102c. The shape of the angle bracket is not limited to that of the angle bracket 2102c but may be those shown in FIGS. 113A, 113B, 115A, and 115B.

The final process (see FIG. 127) removes the remaining first, second, and third sacrifice layers 2802, 2803, and 2804 through an opening with the wet etching method so that the plate 2204 having the light reflecting region is supported by the supporting member 2103 for a free movement within the space determined by the substrate 2101, the angle brackets 2102c, and the supporting member 2103. Thus, the procedure for making the light deflecting apparatus 2100j is completed.

With this method, the convex portion 2204a at the center in the backside of the plate 2204 is engaged with the top portion of the supporting member 2103, so that the plate 2204 is not apt to slide from the top portion of the supporting member 2103 when being tilted by the action of the electrostatic attraction force. Therefore, the plate 2204 is always stably supported by the supporting member 2103. Accordingly, the direction control for the light deflection in the use of the light deflecting apparatus 2100j made with this method for a micro mirror device, for example, can be conducted in a high precision manner.

Numerous additional modifications and variations are possible in light of the above teachings. It is therefore to be understood that within the scope of the appended claims, the disclosure of this patent specification may be practiced otherwise than as specifically described herein.

What is claimed is:

1. A light deflecting apparatus deflecting input light in directions for at least one deflection-axis, comprising:
   a plate-like-shaped member configured to reflect input light;
   a substrate above which said plate-like-shaped member is placed with no fixed portion relative to said substrate;
   a supporting member serving as a fulcrum for said plate-like-shaped member to tilt;
   a plurality of space regulating members configured to regulate a space in which said plate-like-shaped member placed on said supporting member above said substrate is freely movable; and
   a plurality of electrodes arranged around said supporting member on said substrate and facing a bottom surface of said plate-like-shaped member.

2. The light deflecting apparatus as defined in claim 1, wherein said plate-like-shaped member is made of a single thin film.

3. The light deflecting apparatus as defined in claim 1, wherein said plate-like-shaped member determines a reflection direction relative to said input light when tilting and coming in contact with said substrate by point.

4. The light deflecting apparatus as defined in claim 1, wherein said plate-like-shaped member determines a reflection direction relative to said input light when tilting and coming in contact with said substrate by line.

5. The light deflecting apparatus as defined in claim 1, wherein said supporting member has at least one slope connecting between a top portion and a bottom edge thereof and said plate-like-shaped thin film member comes in contact with said at least one slope of said supporting member.

6. A light deflecting apparatus deflecting input light in directions for at least one deflection-axis, comprising:
   a substrate;
   a plurality of space regulating members arranged at a plurality edges of a surface of said substrate and having stoppers on tops thereof;
   a supporting member including a top portion made of a conductive material;
   a plurality of electrodes formed on said surface of said substrate; and
   a plate-like-shaped member placed on said top portion of said supporting member movably in tilt directions within a space determined by said substrate, said supporting member, and said stoppers of said plurality of space regulating members, including a light reflecting region on an upper surface thereof and a conductive layer forming a contacting portion having a point contact with said top portion of said supporting member, receiving a voltage through said point contact with said top portion of said supporting member, and moving in a tilt direction by an action of an electrostatic attraction force generated in accordance with said received voltage and voltages applied to said plurality of electrodes to settle a tilt position thereof so as to deflect said input light in an arbitrary direction out of said directions for at least one deflection-axis.

7. A method of making the light deflecting apparatus recited in claim 6, comprising:
   providing said substrate;
   forming said supporting member;
   patterning said plurality of electrodes and said conductive member for said supporting member;
   forming and flattening a first sacrifice layer;
   patterning said plate-like-shaped member including at least one layer;
   forming a second sacrifice layer;
   patterning said first and second sacrifice layers;
   patterning said plurality of space regulating members at a plurality of arbitrary positions of said first and second sacrifice layers; and
   removing said patterned first and second sacrifice layers through an etching.

8. The method as defined in claim 7, wherein in said patterning and flattening, said first sacrifice layer is leveled lower than said top portion of said supporting member.

9. A light deflecting apparatus deflecting input light in directions for at least one deflection-axis, comprising:
   a substrate;
   a plurality of space regulating members arranged at a plurality edges of a surface of said substrate and having stoppers on tops thereof;
   a supporting member including a top portion made of a conductive material and having a prism shape with at least two slope surfaces;
   a plurality of electrodes formed on said at least two slope surfaces;
   a plurality of projections formed on said plurality of electrodes in a shape of a plurality of strips; and
   a plate-like-shaped member placed on said top portion of said supporting member movably in tilt directions within a space determined by said substrate, said supporting member, and said stoppers of said plurality of space regulating members, including a light reflecting region on an upper surface thereof and a conductive layer forming a contacting portion having a line contact with said top portion of said supporting member, receiving a voltage through said line contact with said top portion of said supporting member, and moving in a tilt direction by an action of an electrostatic attraction force generated in accordance with said received voltage and voltages applied to said plurality of electrodes to settle a reflection direction relative to said input light when coming in contact with said plurality of said projections so as to deflect said input light in an arbitrary direction out of said directions for at least one deflection-axis.

10. The light deflecting apparatus as defined in claim 9, wherein said at least two slope surfaces of said prism shape with respect to said supporting member correspond substantially to an entire bottom surface of said plate-like-shaped member.

11. The light deflecting apparatus as defined in claim 9, wherein said plate-like-shaped member has a multi-layered structure including dielectric and conductive layers.

12. The light deflecting apparatus as defined in claim 9, wherein said plurality of electrodes are arranged at positions facing a bottom surface of said plate-like-shaped member and are electrically separated from said top portion of said supporting member.

13. The light deflecting apparatus as defined in claim 9, wherein said conductive layer of said plate-like-shaped member includes a portion facing said plurality of electrodes.

14. The light deflecting apparatus as defined in claim 9, wherein each of said space regulating members includes an extended base portion at a bottom thereof projected in a direction opposite to said stopper.

* * * * *